United States Patent
Yoshioka et al.

(10) Patent No.: US 7,955,546 B2
(45) Date of Patent: Jun. 7, 2011

(54) FORMING DIE AND METHOD FOR MANUFACTURING FORMED BODY USING FORMING DIE

(75) Inventors: Kunihiko Yoshioka, Nagoya (JP); Satoshi Ishibashi, Nagoya (JP); Minoru Imaeda, Ichinomiya (JP); Yosuke Okabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/648,535

(22) Filed: Dec. 29, 2009

(65) Prior Publication Data

US 2010/0201018 A1 Aug. 12, 2010

(30) Foreign Application Priority Data

Jan. 6, 2009 (JP) ................................. 2009-000799
Oct. 23, 2009 (JP) ................................. 2009-244033

(51) Int. Cl.
*B29C 39/00* (2006.01)
(52) U.S. Cl. ............... 264/328.12; 264/328.9; 264/334; 249/64; 249/107; 249/126; 249/134; 249/160; 425/577; 425/468
(58) Field of Classification Search ............... 249/64, 249/84, 85, 97, 107, 110, 120, 122, 124, 249/126, 134, 135, 139, 149, 160, 177; 264/328.1, 264/328.9, 328.12, 334, 101, 299, 313, 328.2, 264/328.6, 328.11, 335, 336; 425/577, 581, 425/588, 180, 234, 236, 286, 467, 468, 405.1, 425/414; 156/89.11
See application file for complete search history.

(56) References Cited

U.S. PATENT DOCUMENTS

| | | | | | |
|---|---|---|---|---|---|
| 30,054 | A | * | 9/1860 | Evans | 164/264 |
| 2,201,777 | A | * | 5/1940 | Kliesrath | 264/630 |
| 2,341,499 | A | * | 2/1944 | Cunningham | 264/330 |
| 2,483,094 | A | * | 9/1949 | Harvey | 249/68 |
| 2,829,400 | A | * | 4/1958 | Morin | 264/46.9 |
| 2,988,765 | A | * | 6/1961 | Solomon | 15/187 |
| 3,293,694 | A | * | 12/1966 | Taylor, Jr. | 425/123 |
| 3,317,407 | A | * | 5/1967 | Kratzmeyer et al. | 205/73 |
| 3,379,120 | A | * | 4/1968 | Fogle | 425/346 |
| 3,511,845 | A | * | 5/1970 | Scalora | 264/294 |
| 4,017,582 | A | * | 4/1977 | Naumann | 264/291 |
| 4,352,772 | A | * | 10/1982 | Bezner | 264/229 |
| 4,422,995 | A | * | 12/1983 | Schad | 264/250 |

(Continued)

FOREIGN PATENT DOCUMENTS

JP 55014153 A * 1/1980

(Continued)

*Primary Examiner* — Joseph S Del Sole
*Assistant Examiner* — Dimple Bodawala
(74) *Attorney, Agent, or Firm* — Burr & Brown

(57) ABSTRACT

In the assembly-completed state, the Lower Mold, the Outer Mold, the Upper Mold, and the "inner mold (the integral body of the Pin-holder and the Pin)" are stacked and fixed in this order from the bottom, and the Pin is coaxially inserted into the First Hole of the Outer Mold and the Second Hole of the Upper Mold. In the assembly-completed state, the molding space for molding the ceramic molded body is formed between the surface of the Pin and the First Hole, and the annular minute gap is formed between the surface of the Pin and the Second Hole. The ceramic slurry poured into the Slurry Reservoir Pres formed on the upper surface of the Upper Mold falls and flows into the molding space through the annular minute gap by virtue of the action of gravity or the like.

24 Claims, 45 Drawing Sheets

U.S. PATENT DOCUMENTS

| | | | | |
|---|---|---|---|---|
| 4,552,716 A | * | 11/1985 | Habich | 264/328.1 |
| 5,243,874 A | * | 9/1993 | Wolfe et al. | 74/493 |
| 5,780,079 A | * | 7/1998 | Lee | 425/577 |
| 6,887,417 B1 | * | 5/2005 | Gawreluk et al. | 264/328.1 |
| 7,419,626 B2 | * | 9/2008 | Mark | 264/243 |
| 2003/0160362 A1 | * | 8/2003 | Fithian | 264/328.12 |
| 2004/0130070 A1 | * | 7/2004 | Abels et al. | 264/328.1 |
| 2005/0006819 A1 | * | 1/2005 | Weihrauch | 264/328.12 |
| 2005/0156347 A1 | * | 7/2005 | Haas et al. | 264/109 |
| 2005/0172439 A1 | * | 8/2005 | Weihrauch | 15/187 |
| 2005/0287319 A1 | * | 12/2005 | Miyazawa et al. | 428/34.1 |
| 2006/0216446 A1 | * | 9/2006 | Neil et al. | 428/34.4 |
| 2007/0054003 A1 | * | 3/2007 | Reis et al. | 425/11 |
| 2007/0126138 A1 | * | 6/2007 | Dooley et al. | 264/46.4 |
| 2008/0048356 A1 | * | 2/2008 | Kitayama et al. | 264/209.8 |
| 2009/0029087 A1 | | 1/2009 | Ohashi et al. | |

FOREIGN PATENT DOCUMENTS

| | | |
|---|---|---|
| JP | 56135046 A * | 10/1981 |
| JP | 05-121148 A1 | 5/1993 |
| JP | 08-062106 A1 | 3/1996 |
| JP | 11-042619 A1 | 2/1999 |
| WO | 2004/035281 A1 | 4/2004 |
| WO | 2007/111380 A1 | 10/2007 |

* cited by examiner

Horizontal

* Pouring Step

* Filling Step
  (Negative Pressure Adjusting Step)
  Atmospheric to Negative Pressure Embodiment Horizontal \* Filling Step
  (Atmospheric Pressure Returning Step)
  Negative to Atmospheric Pressure Embodiment Slanted

* Pouring Step

* Filling Step
  (Negative Pressure Adjusting Step)
  Atmospheric to Negative Pressure Modification A Horizontal \* Filling Step
(Posture Changing Step)
Negative Pressure Maintained Modification A Horizontal

* Filling Step
  (Atmospheric Pressure Returning Step)
  Negative to Atmospheric Pressure Modification A Horizontal

* Pouring Step

* Filling Step
  (Negative Pressure Adjusting Step)
  Atmospheric to Negative Pressure Modification B

* Filing Step
  (Posture Changing Step)
  Negative Pressure Maintained

Modification B

Slanted

\* Filling Step
(Atmospheric Pressure Returning Step)
Negative to Atmospheric Pressure Modification B Horizontal

* Negative Pressure Adjusting Step
(Atmospheric to Negative Pressure)

Modification C

Horizontal

* Pouring Step

Modification C

Horizontal

\* Atmospheric Pressure Returning Step
(Negative to Atmospheric Pressure)

Modification C

Slanted

\* Negative Pressure Adjusting Step
(Atmospheric to Negative Pressure)

Modification D

Slanted

\* Pouring Step
  (Before Changing Posture)

Modification D

Modification D

Horizontal

\* Atmospheric Pressure Returning Step
(Negative to Atmospheric Pressure)

Modification D

Horizontal

\* Negative Pressure Adjusting Step
(Atmospheric to Negative Pressure)

Modification E

Horizontal

\* Pouring Step
(Before Changing Posture)

Modification E

* Pouring Step
  (After Changing Posture)

Modification E

* Atmospheric Pressure Returning Step
(Negative to Atmospheric Pressure)

Modification E

FORMING DIE AND METHOD FOR MANUFACTURING FORMED BODY USING FORMING DIE

TECHNICAL FIELD

The present invention relates to a forming mold, and a method for producing a molded body using the forming mold.

BACKGROUND ART

Conventionally, there is a method for molding a ceramic molded body by filling a molding space in a forming mold with a ceramic slurry comprising ceramic powders, a disperse medium, and a gelling agent to obtain the ceramic molded body in the same shape as the molding space (e.g., refer to WO2004/035281). This method is referred to as so-called gel cast method.

DISCLOSURE OF THE INVENTION

In general, in a gel cast method, when a molding space is filled with a slurry, the slurry is poured into the molding space through an incurrent port (may be referred to as "gate") formed at the molding space. The pour of slurry is continued until the overflow of the slurry from an excurrent port (may be referred to as "vent") is confirmed. Thereby, the slurry is filled in order inside the molding space from the incurrent port side to the excurrent port side.

The present invention is intended to provide a forming mold, which is filled with a ceramic slurry in a manner different from the above, and a method for producing a molded body using the forming mold.

A forming mold according to the present invention is a forming mold for molding a slurry comprising inorganic powders, a disperse medium, and a gelling agent to obtain a molded body with a hollow portion. The forming mold has an outer mold, an inner mold, and an upper mold. Herein, "inorganic powders" refers to ceramic powders, metallic powders, or a mixture of ceramic powders and metallic powders. Hereinafter, taking a case wherein ceramic powders are used as inorganic powders as an example, and referring to a "slurry" as a "ceramic slurry" and a "molded body" as a "ceramic molded body", an explanation will be proceeded with.

In the outer mold, a first hole, which opens into the upper surface of the outer mold and extends downward from its opening, is formed. The upper mold is stacked on the upper surface of the outer mold. In the upper mold, a second hole, which passes through in a vertical direction, is formed. In a state wherein the upper mold is stacked on the upper surface of the outer mold, the lower opening of the second hole and the opening of the first hole are connected such that the lower opening (the entirety of the opening plane) of the second hole is included in the opening (plane) of the first hole. In addition, in the upper mold, a slurry reservoir which leads to the opening on the upside of the second hole and retains a ceramic slurry, is formed. For example, a concave portion formed on the upper surface of the upper mold can be used as the slurry reservoir.

The first and second holes can be configured such that, for example, they present a circular cylindrical (cylindrical columnar) shape with a center of axle in a vertical direction and, in a state wherein the upper mold is stacked on the upper surface of the outer mold, the first and second holes are coaxially connected in a vertical direction. In this case, the diameter of the circular cross section of the first hole is larger than the diameter of the circular cross section of the second hole.

The inner mold has an insert which is in a shape of a rod and is inserted into the first and second holes from above. The insert can be configured such that, for example, it presents a cylindrical columnar shape with a center of axle in a vertical direction and, in a state wherein the upper mold is stacked on the upper surface of the outer mold and the insert is inserted in the first and second holes (hereinafter, referred to as a "assembly-completed state"), it is arranged coaxially with the first and second holes.

In the assembly-completed state, a space is formed between the inner wall of the first hole and the surface of the insert. This space is used as a molding space for molding the ceramic slurry. Also, in the assembly-completed state, a space (gap) is formed between the inner wall of the second hole and the surface of the insert. This space (gap) is hereinafter referred to as a "slurry passing gap". For example, as described above, when the first and second holes present a circular cylindrical (cylindrical columnar) shape with a center of axle in a vertical direction, and the insert presents a cylindrical columnar shape with a center of axle in a vertical direction, and the first and second holes and the insert are coaxially arranged in the assembly-completed state, the molding space presents a rotationally-symmetrical shape around said center of axle, and the slurry passing gap becomes an annular gap (it presents a tubular shape with a circular cross section in a horizontal direction). When the first and second holes present a columnar shape having a center of axle in a vertical direction and a square, rectangular, or elliptical cross section in a horizontal direction, and the insert presents a columnar shape having a center of axle in a vertical direction and a square, rectangular, or elliptical cross section in a horizontal direction, and the first and second holes and the insert are coaxially arranged in the assembly-completed state, the molding space presents a tubular shape with a square, rectangular, or elliptical cross section in a horizontal direction, respectively. The molding space may be confined airtightly or not, except for the portion corresponding (connecting) to the slurry passing gap.

In accordance with a forming mold according to the present invention, in an assembly-completed state, a ceramic slurry is poured into a slurry reservoir. The poured slurry falls and flows toward the molding space through the slurry passing gap by virtue of the action of gravity or the like. Thereby, the ceramic slurry is filled in the molding space.

The slurry thus filled in the molding space is hardened, and thereafter, from the molded body after hardening, the outer mold, the upper mold, and the inner mold are removed, and thereby a "ceramic molded body with a hollow portion" in the same shape as the molding space is obtained. In the obtained ceramic molded body, the hollow portion is formed at the portion corresponding to the insert of the inner mold.

In addition, when the outer mold, the inner mold, and the upper mold are removed from the molded body after hardening, the inner mold is removed prior to the upper mold and the outer mold. This is due to the following reasons. Namely, in a state wherein the slurry has been hardened in the assembly-completed state, more accurately, the molded body has become an integral shape in which the shape of the molding space and the shape corresponding to the slurry passing gap are continuous. When the inner mold is removed upward from the molded body in the integral shape, the molded body undergoes an upward force. The upward force can function as a force to pull out the molded body upward from the outer mold.

As described above, in this state (i.e., in a state wherein the upper mold is stacked on the upper surface of the outer mold), the entirety of the lower opening plane of the second hole in the upper mold is included in the opening plane of the first hole in the outer mold (e.g., for the first and second holes with coaxially arranged circular cross sections, the diameter of the circular cross section of the first hole is larger than the diameter of the circular cross section of the second hole). Accordingly, a step portion is formed at the connection portion of the shape of the molding space and the shape corresponding to the slurry passing gap in the integral shape. Even though a force to pull out the molded body upward from the outer mold acts on the molded body, the step portion is locked on the lower surface of the upper mold (the portion around the outside of the lower opening of the second hole). The molded body in the integral shape is prevented from being pulled out from the outer mold. In other words, when the inner mold is pulled out upward from the molded body, the molded body can surely remain in the outer mold. In this point, it can be said that the slurry passing gap functions as a so-called stripper.

In the forming mold according to the present invention, it is suitable that slits that extends in a vertical direction and leads to the upper and lower openings of said second hole are formed on the inner wall of said second hole. Thereby, in the slurry passing gap (e.g., an annular gap, as described above), portions with a wide gap clearance corresponding to said slits and portions with a narrow gap clearance not corresponding to said slits can be formed. As a result, while the above function as a stripper is surely maintained by virtue of the existence of said portions with a narrow gap clearance not corresponding to said slits, the movement (falling) of the slurry from the slurry reservoir to the molding space can be made easy by virtue of the existence of said portions with a wide gap clearance corresponding to said slits. When the movement (falling) of the slurry from the slurry reservoir to the molding space becomes easy, the time period required to fill up the molding space with the slurry can be shortened, and further the occurrence of portions where the slurry cannot be filled in the molding space can be suppressed.

In the forming mold according to the present invention, it is suitable that at least one of said outer mold, said upper mold, and said inner mold is made of resin. In particular, it is more preferable that said outer mold is made of fluoropolymer. Hereinafter, it may be referred to as "release" that a mold is removed from a molded body.

When the molding surface (surface to contact a molding space) of a forming mold is made of metal, in many cases, the molding surface is previously coated with a mold release agent such that a part of the surface of a molded body will not be damaged upon release (specifically, the residue of the molded body will not adhere to and remains on the molding surface). On the contrary, when the molding surface of a forming mold is made of resin (especially, fluoropolymer), as compared with the molding surface is made of metal (without a mold release agent), the contact angle of a slurry to the molding surface increases, and thereby the residue of a molded body becomes more unlikely to adhere to and remains on the molding surface upon release. Accordingly, without using a mold release agent, the damage of the surface of the molded body upon release can be suppressed. In addition, even if the residue of the molded body adhered to and remained on the molding surface, the residue can be easily removed.

Also, it is suitable that the forming mold according to the present invention comprises a mechanism to move at least said upper mold and said inner mold in parallel, separately and independently, as well as only in a vertical direction. The mechanism can be easily configured with a so-called slider. In the forming mold according to the present invention, it is necessary to move the upper mold and the inner mold in parallel and in a vertical direction to the outer mold upon the assembly of the forming mold or upon release. Therefore, the above configuration can make the assembly of a forming mold or the release sure and easy.

In addition, a method according to the present invention for producing a ceramic molded body using the forming mold according to the present invention includes:

a pouring step to pour said slurry into said slurry reservoir such that the upper opening of said second hole is blocked with said slurry, in a state wherein the posture of said forming mold in said assembly-completed state is maintained in a first posture (e.g., horizontal);

a filling step, after said pouring step, to (make said poured slurry fall and) fill said molding space with said poured slurry through a space (i.e., the slurry passing gap) formed between the inner wall of said second hole and the surface of said insert, in a state wherein the upper opening of said second hole is blocked with said poured slurry while the posture of said forming mold in said assembly-completed state is maintained in said first posture; and a hardening and removing step, after said filling step, to harden the slurry filled in said molding space and remove said upper mold and said outer mold after removing said inner mold from the molded body after said hardening to obtain said molded body.

When said molding space is confined air-tightly, except for the portion corresponding (connecting) to the slurry passing gap, it is suitable that said filling step includes:

a negative pressure adjusting step to adjust the ambient pressure of said forming mold from an atmospheric pressure (air pressure) to a negative pressure lower than an atmospheric pressure, in a state wherein the upper opening of said second hole is blocked with said poured slurry while the posture of said forming mold in said assembly-completed state is maintained in said first posture; and an atmospheric pressure returning step, after said negative pressure adjusting step, to return the ambient pressure of said forming mold from said negative pressure to an atmospheric pressure, in a state wherein the upper opening of said second hole is blocked with said poured slurry while the posture of said forming mold in said assembly-completed state is maintained in said first posture. Namely, throughout the pouring step and the filling step, the posture of the forming mold is maintained in said first posture (e.g., horizontal).

In accordance with the above, after the slurry is poured into the slurry reservoir by the execution of the pouring step, the ambient pressure of the slurry reservoir is adjusted to said negative pressure by the execution of the negative pressure adjusting step. As a result, the air within the molding space which is still maintained at an atmospheric pressure is sucked toward the ambience of the forming mold through the slurry passing gap and the inside of the slurry blocking the upper opening of the second hole, and thereby the pressure in the molding space is also adjusted to said negative pressure. Thereafter, by the execution of the atmospheric pressure returning step, the ambient pressure of the slurry reservoir is returned to an atmospheric pressure. At this time, the inside of the molding space is still maintained at said negative pressure. As a result, a differential pressure is generated between the ambience of the slurry reservoir and the inside of the molding space, and this differential pressure functions as a driving force to positively make the slurry, which (is retained in the slurry reservoir and) is blocking the upper opening of the second hole, fall and flow into the molding space through the slurry passing gap.

In other words, the slurry retained in the slurry reservoir falls and flows toward the molding space through the slurry passing gap, not only by the action of gravity, but also by the action of said differential pressure. Thereby, the occurrence of portions where the slurry cannot be filled in the molding space can be more surely suppressed.

When the viscosity of the slurry is small, it is possible to make the slurry fall and flow toward the molding space by utilizing only the action of gravity, without utilizing the action of said differential pressure. On the other hand, when the viscosity of the slurry is large, it is difficult to make the slurry fall and flow toward the molding space by utilizing only the action of gravity. On the contrary, when the action of said differential pressure is also utilized as described above, even if the viscosity of the slurry is large, it is possible to surely fill the whole molding space with the slurry.

In the a method according to the present invention for producing a ceramic molded body, the negative pressure adjusting step (from an atmospheric pressure to a negative pressure) is executed in a state wherein the upper opening of the second hole is blocked with the slurry retained in the slurry reservoir. Accordingly, as described above, the air within the molding space is evacuated outside through the inside of the slurry blocking the upper opening of the second hole. Due to this, there is a possibility that air bubbles get mixed into the slurry. The mixed air bubbles can be dissolved in the slurry. When the viscosity of the slurry is large, the dissolved air bubbles are unlikely to be evacuated outside the slurry. In order to prevent the air bubbles from getting mixed into the slurry as described above, the following manner can be supposed.

Namely, another method according to the present invention for producing a ceramic molded body includes:
a pouring step to pour said slurry into said slurry reservoir such that the upper opening of said second hole is not blocked with said slurry, in a state wherein the posture of said forming mold in said assembly-completed state is maintained in a first posture;

a filling step, after said pouring step, to fill said molding space with said poured slurry through a space formed between the inner wall of said second hole and the surface of said insert, in a state wherein the posture of said forming mold in said assembly-completed state has been changed from said first posture to a second posture and the upper opening of said second hole is blocked with said poured slurry; and a hardening and removing step, after said filling step, to harden the slurry filled in said molding space and remove said upper mold and said outer mold after removing said inner mold from the molded body after said hardening to obtain said molded body.

More specifically, when said molding space is confined air-tightly, except for the portion corresponding (connecting) to the slurry passing gap, it is suitable that said filling step includes:

a negative pressure adjusting step to adjust the ambient pressure of said forming mold from an atmospheric pressure to a negative pressure lower than an atmospheric pressure, in a state wherein the upper opening of said second hole is not blocked with said poured slurry while the posture of said forming mold in said assembly-completed state is maintained in said first posture;

a posture changing step, after said negative pressure adjusting step, to change the posture of said forming mold in said assembly-completed state from said first posture to said second posture to block the upper opening of said second hole with said poured slurry, in a state wherein the ambient pressure of said forming mold is maintained at said negative pressure; and an atmospheric pressure returning step, after said posture changing step, to return the ambient pressure of said forming mold from said negative pressure to an atmospheric pressure, in a state wherein the upper opening of said second hole is blocked with said poured slurry while the posture of said forming mold in said assembly-completed state is maintained in said second posture. Namely, during said filling step, the posture of the forming mold is changed from the first posture to the second posture.

Said first posture may be a posture slanted from a horizontal direction and said second posture may be horizontal, and said first posture may be horizontal and said second posture may be a posture slanted from a horizontal direction.

In this manner, the negative pressure adjusting step (from an atmospheric pressure to a negative pressure) is executed in a state wherein the upper opening of the second hole is not blocked with the slurry retained in the slurry reservoir. Accordingly, a situation where the air within the molding space is evacuated outside through the inside of the slurry retained in the slurry reservoir will not occur. As a result, it is possible to prevent the air bubbles from getting mixed into the slurry.

As the above, the case where the negative pressure adjusting step (from an atmospheric pressure to a negative pressure) is executed in a state wherein the upper opening of the second hole is not blocked with the slurry after the execution of the pouring step (to pour the slurry into the slurry reservoir) was described. On the contrary, in accordance with the manner that will be described below, even though the pouring step (to pour the slurry into the slurry reservoir) is executed after the execution of the negative pressure adjusting step (from an atmospheric pressure to a negative pressure) (in a state wherein the upper opening of the second hole is not blocked with the slurry), a situation where the air within the molding space is evacuated outside through the inside of the slurry retained in the slurry reservoir can be avoided. As a result, similarly to the above, it is possible to prevent the air bubbles from getting mixed into the slurry.

Namely, another method according to the present invention for producing a ceramic molded body includes:

a negative pressure adjusting step to adjust the ambient pressure of said forming mold in said assembly-completed state from an atmospheric pressure to a negative pressure lower than an atmospheric pressure;

a pouring step, after said negative pressure adjusting step, to pour said slurry into said slurry reservoir, in a state wherein the ambient pressure of said forming mold is maintained at said negative pressure;

an atmospheric pressure returning step, after said pouring step, to return the ambient pressure of said forming mold from said negative pressure to an atmospheric pressure, in a state wherein the upper opening of said second hole is blocked with said poured slurry; and a hardening and removing step, after said atmospheric pressure returning step, to harden the slurry filled in said molding space and remove said upper mold and said outer mold after removing said inner mold from the molded body after said hardening to obtain said molded body.

More specifically, in said negative pressure adjusting step, the ambient pressure of said forming mold is adjusted to said negative pressure in a state wherein the posture of said forming mold in said assembly-completed state is maintained in a first posture, and in said pouring step, said slurry is poured into said slurry reservoir such that the upper opening of said second hole is blocked with said slurry in a state wherein the posture of said forming mold in said assembly-completed state is maintained in said first posture while the ambient pressure of said forming mold is maintained at said negative pressure, and in said atmospheric pressure returning step, the ambient pressure of said forming mold is returned from said negative pressure to an atmospheric pressure in a state wherein the upper opening of said second hole is blocked with said poured slurry while the posture of said forming mold in said assembly-completed state is maintained in said first posture. In this case, throughout the negative pressure adjusting step, the pouring step, and the atmospheric pressure returning step, the posture of said forming mold is maintained in said first posture. In this case, it is suitable that said first posture is horizontal.

Alternatively, in said negative pressure adjusting step, the ambient pressure of said forming mold is adjusted to said negative pressure in a state wherein the posture of said forming mold in said assembly-completed state is maintained in a first posture, and in said pouring step, said slurry is poured into said slurry reservoir such that the upper opening of said second hole is not blocked with said slurry in a state wherein the posture of said forming mold in said assembly-completed state is maintained in said first posture while the ambient pressure of said forming mold is maintained at said negative pressure, and thereafter the posture of said forming mold in said assembly-completed state is changed from said first posture to a second posture and the upper opening of said second hole is blocked with said poured slurry, and in said atmospheric pressure returning step, the ambient pressure of said forming mold is returned from said negative pressure to an atmospheric pressure in a state wherein the upper opening of said second hole is blocked with said poured slurry while the posture of said forming mold in said assembly-completed state is maintained in said second posture. In this case, during said filling step, the posture of the forming mold is changed from said first posture to said second posture. In this case, said first posture may be a posture slanted from a horizontal direction and said second posture may be horizontal, and said first posture may be horizontal and said second posture may be a posture slanted from a horizontal direction.

In the production method according to the present invention, it suitable that the contact angle of said ceramic slurry to the inner wall of said first hole is 60° or more. Thereby, as described above, upon the release of the outer mold, the residue of the molded body becomes more unlikely to adhere to and remains on the molding surface of the outer mold. Accordingly, the damage of the surface of the molded body upon the release of the outer mold can be suppressed. In addition, even if the residue of the molded body adhered to and remained on the molding surface of the outer mold, the residue can be easily removed.

As described above, it is preferable that the outer mold itself (or the molding surface of the outer mold) consists of fluoropolymer. Thereby, without using a mold release agent, the contact angle of said ceramic slurry to the inner wall of said first hole can be 60° or more. When a mold release agent is coated on the molding surface, as a mold release agent, a fluorine compound mold release agent or wax can be used. When a fluorine compound mold release agent is used, similarly to the case where the outer mold itself (or the molding surface of the outer mold) consists of fluoropolymer, very good release property can be obtained. When wax is used, an outer mold can be released from a molded body by heating them and melting the wax to separate the outer mold from the molded body. As a method for coating a mold release agent, dipping, spraying, brushing and the like are exemplified. Among them, dipping is suitable since it is easy to uniform the film thickness of the coated mold release agent.

In addition, when a surface treatment is performed on the molding surface instead of coating a mold release agent, as the surface treatment, a fluoropolymer coating can be used. The fluoropolymer coating may be performed directly on the molding surface of a mold, or may be performed in a state wherein a predetermined treatment such as undercoating, plating, alumite treatment or the like has been previously performed.

Further, in the production method according to the present invention, it is suitable that said hardening and removing step includes a primary hardening step to harden the ceramic slurry filled in said molding space by a polymerization reaction, an inner mold removing step to remove said inner mold from the molded body after said primary hardening step, a secondary hardening step to harden the molded body after said inner mold removing step by the volatilization of said disperse medium contained in the molded body, an upper mold removing step to remove said upper mold from the molded body after said inner mold removing step and before or after said secondary hardening step, and an outer mold removing step to remove said outer mold from the molded body after said secondary hardening step.

Thereby, in the primary hardening step, the ceramic slurry filled in said molding space is hardened (mainly) by a polymerization reaction. Said polymerization reaction is suitably an urethane reaction. By a polymerization reaction such as an urethane reaction itself, a shrinkage hardly occurs. In addition, since the primary hardening step is executed in the molding space enclosed by the outer mold and the inner mold (i.e., in a closed space), the volatilization of a disperse medium during the primary hardening step hardly occurs. Accordingly, a shrinkage due to the volatilization of a disperse medium (i.e., a decrease in number of the molecules) also hardly occurs.

As described above, at a stage when the primary hardening step finishes, a shrinkage of the molded body hardly occurs. In other words, the primary hardening step is a step to change the ceramic slurry to a solid object (i.e., a state wherein the molded body can keep a certain shape by itself, although the molded body is moistened with a disperse medium) while suppressing the shrinkage of the molded body.

Thereby, in the primary hardening step, the occurrence of such a problem that a damage such as crack or the like is generated on the molded body by a tensile stress acting on the molded body due to the shrinkage of the molded body enclosing the outer surface of the inner mold can be suppressed. Accordingly, in the inner mold removing step executed after the primary hardening step, it becomes easy to remove the inner mold from the molded body without any damage on the molded body.

In the secondary hardening step executed after the inner mold removing step, the molded body is hardened (mainly) by the volatilization of a disperse medium contained in the molded body. The secondary hardening step is executed in a state wherein the inner mold has been removed from the molded body, i.e., in a state wherein a part of the molded body is opened (exposed outside). Accordingly, unlike the above-described primary hardening step, the volatilization of a disperse medium is remarkable during the secondary hardening step. Accordingly, a shrinkage due to the volatilization of a disperse medium (i.e., a decrease in number of the molecules) remarkably occurs. In addition, also during the secondary hardening step, the polymerization reaction keeps on proceeding.

As described above, at a stage when the secondary hardening step finishes, the shrinkage of the molded body is remarkable. In other words, the secondary hardening step is a step to positively shrink the molded body and to further harden the molded body. However, even after the secondary hardening step, the (unfired) molded body made by a gel cast method is fragile (with little flexibility), and its strength is significantly small as compared with plastics or the like.

Thereby, in the secondary hardening step, the molded body is (or becomes easier to be) released from the outer mold through the shrinkage of itself. Accordingly, in the outer mold removing step executed after the secondary hardening step, the outer mold can be removed from the molded body. The upper mold removing step may be executed before or after the outer mold removing step as long as after the inner mold removing step.

It is preferred that a heating step to heat the molded body after said primary hardening step is included after said primary hardening step and before said inner mold removing step. Thereby, the molded body can be further solidified before the inner mold removing step and, as a result, in the inner mold removing step, the inner mold can be furthermore easily removed from the molded body.

In addition, in the method according to the present invention for producing a ceramic molded body using the forming mold according to the present invention, it is suitable that a forming mold, wherein plural molding spaces having a same shape are formed, is used. Thereby, plural ceramic molded body having a same shape are obtained by once executing the above-described production method.

BEST MODE FOR CARRYING OUT THE INVENTION

Figure 1:
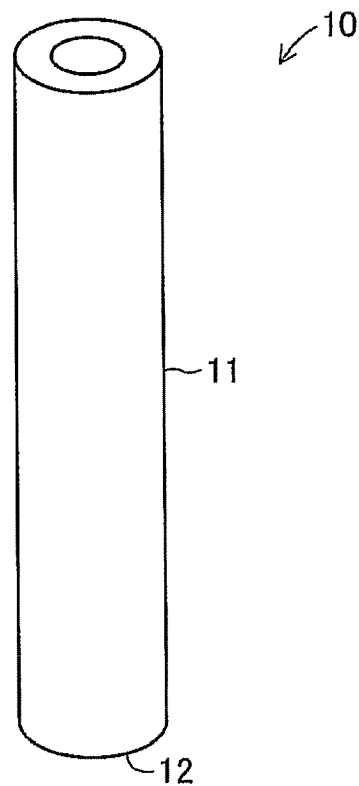
FIG. 1 is a perspective view of a ceramic molded body manufactured by a method for producing a ceramic molded body by utilizing a gel cast method according to an embodiment of the present invention.

Referring to the drawings, a forming mold according to an embodiment of the present invention, and a method for producing a ceramic molded body using the forming mold will be described below.

Figure 2:
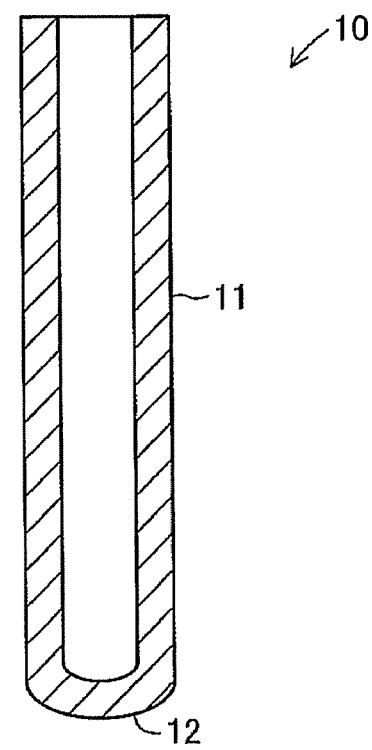
FIG. 2 is a schematic sectional view of a ceramic molded body manufactured by a method for producing a ceramic molded body by utilizing a gel cast method according to an embodiment of the present invention.

FIG. 1 and FIG. 2 are a perspective view of a Ceramic Molded Body 10 manufactured by a method for producing a ceramic molded body by utilizing a gel cast method according to an embodiment of the present invention, and a schematic sectional view thereof. The Ceramic Molded Body 10 presents a very long and thin, circular cylindrical shape with a bottom at one end, and consists of a Circular Cylindrical Portion 11 with a hollow portion (concaved portion) and a Bottom Portion 12 placed at one end of the Circular Cylindrical Portion 11. A fired body obtained by firing the Molded Body 10 can be utilized as, for example, an electrode for generating plasma or the like.

Figure 3:
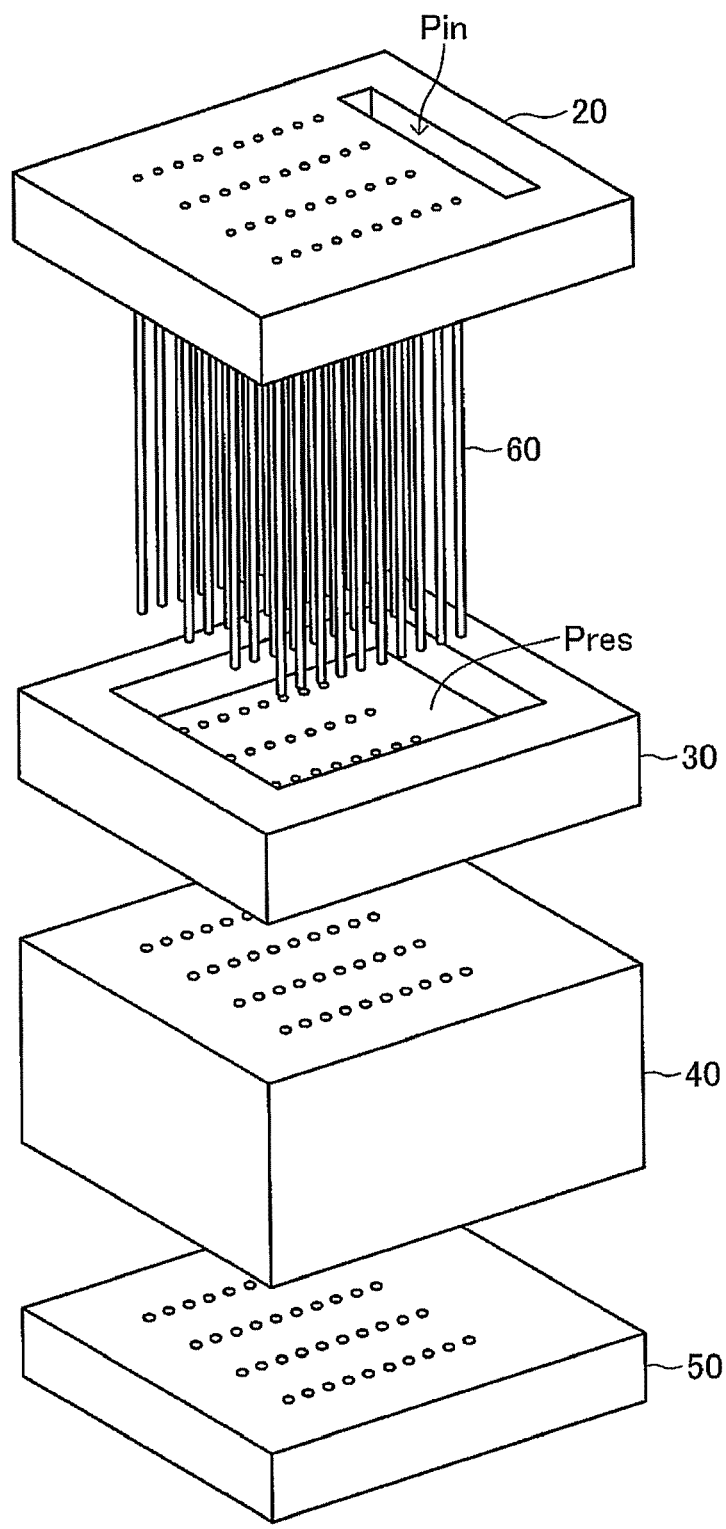
FIG. 3 is an exploded perspective view of a forming mold used for producing a ceramic molded body.
Figure 4:
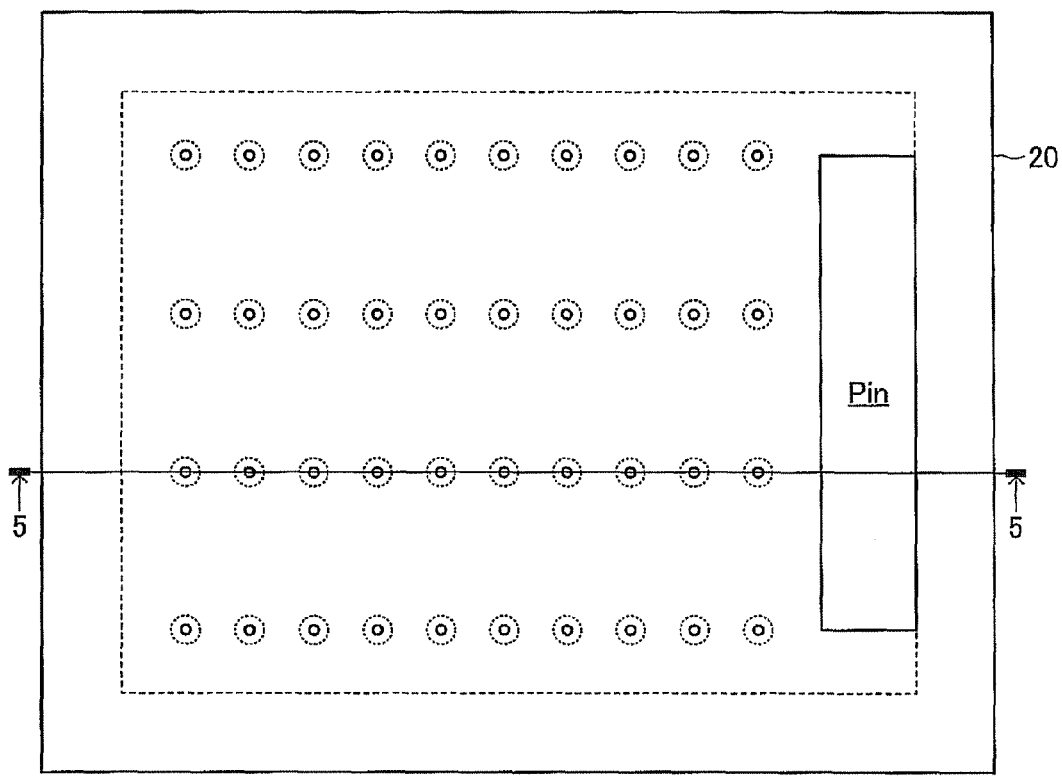
FIG. 4 is a plan view of a forming mold used for producing a ceramic molded body.
Figure 5:
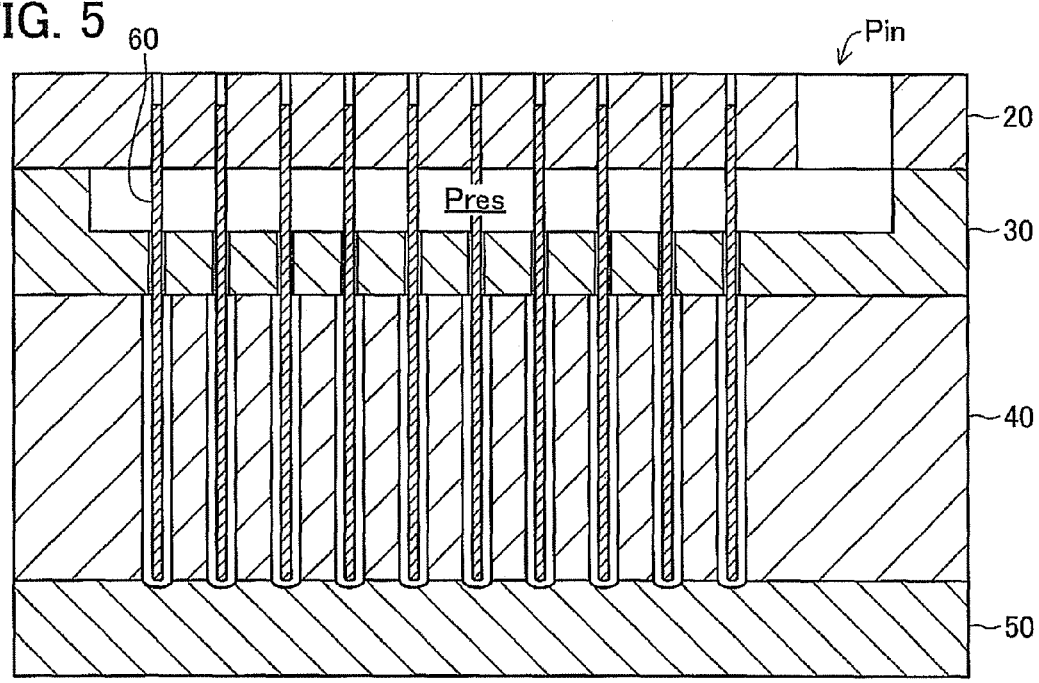
FIG. 5 is a longitudinal sectional view of the forming mold taken along the line 5-5 in FIG. 4.

Referring to FIG. 3 to FIG. 18, an embodiment of a method for producing the Ceramic Molded Body 10 according to the present invention will be described below. First, a forming mold used in the production method is described. FIG. 3, FIG. 4, and FIG. 5 are an exploded perspective view of a forming mold used for producing a Ceramic Molded Body 10, a plan view thereof, and a longitudinal sectional view of the forming mold in the assembly-completed state, taken along the line 5-5 in FIG. 4, respectively. As shown in FIG. 3 to FIG. 5, by using the forming mold, 40 pieces of Ceramic Molded Bodies 10 can be simultaneously manufactured.

The forming mold comprises a Pin-holder 20 in a rectangular shape, an Upper Mold 30, an Outer Mold 40, and a Lower Mold 50, as well as (40 pieces of) very long and thin, cylindrical columnar Pins 60. The (40 pieces of) Pins 60 are previously and integrally fixed by means of a well-known method (such as fit-fixing, screw-fixing) such that the Pins 60 are arranged in parallel with one another in a vertical direction and in a matrix state(10×4) in a horizontal direction. The integral body comprising the Pin-holder 20 and the (40 pieces of) Pins 60 corresponds to said "inner mold", and the (40 pieces of) Pins 60 correspond to the "insert" of the "inner mold". Also, the Upper Mold 30 corresponds to said "upper mold", and the Outer Mold 40 corresponds to said "outer mold".

In the present example, only the Outer Mold 40 consists of fluoropolymer, and the Pin-holder 20, the Upper Mold 30, the Lower Mold 50, and the (40 pieces of) Pins 60 consist of aluminum alloy (e.g., duralumin). In addition, the Pin-holder 20, Upper Mold 30, and Lower Mold 50 may consist of fluoropolymer, as well. However, it is preferable that the very long Pins 60 with extremely low rigidity consist of aluminum alloy, cemented carbide, or carbon steel, although they may consist of fluoropolymer.

A ceramic slurry prepared as will be described later is poured from a Casting Opening Pin formed in the Pin-holder 20 into a Slurry Reservoir Pres which is a rectangular concave portion formed on the upper surface of the Upper Mold 30, and thereafter filled into the portion located below the Slurry Reservoir Pres, non-hatched portions in FIG. 5. Although the following explanation will be focused on one of the 40 pieces of Ceramic Molded Bodies 10 for the sake of convenience in explanation, it applies to other pieces as well.

Figure 6:
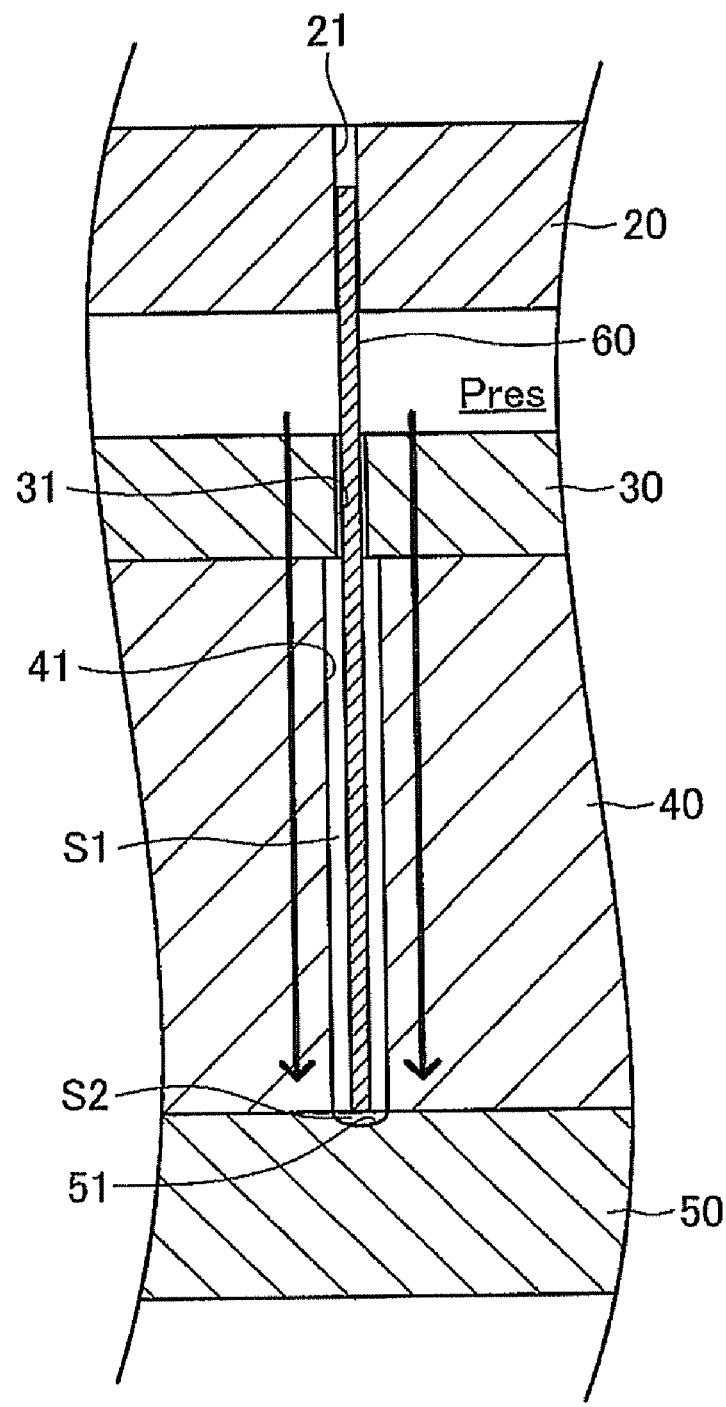
FIG. 6 is an enlarged partial view of FIG. 5, showing around a molding space.

As shown in FIG. 6 which is a partial view of FIG. 5, in the assembly-completed state, the Lower Mold 50, the Outer Mold 40, the Upper mold 30, and the "inner mold" (Pin-holder 20) are stacked and fixed in this order. In the assembly-completed state, the (40) circular cylindrical (cylindrical columnar) First Holes 41 passing through the Outer Mold 40 in a vertical direction and the (40) circular cylindrical (cylindrical columnar) Second Holes 31 passing through the Upper Mold 30 are formed and arranged in a matrix state (10×4) in a horizontal direction such that each of the (40 pieces of) Pins 60 coaxially passes through the corresponding First Hole 41 and Second Hole 31. Further, in the assembly-completed state, (40 of) Concave Portions 51 are formed on the upper surface of the Lower Mold 50 and arranged in a matrix state (10×4) in a horizontal direction such that each of the (40 pieces of) Pins 60 is located coaxially with the corresponding Concaved Potion 51.

In the assembly-completed state, the ceramic slurry filled into the Space S1 sandwiched between the lateral surface of the Pin 60 and the inner wall of the First Hole 41 later becomes the Circular Cylindrical Portion 11 of the Ceramic Molded Body 10, and the ceramic slurry filled into the Space S2 sandwiched between the apical surface of the Pin 60 and the inner wall of the Concave Portion 51 later becomes the Bottom Portion 12 of the Ceramic Molded Body 10. Namely, the space obtained by uniting the Space S1 and the Space S2 (S1+S2) corresponds to said molding space for forming the Ceramic Molded Body 10.

Figure 7:
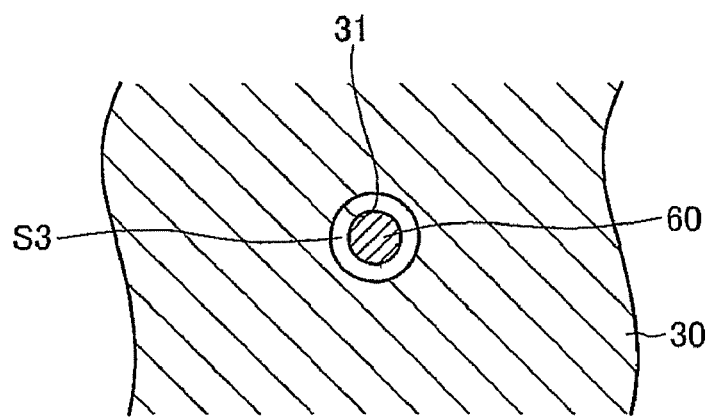
FIG. 7 is an enlarged partial view of FIG. 6, showing around a second hole.
Figure 7:
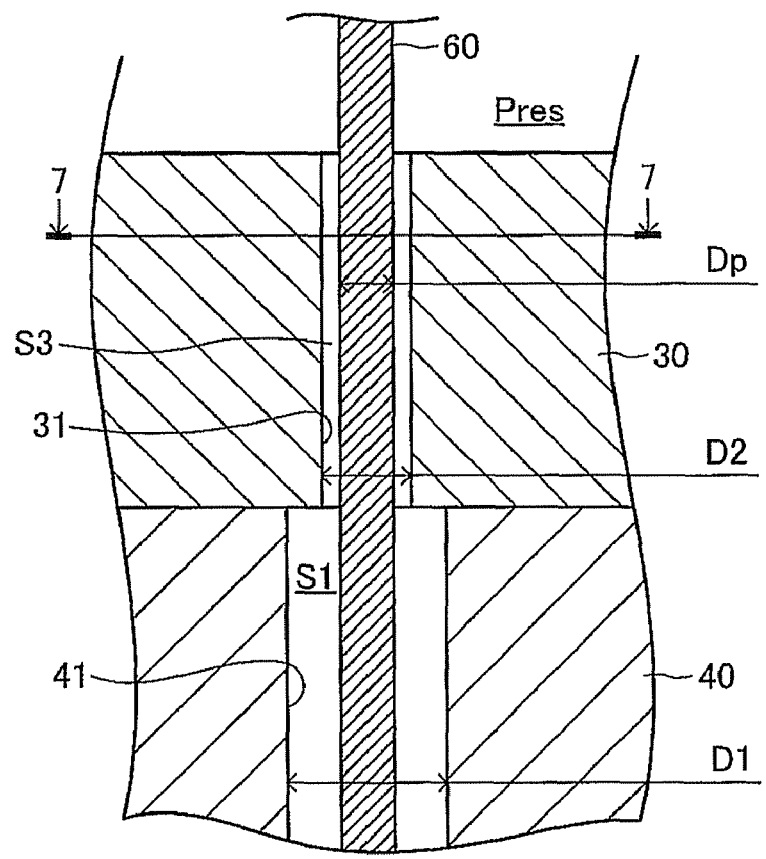

As shown in FIG. 7 which is an enlarged view of the vicinity of the Second Hole 31 in FIG. 6, the Inner Diameter D1 of the First Hole 41 is larger than the Inner Diameter D2 of the Second Hole 31. As a result, in the assembly-completed state, the lower opening of the Second Hole 31 and the upper opening of the First Hole 41 are connected such that the entirety of the lower opening of the Second Hole 31 is included in the upper opening of the First Hole 41.

The Diameter Dp of the Pin 60 is somewhat smaller than D2. Accordingly, in the assembly-completed state, an annular narrow space (minute gap) sandwiched between the inner wall of the Second Hole 31 and the lateral surface of the Pin 60 is formed. Hereinafter, the annular space is referred to as a "Slurry Passing Gap S3".

The upper end of the Slurry Passing Gap S3 is connected with the upper opening of the Second Hole 31, and the lower end of the Slurry Passing Gap S3 is connected with the Space S1. Namely, the Slurry Reservoir Pres is connected with the molding space (S1+S2) through the Slurry Passing Gap S3. Accordingly, the ceramic slurry poured into the Slurry Reservoir Pres can fall and flow toward the molding space (S1+S2) through the Slurry Passing Gap S3 by the action of gravity and the like, as shown by the bold black arrow in FIG. 6. Further, the molding space (S1+S2) is air-tightly confined by the Upper Mold 30, the Outer Mold 40, and the Lower Mold 50, except for the portion corresponding (connecting) to the Slurry Passing Gap S3.

Figure 18:
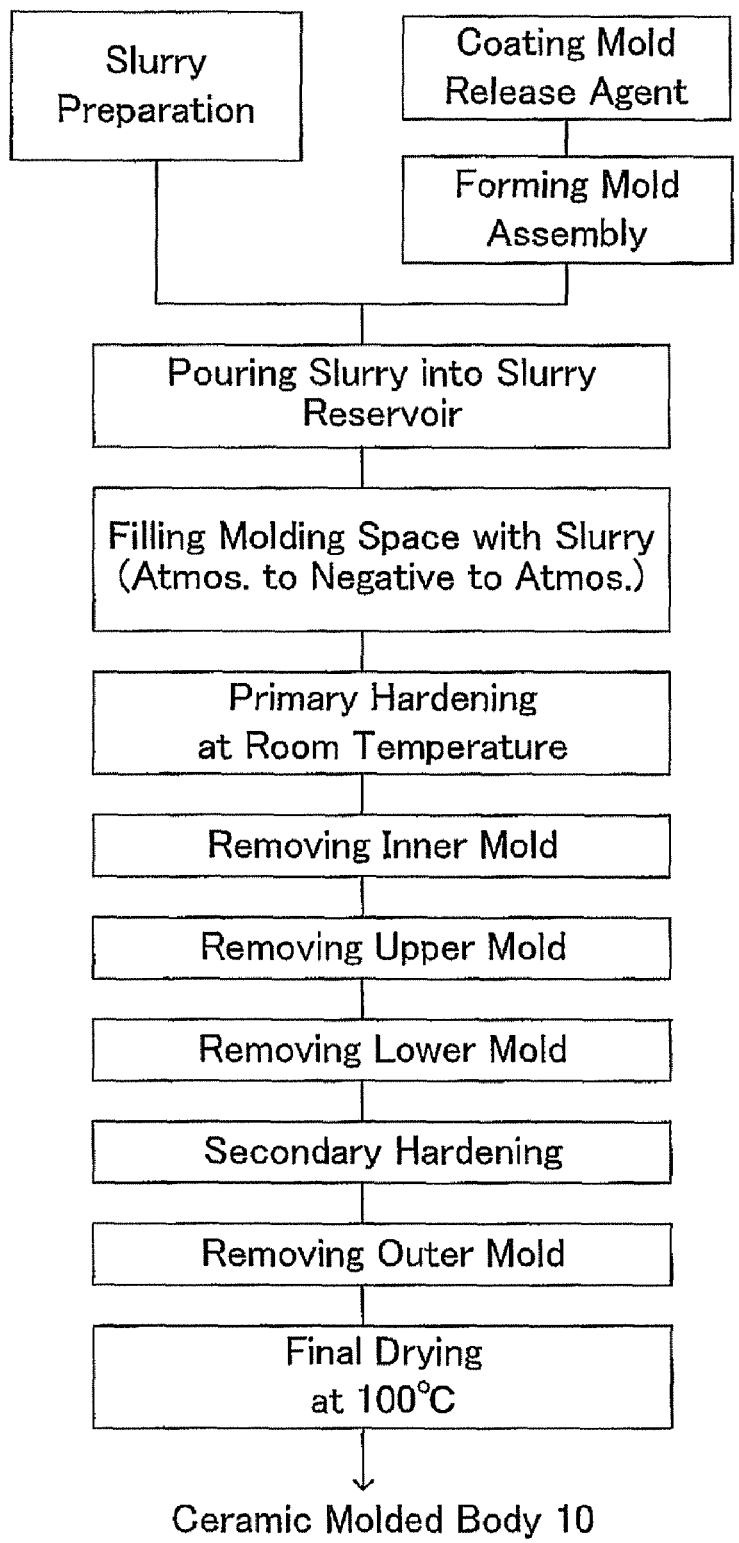
FIG. 18 is a flow chart showing a procedure for a method for producing a ceramic molded body according to an embodiment of the present invention.

Next, a specific method for producing the Ceramic Molded Body 10 will be described. FIG. 18 is a flow chart showing a procedure for this method.

(Coating of Mold Release Agent)

First, the Upper Mold 30, the Lower mold 50, and the molding surface (the surface which the ceramic slurry contacts) of the Pins 60 are coated with a fluorine compound mold release agent dispersed or dissolved in an organic solvent as the mold release agent. The coating method can be properly chosen from well-known manners. In the present example, it is desirable to use a spray gun for coating the Upper Mold 30 and the Lower Mold 50. On the other hand, it is desirable to coat the Pins 60 by dipping.

After coating, the organic solvent immediately volatilizes and, as a result, the fluorine compound mold release agent is fixed on the molding surface. Thereby, the contact angle of the ceramic slurry to the molding surface with the fluorine compound mold release agent fixed thereon becomes 60° or more. As described above, the Outer Mold 40 is made of fluoropolymer. Accordingly, without coating any mold release agent, the contact angle of the ceramic slurry to the molding surface of the Outer Mold 40 is 60° or more.

From the above, as will be described later, the residue of the molded body becomes more unlikely to adhere to and remains on the molding surface of the mold when the mold is removed from the molded body (upon release). Accordingly, the damage of the surface of the molded body upon the release of the mold can be suppressed. In addition, even if the residue of the molded body adhered to and remained on the molding surface of the mold, the residue can be easily removed.

(Assembly of Forming Mold)

Figure 8:
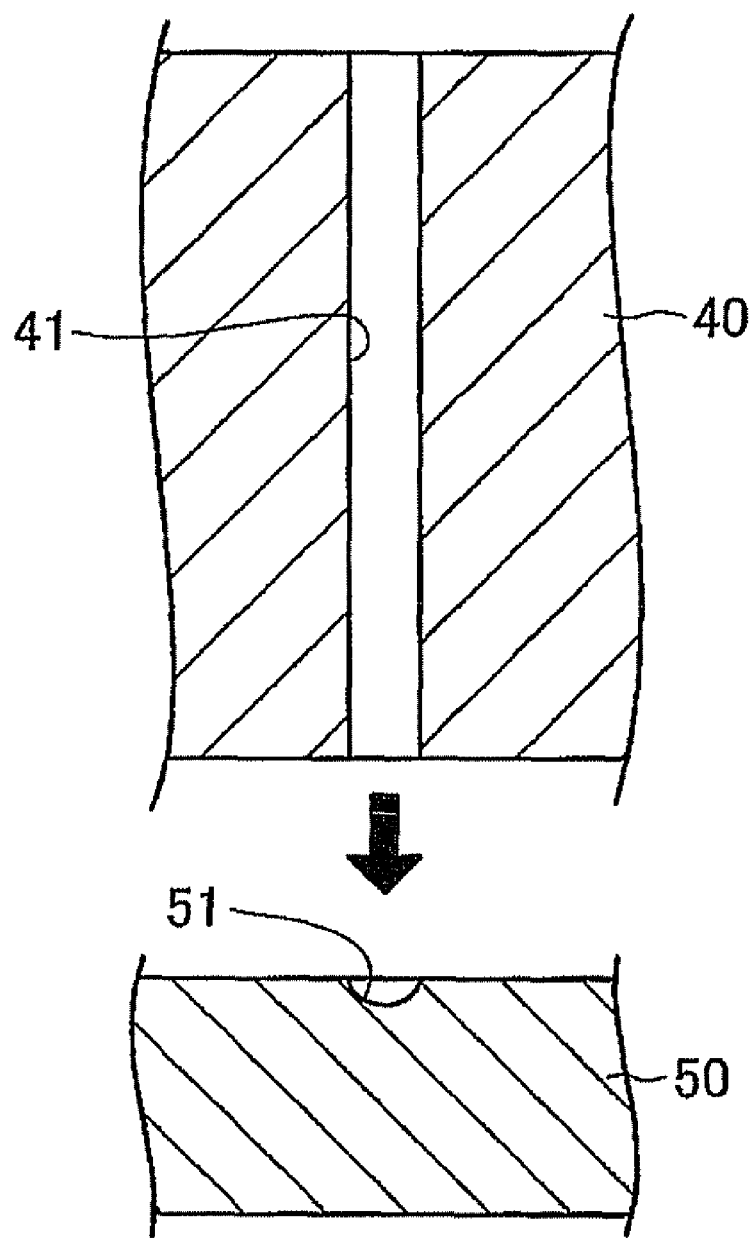
FIG. 8 is a view showing a process to put (stack) an outer mold on an lower mold.
Figure 9:
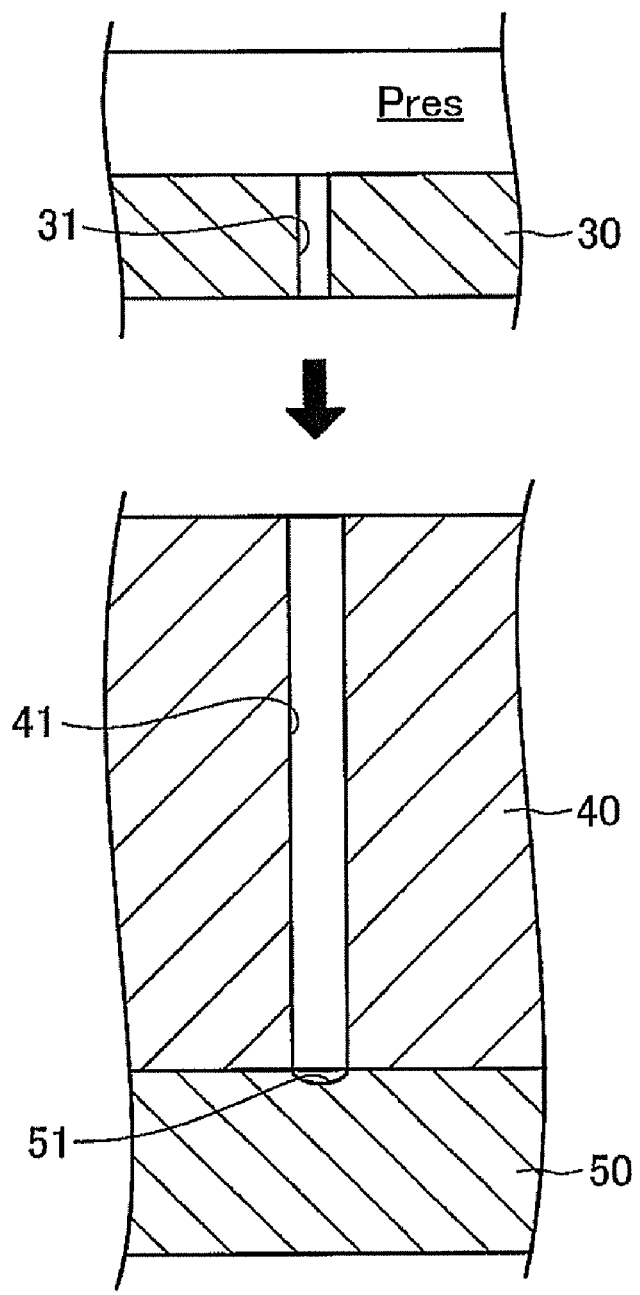
FIG. 9 is a view showing a process to put (stack) an upper mold on an outer mold.
Figure 10:
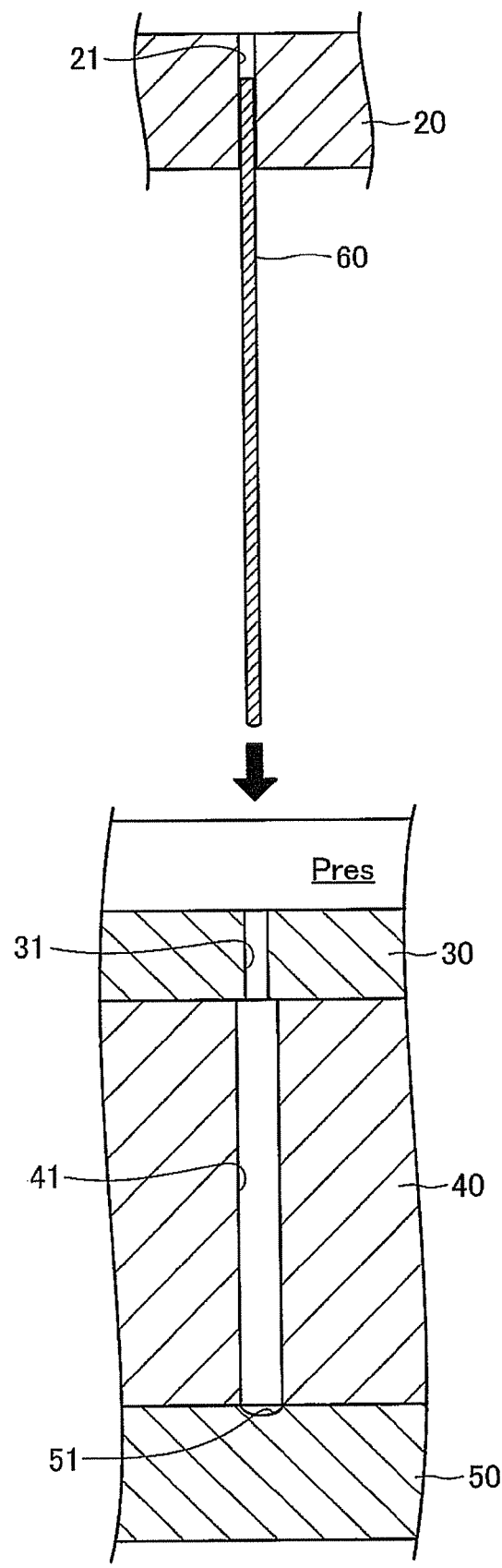
FIG. 10 is a view showing a process to put (stack) a pin-holder having a pin integrally fixed thereon on an upper mold.

Next, the forming mold is assembled. FIG. 8 to FIG. 10 show the procedures. First, as shown in FIG. 8, the Outer Mold 40 is put (stacked) on the Lower Mold 50. Next, as shown in FIG. 9, the Upper Mold 30 is put (stacked) on the Outer Mold 40. Lastly, as shown in FIG. 10, the Pin-holder 20 is put (stacked) on the Upper Mold 30 while inserting each of the (40 pieces of) Pins 60 which have been already integrally fixed in the Pin-holder 20 into the corresponding First Hole 41 and Second Hole 31 from above. Thereby, the assembly of the forming mold is completed, and the forming mold comes into the assembly-completed state (refer to the states shown in FIG. 4 and FIG. 5). Upon the above assembly of the forming mold, the Lower Mold 50, the Outer Mold 40, the Upper Mold 30, and the Pin-holder 20 move separately and independently, as well as only in a vertical direction, by means of a well-known slider (not shown).

(Preparation of Ceramic Slurry)

Next, a ceramic slurry comprising ceramic powder, a disperse medium, a gelling agent, and a catalyst is prepared. In the ceramic slurry, comprising ceramic powder, a disperse medium, and a gelling agent are contained. Also, if needed, a dispersing assistant and a catalyst are contained.

In the present example, as the ceramic slurry, a mixture of 100 weight parts of zirconia powder as ceramic powder, 27 weight parts of a mixture of an aliphatic polyhydric ester and a polybasic acid ester and 0.3 weight parts of ethylene glycol as a disperse medium, 5.3 weight parts of 4,4'-diphenylmethane diisocyanate as a gelling agent, 3 weight parts of polycarboxylic acid series copolymer as a dispersing assistant, and 0.05 weight parts of 6-dimethylamino-1-hexanol as a catalyst is used.

As the ceramic powder, zirconia, alumina, silica, ferrite, barium titanate, silicon nitride, silicon carbide, or the like may be used. As the disperse medium, organic solvents such as aliphatic polyhydric esters, polybasic acid esters, toluene, xylene, methyl ethyl ketone, and the like may be used. As the gelling agent, phenol resin, urethane resin, acrylic resin, or the precursors thereof may be used. As the dispersing assistant, organic compounds such as polycarboxylic acid series copolymers, sorbitan series esters, and the like may be used. As the catalyst, amine compounds such as 6-dimethylamino-1-hexanol and the like may be used.

(Pour of Ceramic Slurry)

Figure 11:
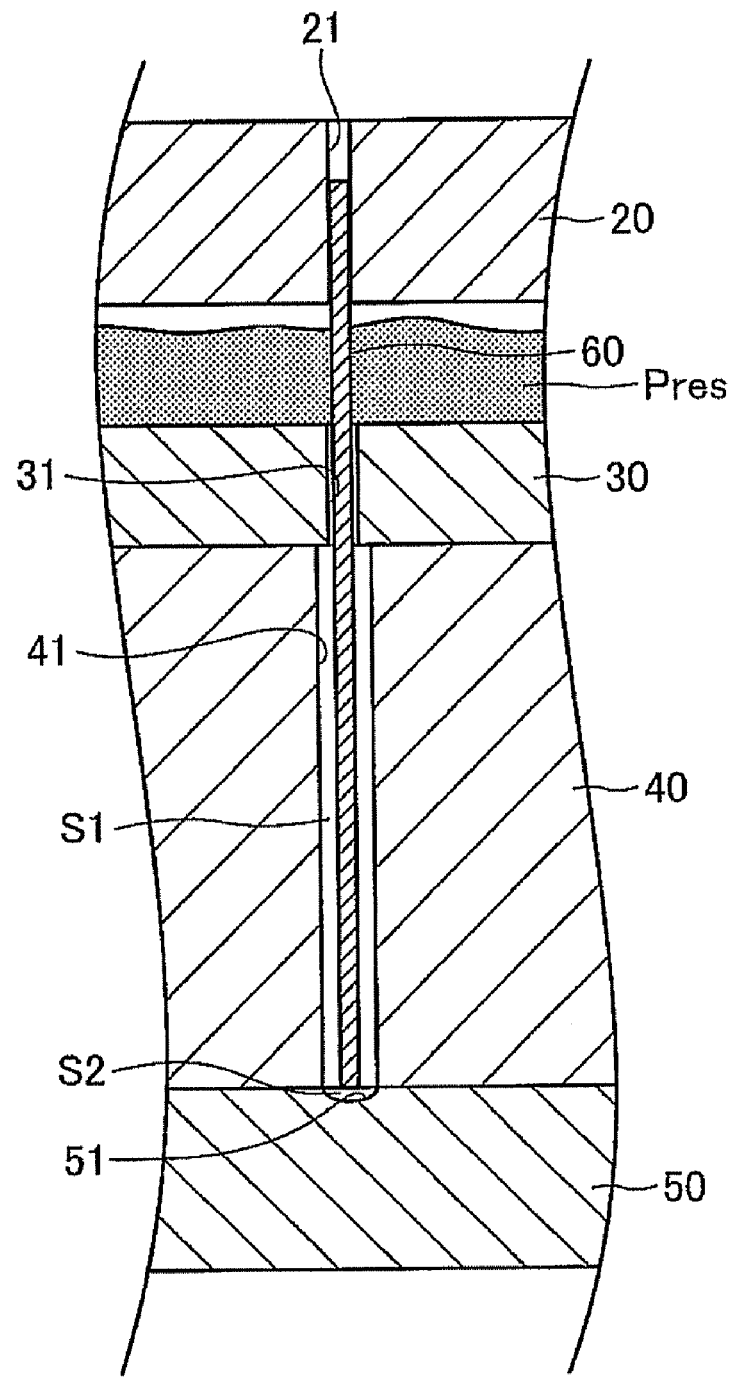
FIG. 11 is a view showing a state wherein a ceramic slurry is retained in a slurry reservoir.

Next, in a state wherein the forming mold in the assembly-completed state is exposed to an atmosphere of air pressure and the posture of the forming mold is maintained horizontal, the ceramic slurry is poured into the Slurry Reservoir Pres. This pour of the ceramic slurry is started immediately after the preparation of the above-described ceramic slurry. As described above, the ceramic slurry is poured from the Casting Opening Pin. The poured ceramic slurry is retained in the Slurry Reservoir Pres, as shown in FIG. 11. This pour of the ceramic slurry is continued until an intended amount of the slurry is retained in the Slurry Reservoir Pres. Thereby, the upper openings of the Second Holes 31 (upper ends of the Slurry Passing Gaps S3, 40 points) are blocked with the ceramic slurry retained in the Slurry Reservoir Pres.

(Filling of Ceramic Slurry)

Next, in a state wherein the posture of the forming mold is maintained horizontal, namely in a state wherein the upper openings of the Second Holes 31 are blocked with the ceramic slurry retained in the Slurry Reservoir Pres, the ceramic slurry retained in the Slurry Reservoir Pres is filled into the (40) molding spaces (S1+S2) (in a same shape). The ceramic slurry retained in the Slurry Reservoir Pres can fall and flow toward the molding space (S1+S2) through the Slurry Passing Gap S3 (refer to FIG. 7) by virtue of the action of gravity. However, as described above, the Slurry Passing Gap S3 is a minute gap. Accordingly, only by virtue of the action of gravity, it is difficult for the ceramic slurry to pass through the Slurry Passing Gap S3, and therefore it is difficult to fall toward the molding space.

In the present example, as shown in FIG. 11, in a state wherein the ceramic slurry retained in the Slurry Reservoir Pres does not (at all or does hardly) fall and flow toward the molding space (S1+S2), the ambient pressure of the forming mold is adjusted to a predetermined negative pressure lower than an atmospheric pressure by utilizing a well-known negative pressure generation apparatus (housing the forming mold in a vacuum chamber) or the like.

Immediately after the ambient pressure of the forming mold is adjusted to the predetermined negative pressure, the pressure in the molding space (S1+S2) still remains at an atmospheric pressure. Thereafter, the air within the molding space (S1+S2) is gradually sucked toward the ambience of the forming mold through the Slurry Passing Gap S3 and the inside of the ceramic slurry blocking the upper opening of the Second Hole 31, and thereby the pressure in the molding space (S1+S2) also gradually decreases to the predetermined negative pressure. The operation to thus maintain the ambient pressure of the forming mold at a predetermined negative pressure is performed for a sufficiently long period until it is observed that the pressure in the molding space (S1+S2) surely decreases to the predetermined negative pressure.

When said "negative pressure" is too large (too close to vacuum), the volatilization of the disperse medium in the slurry occurs, and a void due to the volatilized disperse medium occurs in the molding space (in the slurry). On the other hand, when said "negative pressure" is too small (too close to an atmospheric pressure), a portion, in which the slurry cannot be filled, occurs in the molding space, and a void due to air occurs in the molding space. Namely, taking into account the suppression of the occurrence of the void due to the disperse medium and the suppression of the occurrence of the void due to the air, there is an adequate value in said "negative pressure".

Next, the ambient pressure of the forming mold is returned to an atmospheric pressure again. Immediately after the ambient pressure of the forming mold is returned to an atmospheric pressure, the pressure inside the molding space (S1+S2) is still maintained at the predetermined negative pressure. As a result, a differential pressure is generated between the ambience of the Slurry Reservoir Pres and the inside of the molding space (S1+S2). This differential pressure functions as a driving force to positively make the slurry, which (is retained in the Slurry Reservoir Pres and) is blocking the upper opening of the second hole, fall and flow into the molding space (S1+S2) through the Slurry Passing Gap S3.

Figure 12:
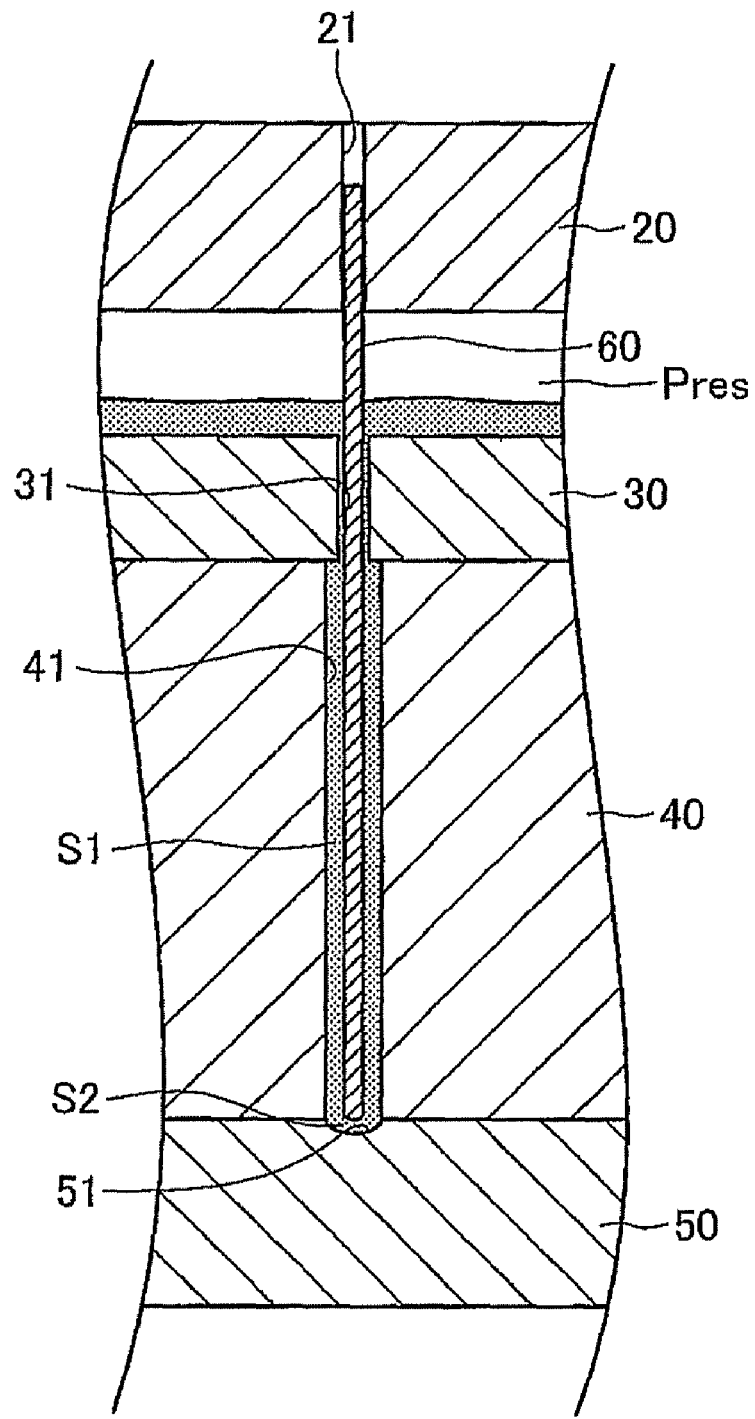
FIG. 12 is a view showing a state wherein a ceramic slurry is filled in a molding space.

Thus, the ambient pressure of the forming mold after the pour of the ceramic slurry is modulated from an atmospheric pressure to a negative pressure, and then further to an atmospheric pressure while the posture of the forming mold is maintained horizontal throughout the pouring step and the filling step, the slurry retained in the Slurry Reservoir Pres falls and flows toward the molding space through the Slurry Passing Gap S3, not only by the action of gravity, but also by the action of said differential pressure. Thereby, as shown in FIG. 12, the whole molding space (S1+S2) can be surely filled with the slurry. In other words, the occurrence of portions where the slurry cannot be filled in the molding space (S1+S2) can be more surely suppressed.

Also, when the action of said differential pressure is also utilized as in the present example, even if the viscosity of the ceramic slurry is large, it is possible to surely fill the whole molding space (S1+S2) with the slurry. In the present example, On the contrary, when making the slurry fall and flow toward the molding space (S1+S2) by utilizing only the action of gravity, without utilizing the action of said differential pressure, a portion, in which the slurry is not filled, can occur in the molding space (S1+S2), and, due to this, a defect can occur in a sintered body obtained by firing the completed Ceramic Molded Body 10.

(Primary Hardening)

Next, the primary hardening step is executed. In the primary hardening step, the forming mold filled with the ceramic slurry is left at ambient room temperature until a predetermined time has passed since the filling of the ceramic slurry into the molding space (S1+S2) is completed. During this period, the ceramic slurry is gradually hardened to a sol, a gel, and then a fragile solid object (a molded body hardened to the extent that the molded body can keep a certain shape by itself although the molded body is moistened with a disperse medium) mainly by an urethane reaction.

As shown in FIG. 12, when the primary hardening step is executed in a state wherein the surplus ceramic slurry remains in the Slurry Reservoir Pres, the molded body comes to be a molded body having an integral shape in which a portion corresponding to the shape of the molding space (S1+S2) (hereinafter, referred to as a "molding-space-portion molded body") and a portion corresponding to the shape of the surplus ceramic slurry in the Slurry Passing Gap S3 and the Slurry Reservoir Pres (hereinafter, referred to as a "surplus molded body") are connected together (hereinafter, referred to as an "integral molded body").

By an urethane reaction itself, the shrinkage of the molded body hardly occurs. In addition, since the molding-space-portion molded body is enclosed by the Upper Mold 30, the Outer Mold 40, and the Lower Mold 50 (i.e., in a closed space), the volatilization of the disperse medium from the molding-space-portion molded body hardly occurs. Accordingly, a shrinkage due to the volatilization of a disperse medium in the molding-space-portion molded body (i.e., a decrease in number of the molecules) also hardly occurs.

As described above, at a stage when the primary hardening step finishes, a shrinkage of the molding-space-portion molded body hardly occurs. In other words, the primary hardening step is a step to change the ceramic slurry to the solid object while suppressing the shrinkage of the molding-space-portion molded body. Accordingly, in the primary hardening step, a problem that a damage such as crack or the like is generated on the molding-space-portion molded body by a tensile stress acting on the molding-space-portion molded body due to the shrinkage of the molding-space-portion molded body enclosing the surface of the Pin 60 is unlikely to occur. When the primary hardening step finishes, the surplus molded body was a papier-mache-like solid object moistened with the disperse medium.

In addition, after the primary hardening step finishes, heating may be performed at a temperature in a range of the melting temperature of the mold release agent or lower. Thereby, the urethane reaction further proceeds, and it becomes easier for the molded body to be harden from the fragile solid object to a solid object with a strength to be able to bear an external force which the molded body suffers during the inner mold removing step, the upper mold removing step, and the lower mold removing step, will be described later.

(Removal of Inner Mold)

Figure 13:
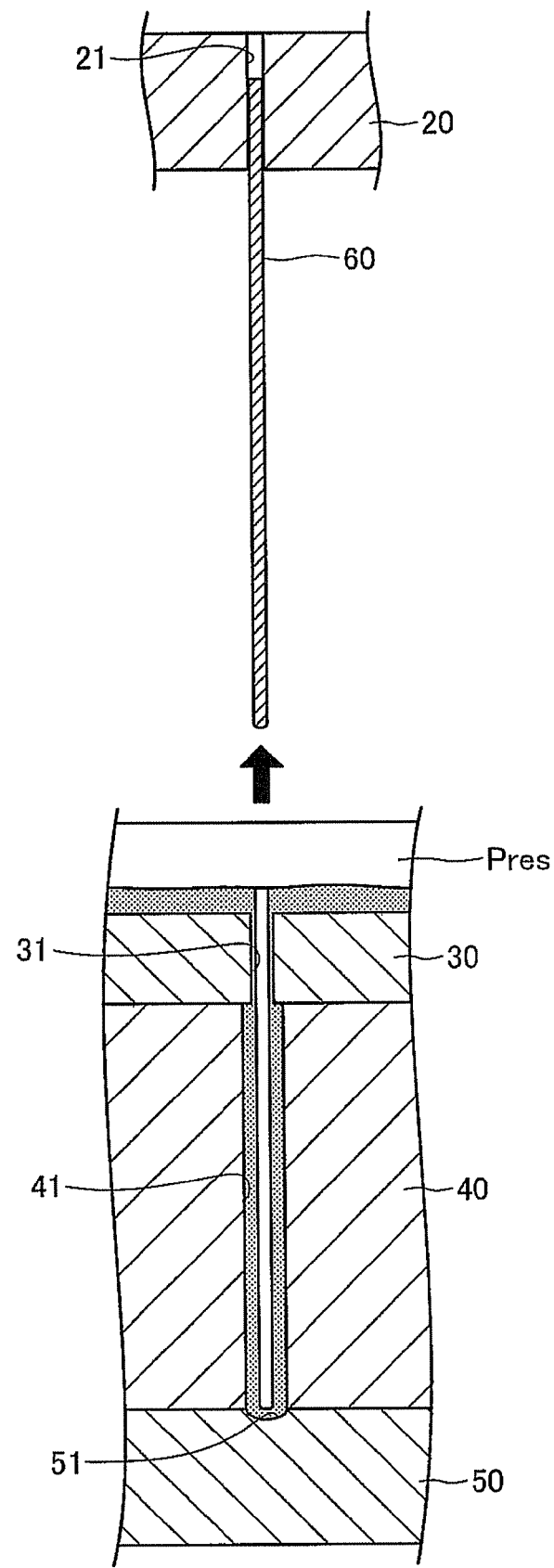
FIG. 13 is a view showing a process to pull out a pin-holder having a pin integrally fixed thereon upward from an upper mold.

Immediately after the heating process finishes, as shown in FIG. 13, the "inner mold" (i.e., the integral body comprising the Pin-holder 20 and the (40 pieces of) Pins 60) is pulled out upward from the Upper Mold 30. Namely, the Pins 60 are pulled out upward from the integral molded body (=the molding-space-portion molded body+the surplus molded body).

When the Pins 60 is pulled out upward from the integral molded body, the integral molded body undergoes an upward force. The upward force can function as a force to pull out the integral molded body upward from the Outer Mold 40 and the Upper Mold 30. On the other hand, as described above, the Inner Diameter D1 of the First Hole 41 is larger than the Inner Diameter D2 of the Second Hole 31 (refer to FIG. 7). Accordingly, in this state (i.e., a state wherein the Upper Mold 30 is stacked on the upper surface of the Outer Mold 40), the entirety of the lower opening of the Second Hole 31 is included in the upper opening of the First Hole 41. Accordingly, a step portion is formed at the connection portion of the molding-space-portion molded body and the surplus molded body. Thereby, even though a force to pull out the integral molded body upward from the Outer Mold 40 acts on the integral molded body, the step portion is locked on the lower surface of the Upper Mold 30 (the portion around the outside of the lower opening of the Second Hole 31).

As a result, the integral molded body (particularly, molding-space-portion molded body) is prevented from being pulled out from the Outer Mold 40. In other words, when the Pins 60 are pulled out upward from the integral molded body, the integral molded body (particularly, molding-space-portion molded body) can surely remain in the Outer Mold 40. In this point, it can be said that the Slurry Passing Gap S3 (i.e., minute gap) functions as a so-called stripper.

(Removal of Upper Mold)

Figure 14:
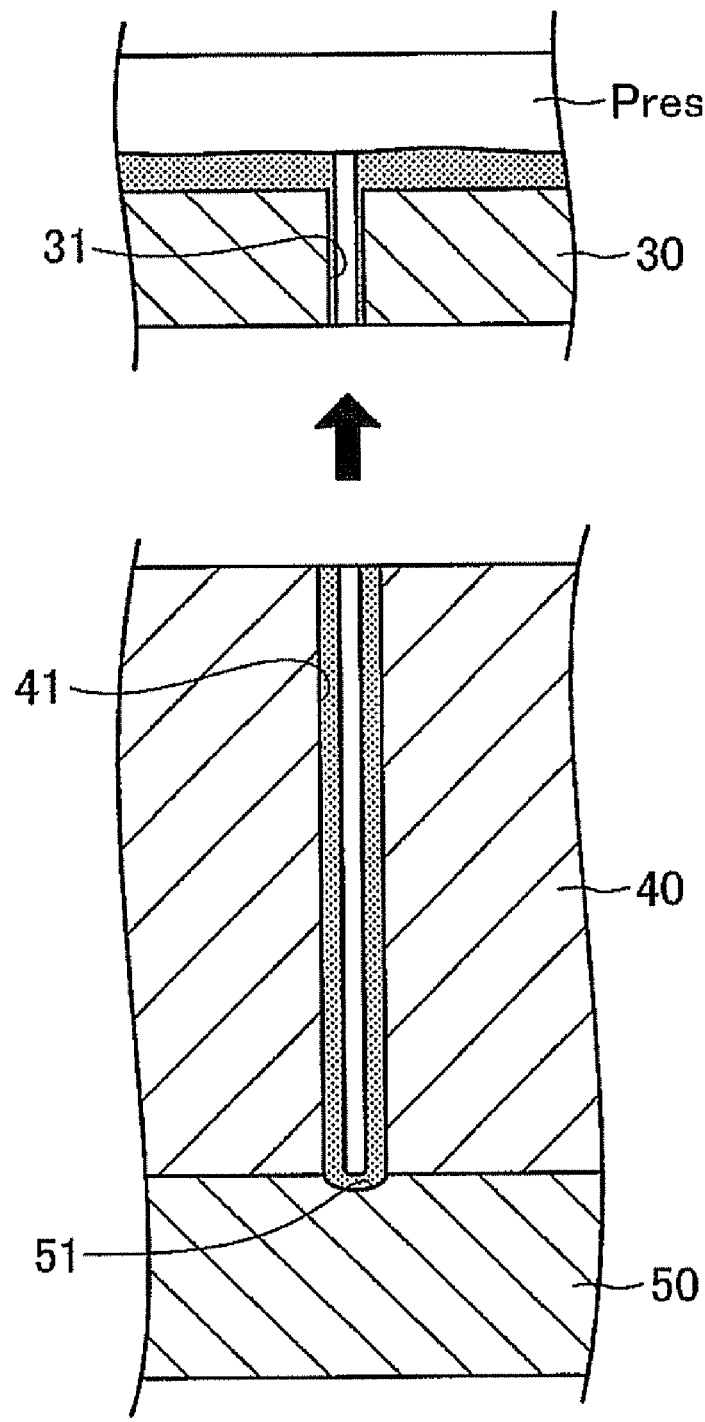
FIG. 14 is a view showing a process to pull out an upper mold upward from an outer mold.

Next, as shown in FIG. 14, the Upper Mold 30 is pulled out upward from the Outer Mold 40. At this time, a decoupling occurs at the connection portion of the molding-space-portion molded body and the surplus molded body (i.e., the above-described step portion), and the Upper Mold 30 is released and removed from the molding-space-portion molded body, and the molding-space-portion molded body adheres to and remains on the Outer Mold 40.

(Removal of Lower Mold)

Figure 15:
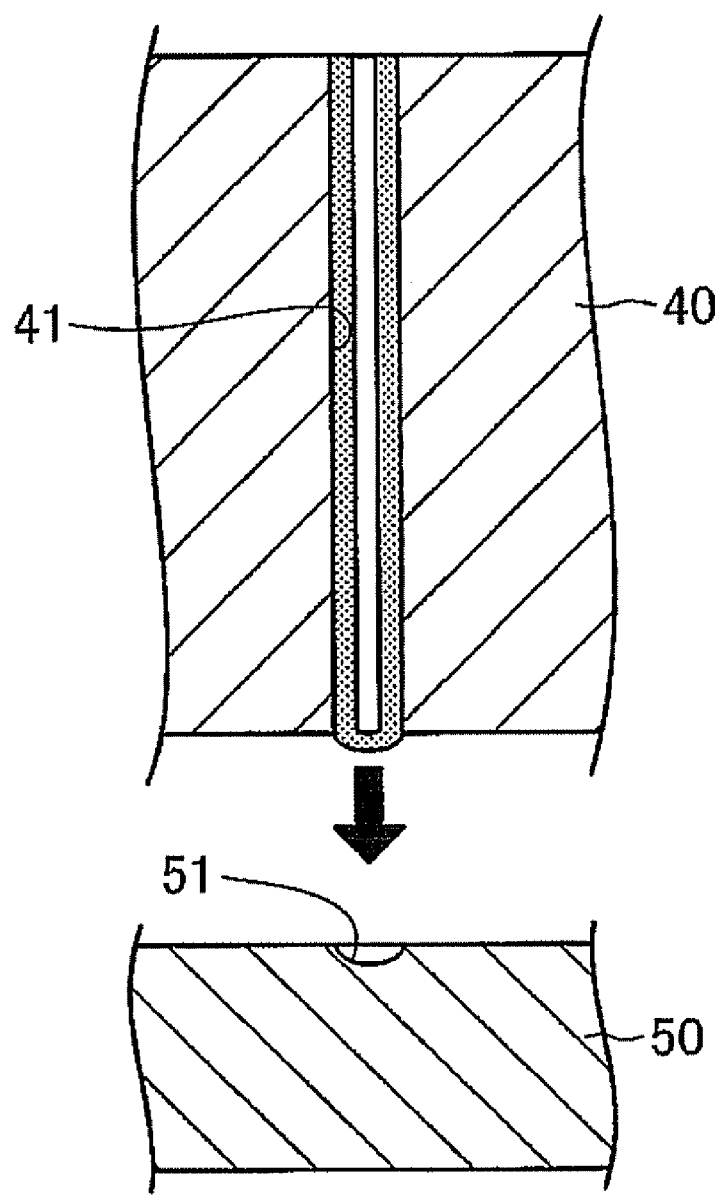
FIG. 15 is a view showing a process to pull out a lower mold downward from an outer mold.

Next, as shown in FIG. 15, the Lower Mold 50 is pulled out downward from the Outer Mold 40. Thereby, the Lower Mold 50 is released and removed from the molding-space-portion molded body, and the whole molding-space-portion molded body adheres to and remains on the Outer Mold 40. The above-described upper mold removing step and lower mold removing step may be executed after the secondary hardening step which will be described later. The removal of the "inner mold", the Upper Mold 30, and the Lower Mold 50 is easy by virtue of the action of the above-described mold release agent.

(Secondary Hardening)

Next, the secondary hardening step is executed. In the secondary hardening step, the Outer Mold 40, which the molding-space-portion molded body adheres to and remains on, is left at ambient room temperature. Heating may be performed at a temperature in a range of the melting temperature of the mold release agent or lower. In addition, when wax is used as a mold release agent, in order to melt the wax to release the Outer Mold 40, heating is positively performed. In this state, since the upside of the molding-space-portion molded body is exposed outside, the volatilization of the disperse medium is very easy to occur. Accordingly, during this, the molding-space-portion molded body is gradually hardened mainly through the volatilization of the disperse medium contained in the molding-space-portion molded body. Also in the secondary hardening step, the urethane reaction continues to proceed.

Figure 16:
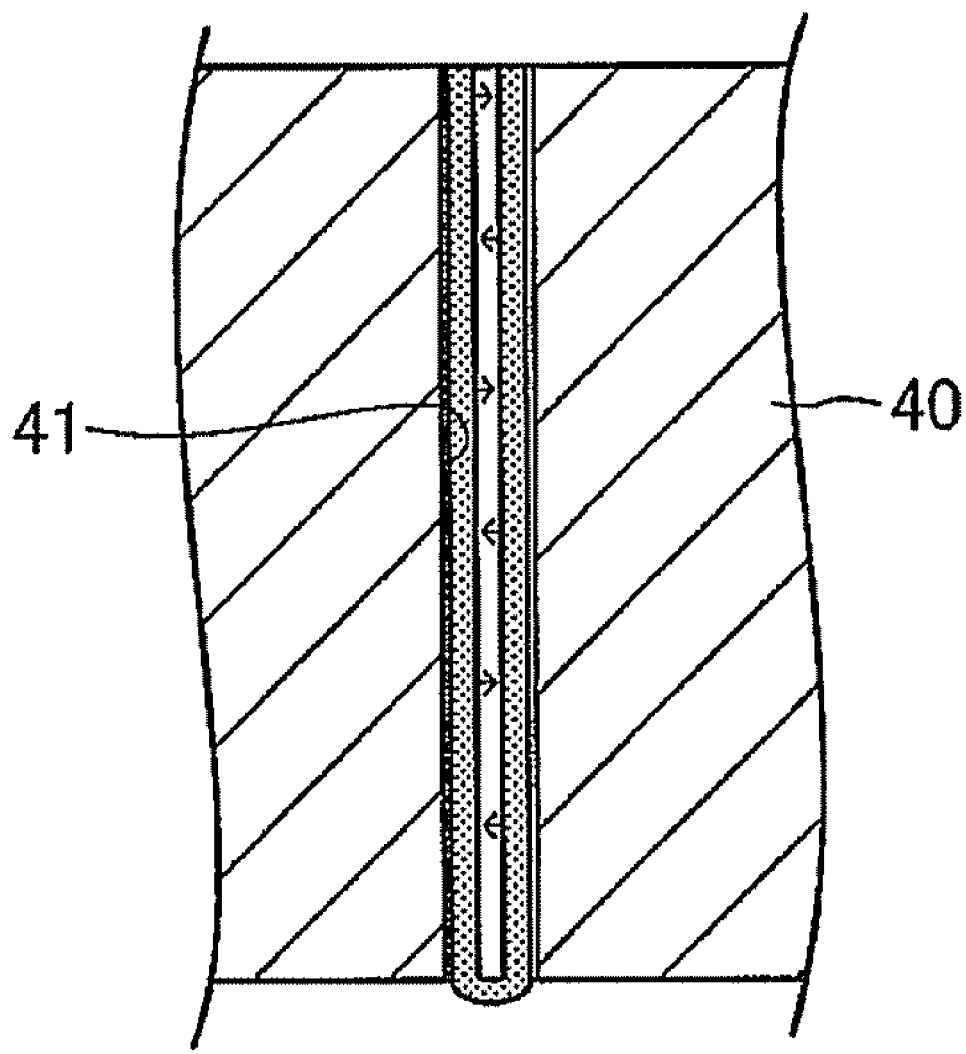
FIG. 16 is a view showing a status wherein a molded body adhering to an outer mold shrinks in a secondary hardening step.

As a result, as shown in FIG. 16, the molding-space-portion molded body shrinks due to the volatilization of the disperse medium (i.e., a decrease in number of the molecules). Namely, at a stage when the secondary hardening step finishes, the shrinkage of the molding-space-portion molded body remarkably occurs. In other words, the secondary hardening step is a step to positively shrink the molding-space-portion molded body and furthermore harden shrink the molding-space-portion molded body. However, even after the secondary hardening step finishes, the molding-space-portion molded body (before firing) is fragile (with little flexibility), and its strength is significantly small as compared with plastics or the like.

Thereby, after the secondary hardening step, the molding-space-portion molded body becomes easy to be (or is) released from the Outer Mold 40 due to the shrinkage of itself. Actually, after the secondary hardening step, it could be observed that some of the 40 pieces of the molding-space-portion molded bodies have been released from the Outer Mold 40.

(Removal of Outer Mold)

Figure 17:
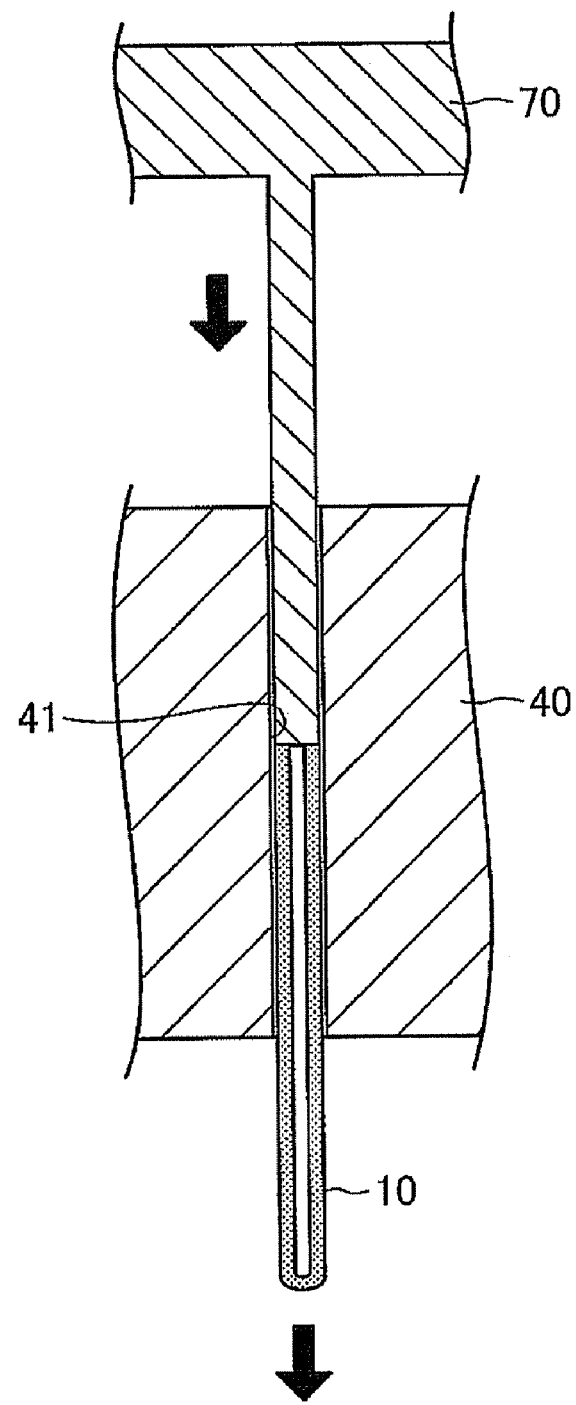
FIG. 17 is a view showing a process to push a molded body out of an outer mold.

Next, as shown in FIG. 17, the molding-space-portion molded body, which has not yet been released from the Outer Mold 40, is pushed out from the Outer Mold 40 using a Push-out Jig 70. Thereby, 40 pieces of the molding-space-portion molded bodies were taken out. The removal of the Outer Mold 40 is easy due to the fact that the material of the Outer Mold 40 is fluoropolymer.

Upon the removal of the "inner mold", the Upper Mold 30, the Lower Mold 50, and the Outer Mold 40, each of the Pin-holder 20, the Upper Mold 30, the Lower Mold 50, and the Push-out Jig 70 is moved separately and independently, as well as only in a vertical direction, by using a well-known slider (not shown).

(Final Drying)

Lastly, the 40 pieces of the molding-space-portion molded bodies are placed in an oven set at 100° C., and heated for 180 minutes to obtain 40 pieces of the Ceramic Molded Bodies 10 (refer to FIG. 1 and FIG. 2). This final drying step further promote the volatilization of the disperse medium and the urethane reaction, and the strength of the Ceramic Molded Bodies 10 furthermore increases. Thereby, it becomes easier to handle the Ceramic Molded Bodies 10. However, this final drying step can be omitted.

As described above, in the embodiment of the forming mold according to the present invention for molding the Ceramic Molded Body 10 with a hollow portion, the Lower Mold 50, the Outer Mold 40, the Upper Mold 30, and the "inner mold (the integral body of the Pin-holder 20 and the Pins 60)" are stacked and fixed in this order from the bottom. In the assembly-completed state, the Pins 60 are coaxially inserted into the First Holes 41 of the Outer Mold 40 and the Second Holes 31 of the Upper Mold 30. The inner diameter of the Second Hole 31 is smaller than the inner diameter of the First Hole 41 and somewhat larger than the external diameter of the Pin 60. In the assembly-completed state, the molding space (S1+S2) for molding the Ceramic Molded Body 10 is formed between the lateral surface of the Pin 60 and the First Hole 41, and the Slurry Passing Gap S3 (annular minute gap) is formed between the lateral surface of the Pin 60 and the Second Hole 31. The ceramic slurry poured into the Slurry Reservoir Pres formed on the upper surface of the Upper Mold 30 in a state wherein the posture of the forming mold is maintained horizontal blocks the upper opening of the Second Hole 31 (the upper ends of the Slurry Passing Gaps S3, 40 points), and thereafter falls and flows into the molding space (S1+S2) through the Slurry Passing Gap S3, and thereby is filled in the molding space (S1+S2).

Then, in a state wherein the posture of the forming mold is maintained horizontal and the upper opening of the Second Hole 31 is blocked with the ceramic slurry retained in the Slurry Reservoir Pres, the ambience of the forming mold after the pour of the ceramic slurry is modulated from an atmospheric pressure to a negative pressure, and then further to an atmospheric pressure, and thereby the slurry retained in the Slurry Reservoir Pres falls and flows toward the molding space (S1+S2) through the Slurry Passing Gap S3, not only by the action of gravity, but also by the action of said "differential pressure". Thereby, the whole molding space (S1+S2) can be surely filled with the slurry.

Also, when the "inner mold" (integral body of the Pinholder 20 and the Pins 60) is pulled out upward from the Upper Mold 30 after the ceramic slurry filled in the molding space is hardened, the molded body in the molding space (i.e., the above molding-space-portion molded body) undergoes an upward force. At this time, since the inner diameter of the Second Hole 31 is smaller than the inner diameter of the First Hole 41, the upper surface of the molding-space-portion molded body is locked by the lower surface of the Upper Mold 30 (the portion around the outside of the lower opening of the Second Hole 31). As a result, the molding-space-portion molded body is prevented from being pulled out from the Outer Mold 40. Namely, the molding-space-portion molded body can surely remain in the Outer Mold 40.

As described above, by forming the Slurry Passing Gap S3 as a minute gap, the slurry retained in the Slurry Reservoir Pres becomes unlikely to fall into the molding space only by the action of gravity, while the function as a so-called stripper upon the removal of the "inner mold" is achieved. The problem that the slurry retained in the Slurry Reservoir Pres becomes unlikely to fall into the molding space can be compensated by utilizing the above-described action of said "differential pressure".

Figure 19:
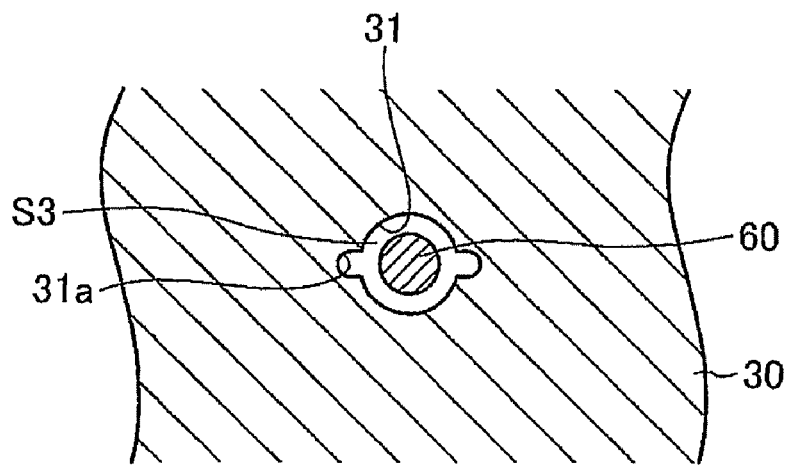
FIG. 19 is a view, corresponding to FIG. 7, showing around a second hole according to a modification of an embodiment of the present invention.
Figure 20:
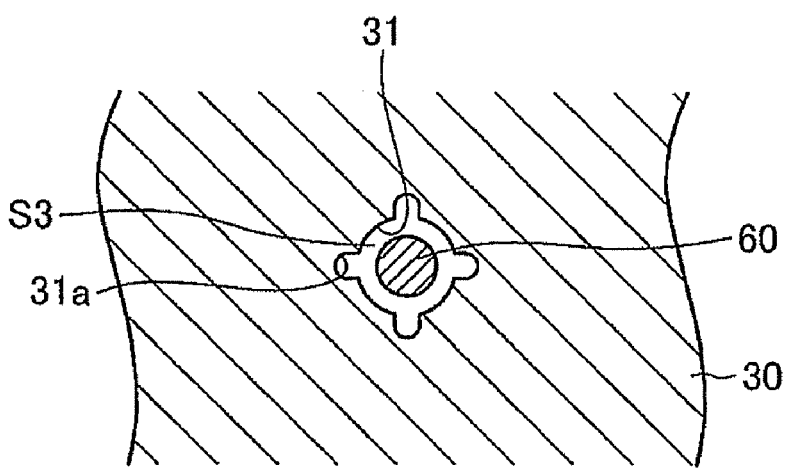
FIG. 20 is a view, corresponding to FIG. 7, showing around a second hole according to another modification of an embodiment of the present invention.

The present invention is not limited to the above-described embodiment, and various modifications can be adopted within the scope of the present invention. For example, although, as shown in FIG. 7, the Second Hole 31 in the Upper Mold 30 is a through-hole in a circular cylindrical (cylindrical columnar) shape in the above-described embodiment, as shown in FIG. 19 and FIG. 20, the Slits 31a extending in a vertical direction and leading to the upper and lower openings of the through-hole may be formed on the inner wall of the through-hole (in FIG. 19, 2 slits are formed at even intervals of 180°, and in FIG. 20, 4 slits are formed at even intervals of 90°).

Thereby, in the Slurry Passing Gap S3, the portions with a wide gap clearance corresponding to the Slits 31a and the portions with a narrow gap clearance not corresponding to the Slits 31a can be formed. As a result, while the above function as a stripper is surely maintained by virtue of the existence of the portions with a narrow gap clearance not corresponding to the Slits 31a, the movement (falling) of the slurry from the Slurry Reservoir Pres to the molding space (S1+S2) can be made easy by virtue of the existence of the portions with a wide gap clearance corresponding to the Slits 31a. When the movement (falling) of the slurry from the Slurry Reservoir Pres to the molding space (S1+S2) becomes easy as described above, the time period required to fill up the molding space (S1+S2) with the slurry can be shortened. Further, the occurrence of portions where the slurry cannot be filled in the molding space (S1+S2) can be suppressed.

Figure 21:
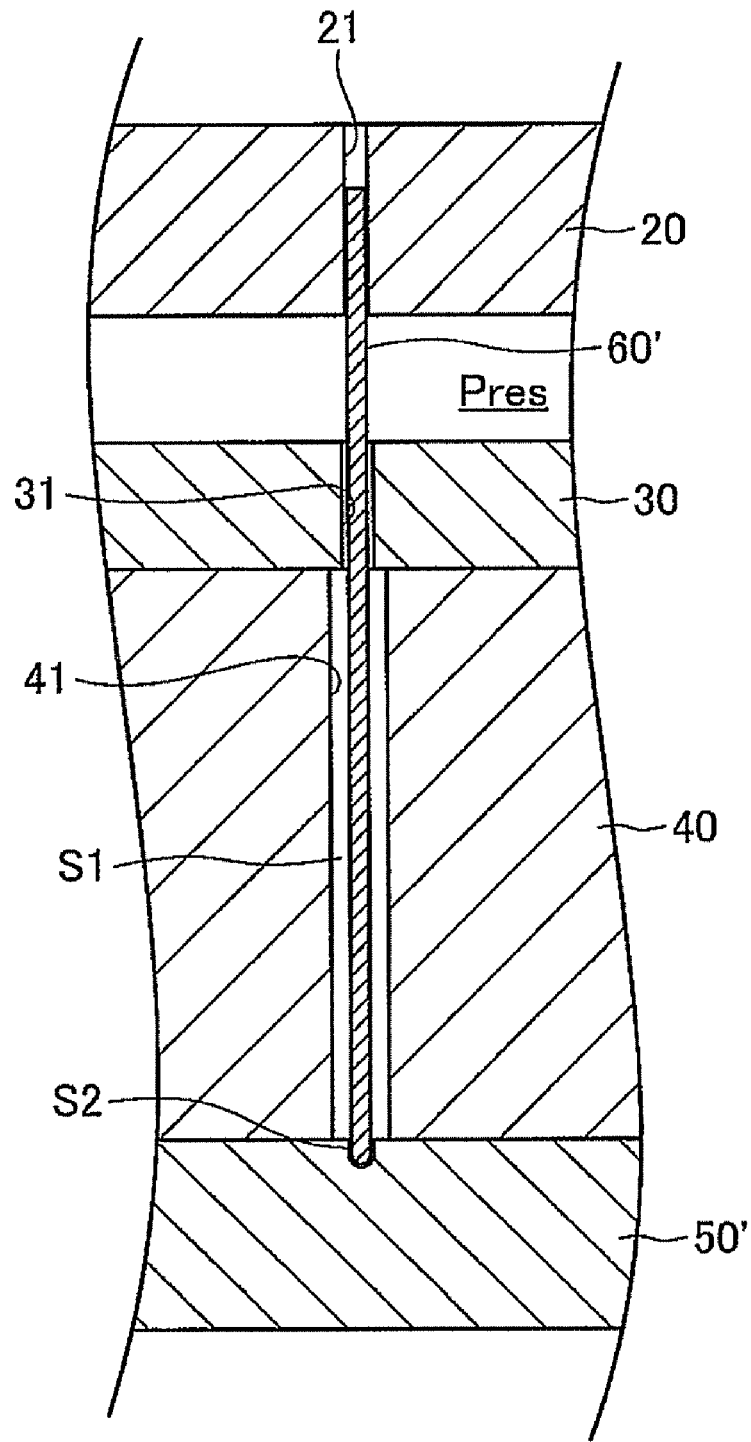
FIG. 21 is a view corresponding to FIG. 6 showing around a molding space according to another modification of an embodiment of the present invention.
Figure 22:
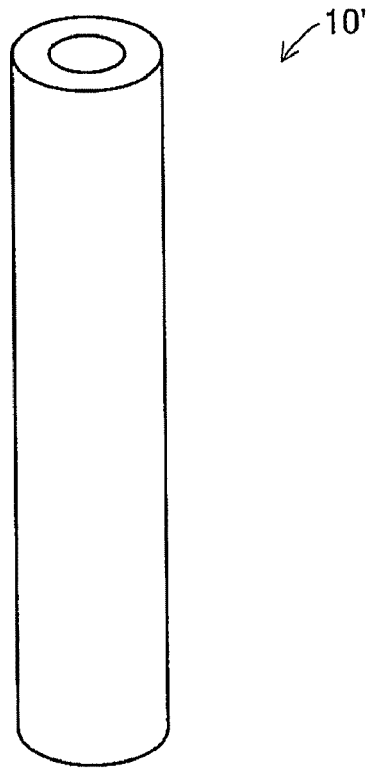
FIG. 22 is a perspective view of a ceramic molded body manufactured by using the forming mold shown in FIG. 21.
Figure 23:
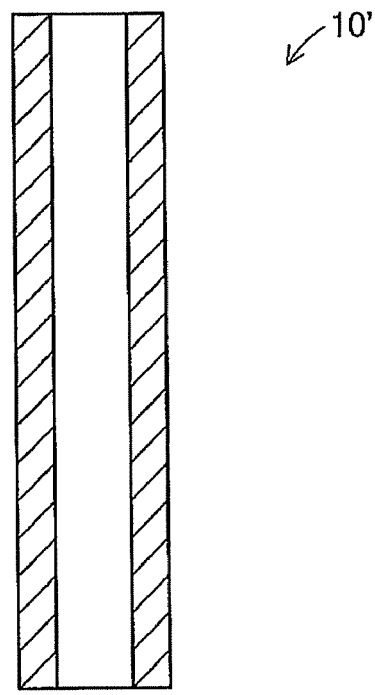
FIG. 23 is a schematic sectional view of a ceramic molded body manufactured by using the forming mold shown in FIG. 21.

Also, in the above-described embodiment, as shown in FIG. 21, concave portions having a shape corresponding to the apical shape of the (40 pieces of) Pins 60' may be formed on the upper surface of the Lower Mold 50' and the length of the Pins 60' may be adjusted such that the apices of the Pins 60' enter into and fit said concave portions. When this forming mold is used to manufacture ceramic molded bodies by means of a manner similar to the above, as shown in FIG. 22 and FIG. 23, the Ceramic Molded Bodies 10' with both ends opened are obtained. A sintered body obtained by firing the Molded Body 10' can be utilized, for example, as an electrode for generating plasma or the like.

Figure 24:
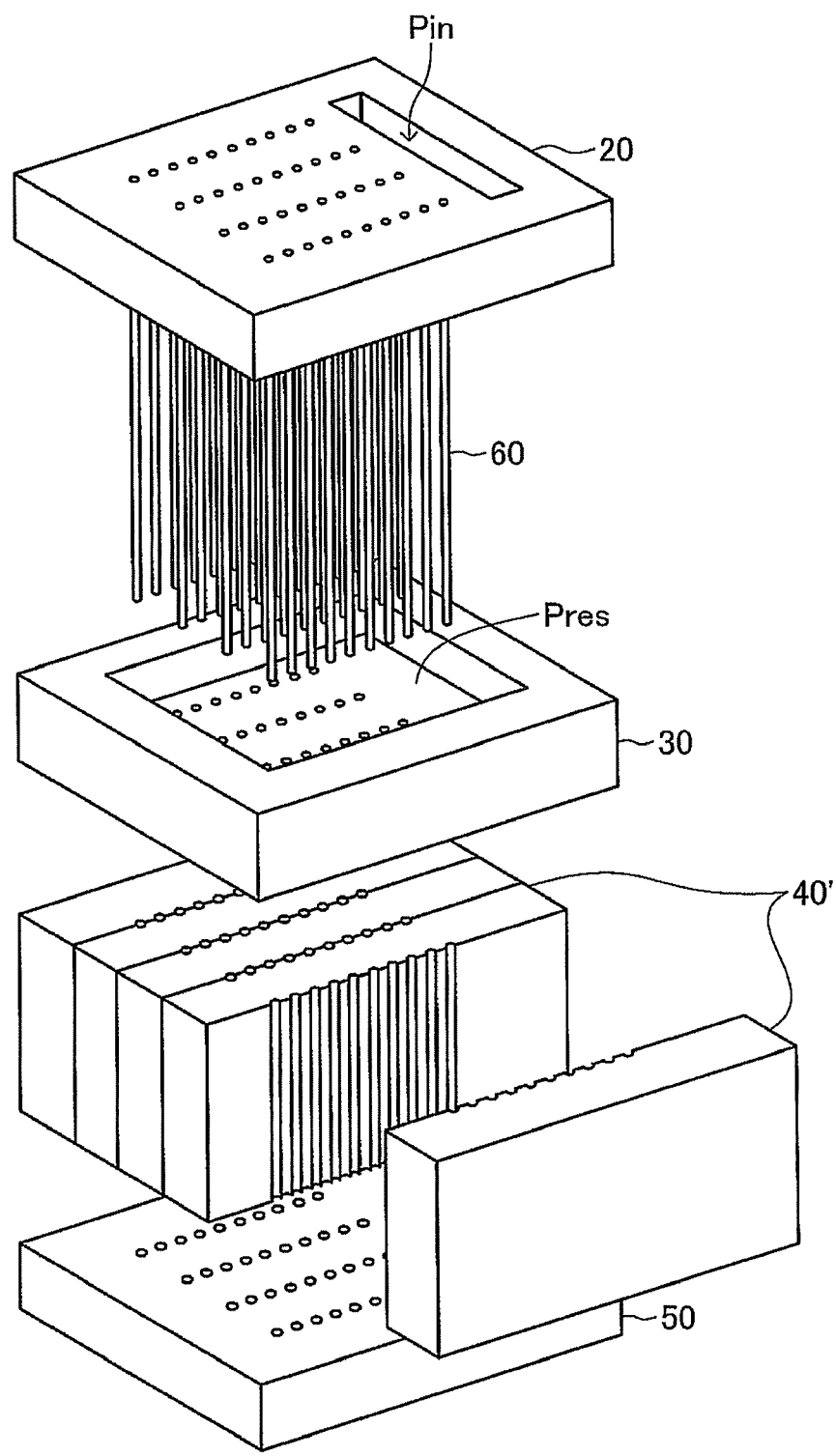
FIG. 24 is an exploded perspective view, corresponding to FIG. 3, of a forming mold according to another modification of an embodiment of the present invention.

In addition, in the above-described embodiment, as shown in FIG. 24, the Outer Mold 40' may be configured such that the outer Mold 40' can be separated at planes comprising the axis lines of the plural (10 holes in the present example) first holes arrayed in each of the plural (4 lines in the present example) lines. Thereby, after molding the ceramic molded body, the Outer Mold 40' is separated into plural parts (5 parts in the present example) and thereby all the inner walls of the first holes can be exposed. Accordingly, even if the residue of the ceramic molded body adhered to and remained on the inner walls of the first holes (molding surfaces), the residue can be easily removed.

Also, although, in the above-described embodiment, a fluorine compound mold release agent dispersed or dissolved in an organic solvent is coated as a mold release agent on the molding surface (the molding surfaces of the Upper Mold 30, the Lower Mold 50, and the Pins 60) of the forming mold before the assembly of the forming mold, wax dispersed or dissolved in an organic solvent may be used as a mold release agent. In this case, although the coating method can be properly chosen from well-known manners, it is desirable to use a spray gun for coating the Upper Mold 30 and the Lower Mold 50 with wax. On the other hand, it is desirable to coat the Pins 60 with wax by dipping.

Also, in the above-described embodiment, instead of said coating of the mold release agent, a surface treatment such as fluoropolymer coating may be performed. In this case, the fluoropolymer coating may be performed directly on the molding surface of the forming mold, or may be performed in a state wherein a predetermined undercoating, a plating, an alumite treatment or the like has been previously performed on the molding surface.

Although heating is not performed during the primary hardening step in the above-described embodiment, heating may be performed at a temperature in a range of the melting temperature of the mold release agent (especially, fluorine compound mold release agent) or lower. Similarly, although heating is not performed during the secondary hardening step, heating may be performed at a temperature in a range of the melting temperature of the mold release agent (especially, fluorine compound mold release agent) or lower.

In addition, in the above-described embodiment, although the posture of the forming mold is maintained horizontal (=said "first posture") throughout the pouring step and the filling step, the posture of the forming mold may be maintained constantly in a "posture slanted from a horizontal direction" (slanted posture) throughout the pouring step and the filling step, as long as a state wherein the upper openings of the Second Holes 31 (the upper ends of the Slurry Passing Gaps S3, 40 points) are blocked with the ceramic slurry is secured.

Figure 25:
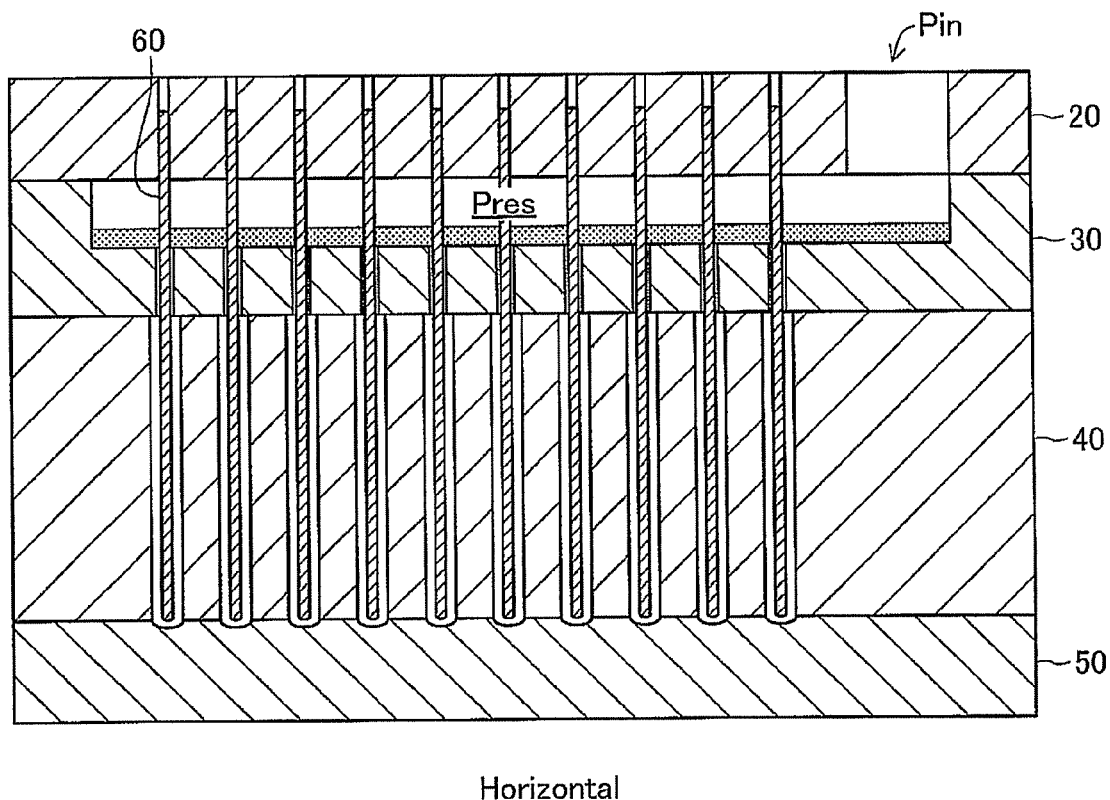
FIG. 25 is a view, corresponding to FIG. 5, for explaining a pouring step and a filling step (a negative pressure adjusting step) in an embodiment of the present invention.
Figure 26:
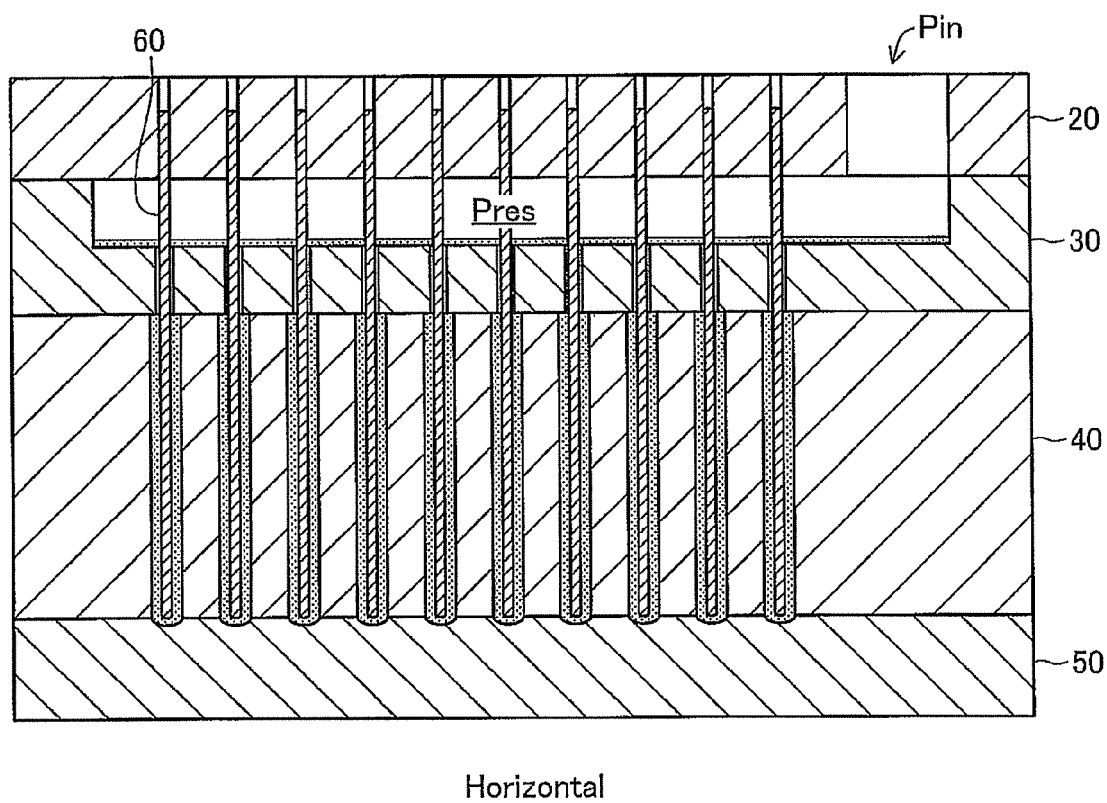
FIG. 26 is a view, corresponding to FIG. 5, for explaining a filling step (an atmospheric pressure returning step) in an embodiment of the present invention.

In the above-described embodiment, as shown in FIG. 25, the "pouring step" is executed in a state wherein the posture of the forming mold is maintained horizontal, the ceramic slurry is retained in the Slurry Reservoir Pres such that the upper openings of the Second Holes 31 (the upper ends of the Slurry Passing Gaps S3, 40 points) are blocked with the ceramic slurry. Next, the "negative pressure adjusting step" (from an atmospheric pressure to a negative pressure) in the "filling step" is executed in a state wherein the posture of the forming mold is maintained horizontal and the upper openings of the Second Holes 31 are blocked with the ceramic slurry retained in the Slurry Reservoir Pres. Then, as shown in FIG. 26, the "atmospheric pressure returning step" (from a negative pressure to an atmospheric pressure) in the "filling step" is executed in a state wherein the posture of the forming mold is maintained horizontal and the upper openings of the Second Holes 31 are blocked with the ceramic slurry retained in the Slurry Reservoir Pres. Namely, in the above-described embodiment, the posture of the forming mold is maintained horizontal throughout the pouring step and the filling step.

As a result, in the above-described embodiment, in the process of the "negative pressure adjusting step", the air within the molding space (S1+S2) is evacuated outside through the inside of the ceramic slurry blocking the upper openings of the Second Holes 31. Due to this, there is a possibility that air bubbles get mixed into the ceramic slurry. The mixed air bubbles can be dissolved in the ceramic slurry. When the viscosity of the slurry is large, the dissolved air bubbles are unlikely to be evacuated outside the slurry. In order to prevent the air bubbles from getting mixed into the slurry as described above, the following Modifications A and B can be supposed.

Figure 27:
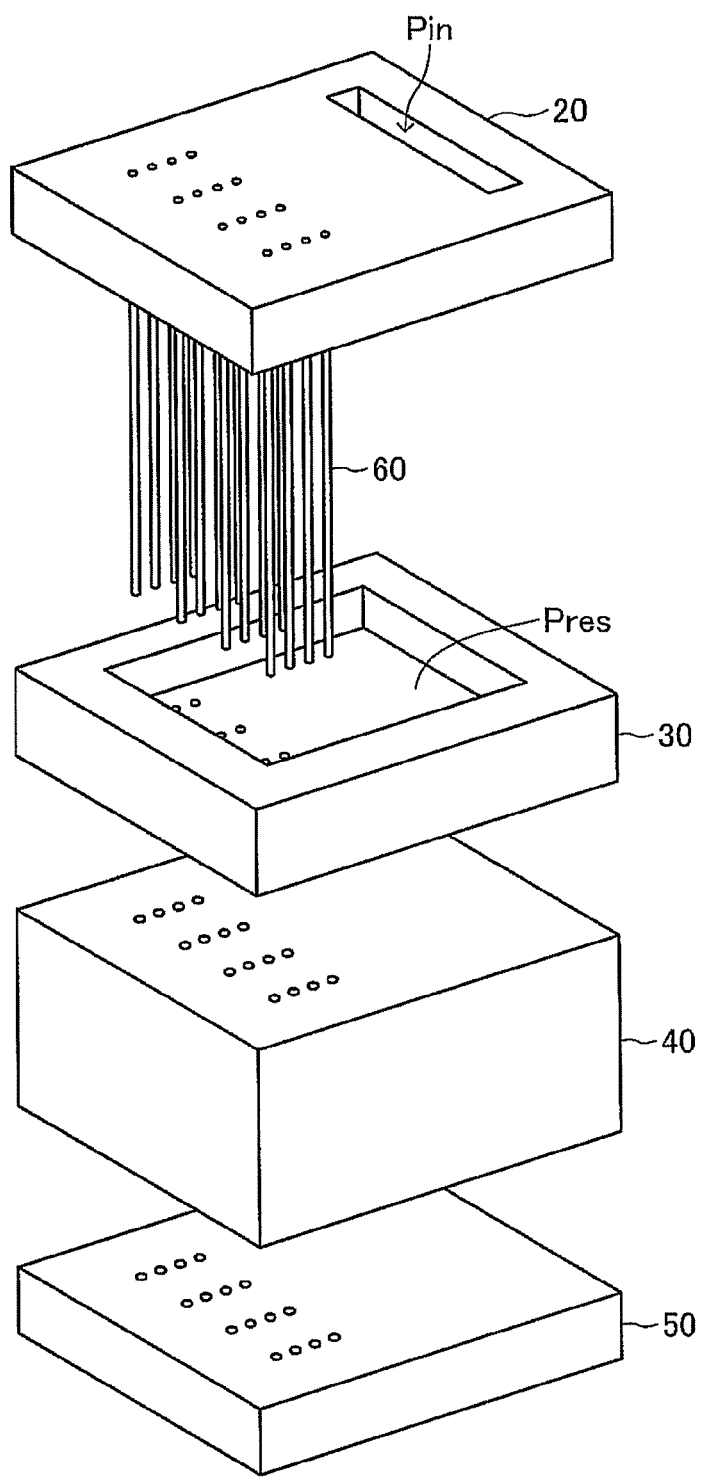
FIG. 27 is an exploded perspective view of a forming mold used in a Modification A of an embodiment of the present invention.
Figure 28:
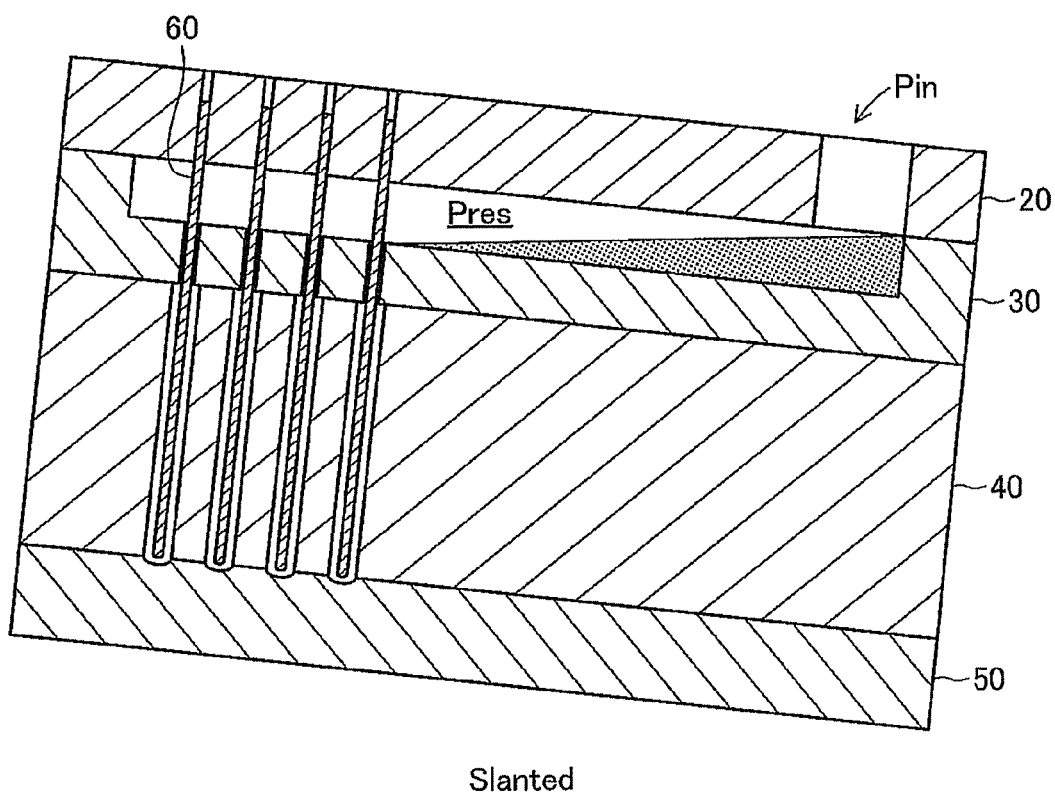
FIG. 28 is a view, corresponding to FIG. 5, for explaining a pouring step and a filling step (a negative pressure adjusting step) in a Modification A of an embodiment of the present invention.

In Modification A, as shown in FIG. 27, except that the number of the molding spaces is reduced from 40 (4×10) to 16 (4×4), the same forming mold as the forming mold in the above-described embodiment shown in FIG. 3 is used. First, as shown in FIG. 28, the "pouring step" is executed in a state wherein the posture of the forming mold is maintained in a "posture slanted from a horizontal direction" (slanted posture), and the ceramic slurry is retained in the Slurry Reservoir Pres such that the upper openings of the Second Holes 31 (the upper ends of the Slurry Passing Gaps S3, 16 points) are not blocked with the ceramic slurry (i.e., the ceramic slurry does not exist on the upside of the openings (16 points) of the Second Holes 31). Next, the "negative pressure adjusting step" (from an atmospheric pressure to a negative pressure) in the "filling step" is executed in a state wherein the posture of the forming mold is maintained in a slanted posture and the upper openings of the Second Holes 31 are not blocked with the ceramic slurry retained in the Slurry Reservoir Pres.

Figure 29:
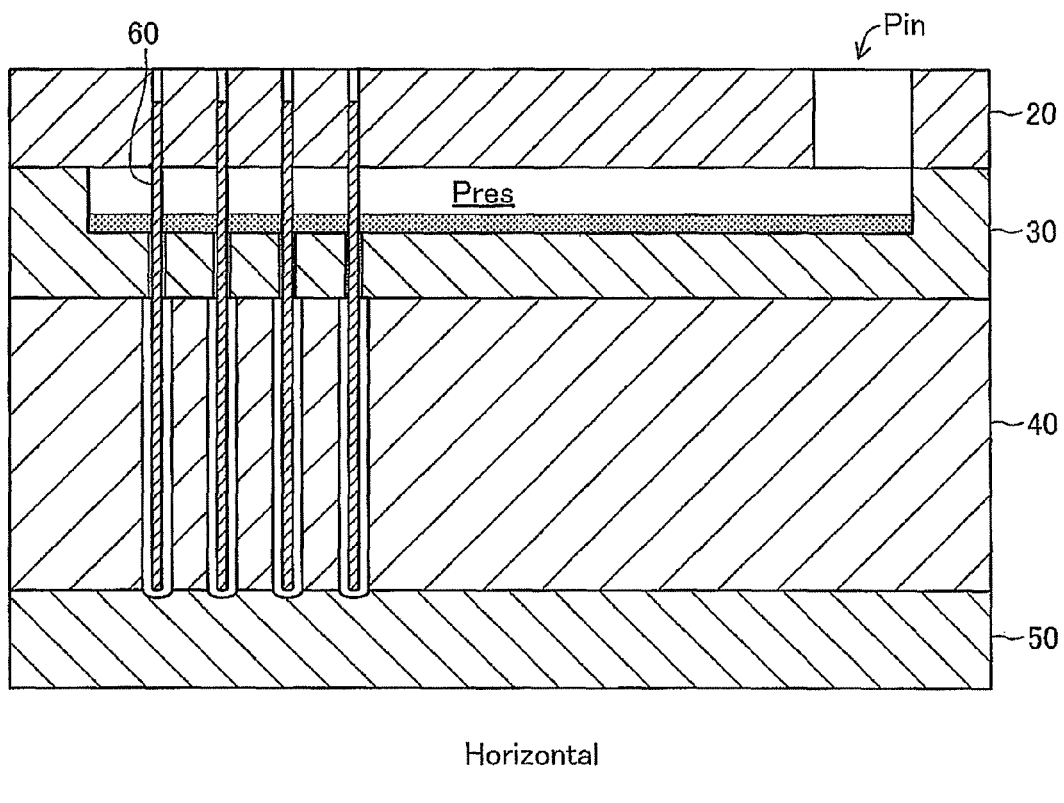
FIG. 29 is a view, corresponding to FIG. 5, for explaining a filling step (a posture changing step) in a Modification A of an embodiment of the present invention.
Figure 30:
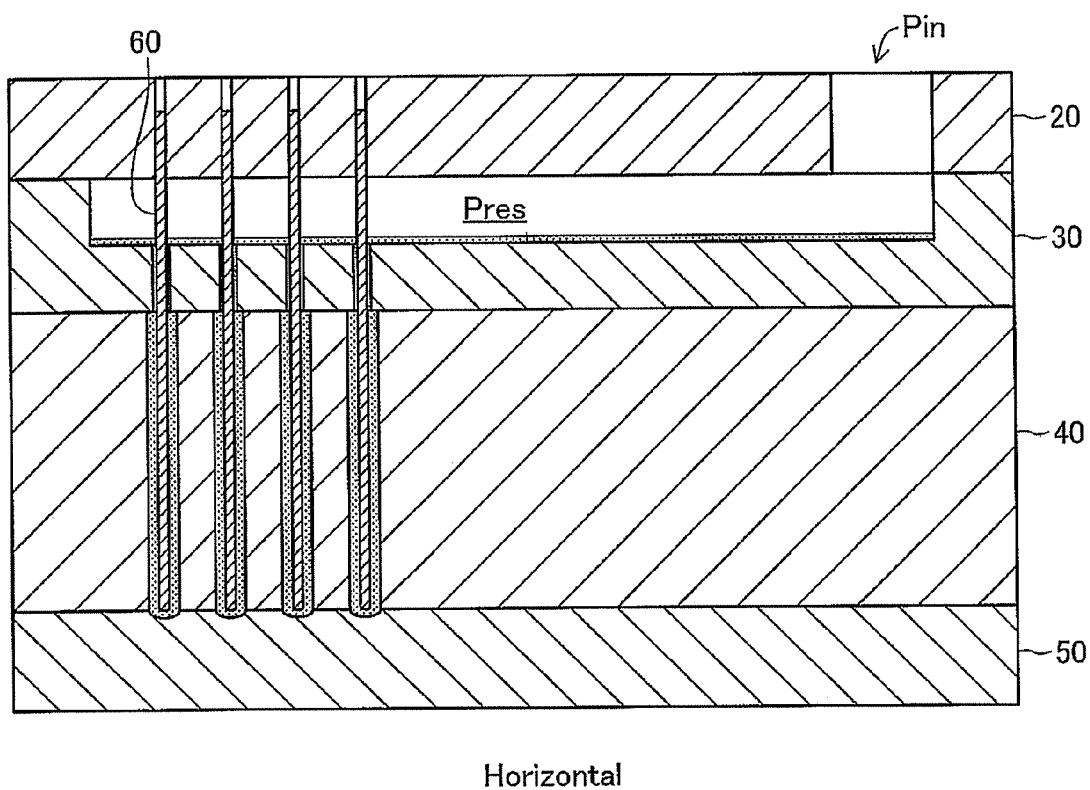
FIG. 30 is a view, corresponding to FIG. 5, for explaining a filling step (an atmospheric pressure returning step) in a Modification A of an embodiment of the present invention.

Next, as shown in FIG. 29, in a state wherein the ambient pressure of the forming mold is maintained at the negative pressure, the "posture changing step" in the "filling step" is executed. In the "posture changing step", the posture of the forming mold is changed from the slanted posture to the horizontal posture. As a result, the ceramic slurry retained in the Slurry Reservoir Pres moves to the upside of the upper openings (16 points) of the Second Holes 31, and the upper openings (16 points) of the Second Holes 31 are blocked with the ceramic slurry. Then, as shown in FIG. 30, in a state wherein the posture of the forming mold is maintained horizontal and the upper openings of the Second Holes 31 are blocked with the ceramic slurry, the "atmospheric pressure returning step" (from a negative pressure to an atmospheric pressure) in the "filling step" is executed. Namely, in Modification A, the posture of the forming mold is changed from the slanted posture to the horizontal posture during the filling step.

In this Modification A, in a state wherein the upper openings of the Second Holes 31 are not blocked with the ceramic slurry, the "negative pressure adjusting step" (from an atmospheric pressure to a negative pressure) is executed. Accordingly, a situation where the air within the molding space (S1+S2) is evacuated outside through the inside of the ceramic slurry retained in the Slurry Reservoir Pres will not occur. As a result, it is possible to prevent the air bubbles from getting mixed into the ceramic slurry.

Figure 31:
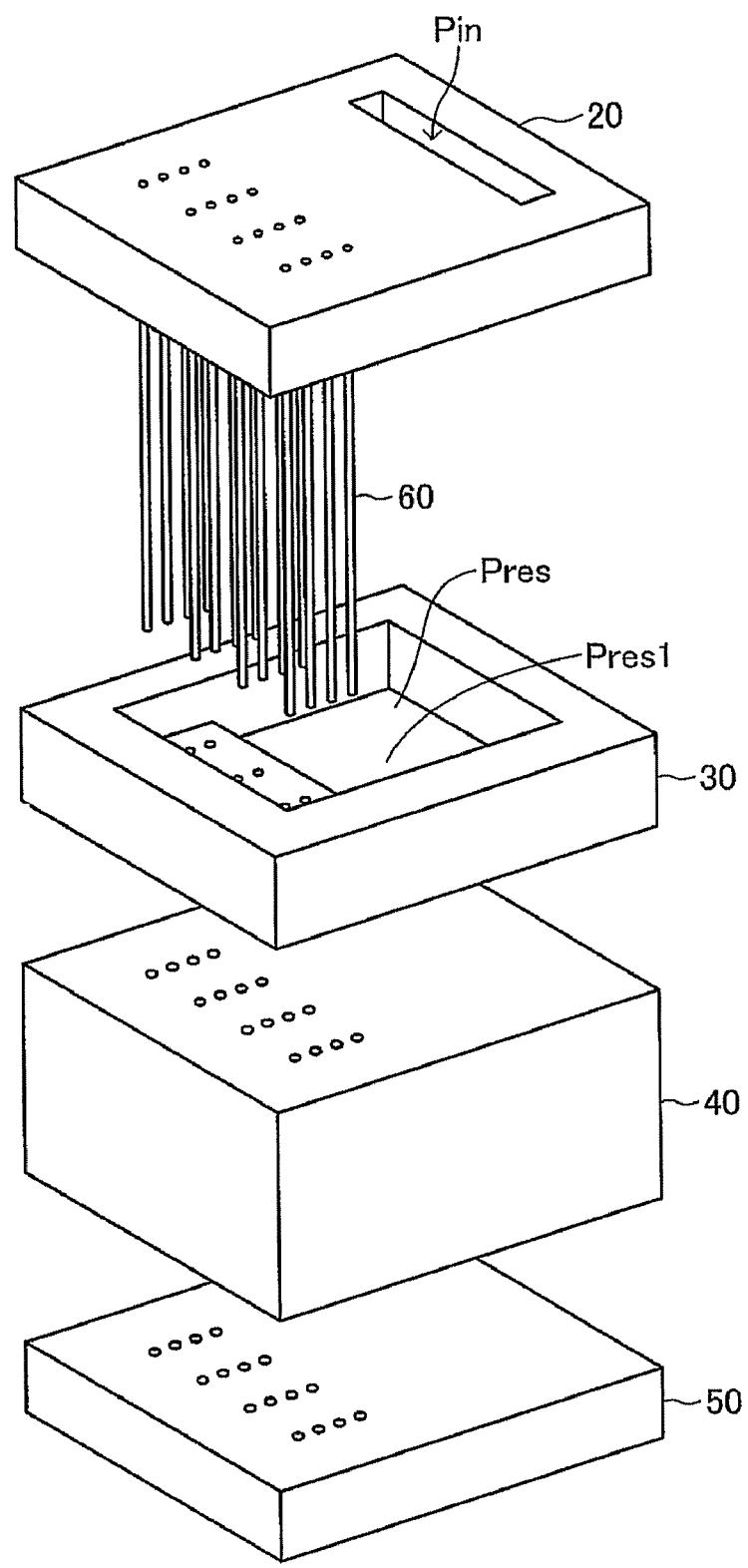
FIG. 31 is an exploded perspective view of a forming mold used in a Modification B of an embodiment of the present invention.
Figure 32:
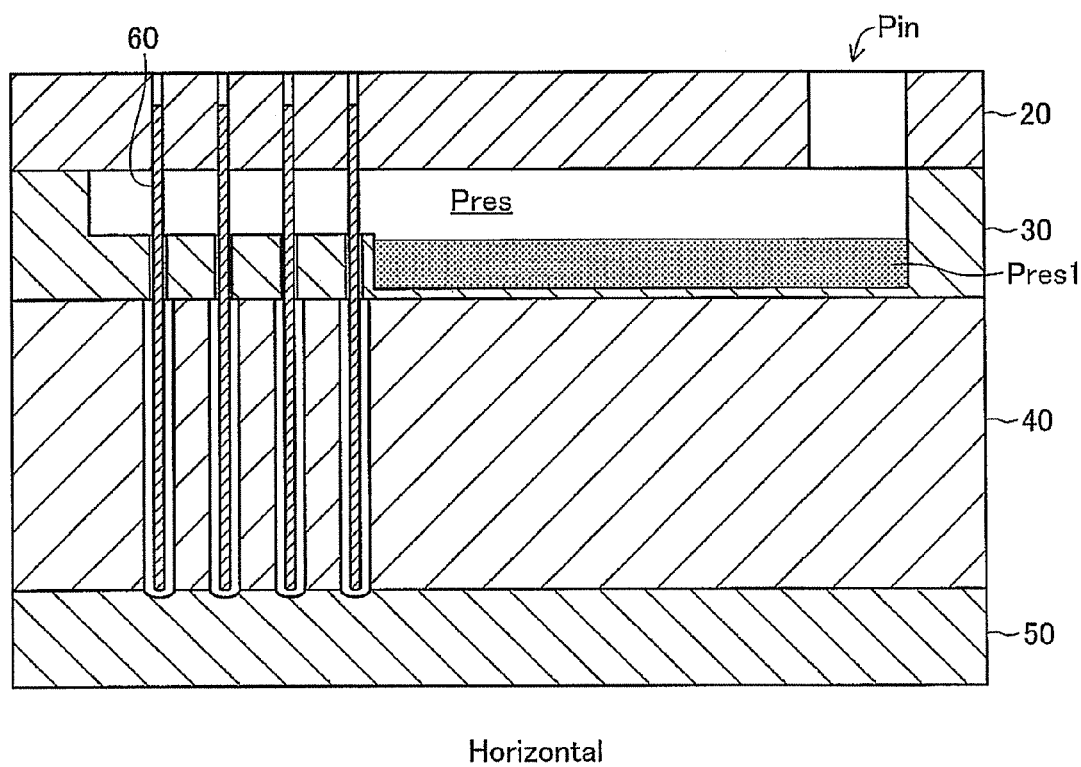
FIG. 32 is a view, corresponding to FIG. 5, for explaining a pouring step and a filling step (a negative pressure adjusting step) in a Modification B of an embodiment of the present invention.

In Modification B, as shown in FIG. 31, except that a Slurry Preparing Portion Pres1 with a depth larger than that of the rest part of the Slurry Reservoir Pres is formed in a part of the Slurry Reservoir Pres, the same forming mold as the forming mold shown in FIG. 27, according to the above Modification A, is used. First, as shown in FIG. 32, the "filling step" is executed in a state wherein the posture of the forming mold is maintained horizontal, and thereby the whole ceramic slurry is poured into the Slurry Preparing Portion Pres1 which is a part of the Slurry Reservoir Pres. Thereby, the upper openings (the upper end of the Slurry Passing Gaps S3, 16 points) of the Second Holes 31 are not blocked with the ceramic slurry retained in Slurry Reservoir Pres (specifically, the Slurry Preparing Portion Pres1). Next, in a state wherein the posture of the forming mold is maintained horizontal and the upper openings of the Second Holes 31 are not blocked with the ceramic slurry retained in Slurry Reservoir Pres (specifically, the Slurry Preparing Portion Pres1), the "negative pressure adjusting step" (from an atmospheric pressure to a negative pressure) in the "filling step" is executed.

Figure 33:
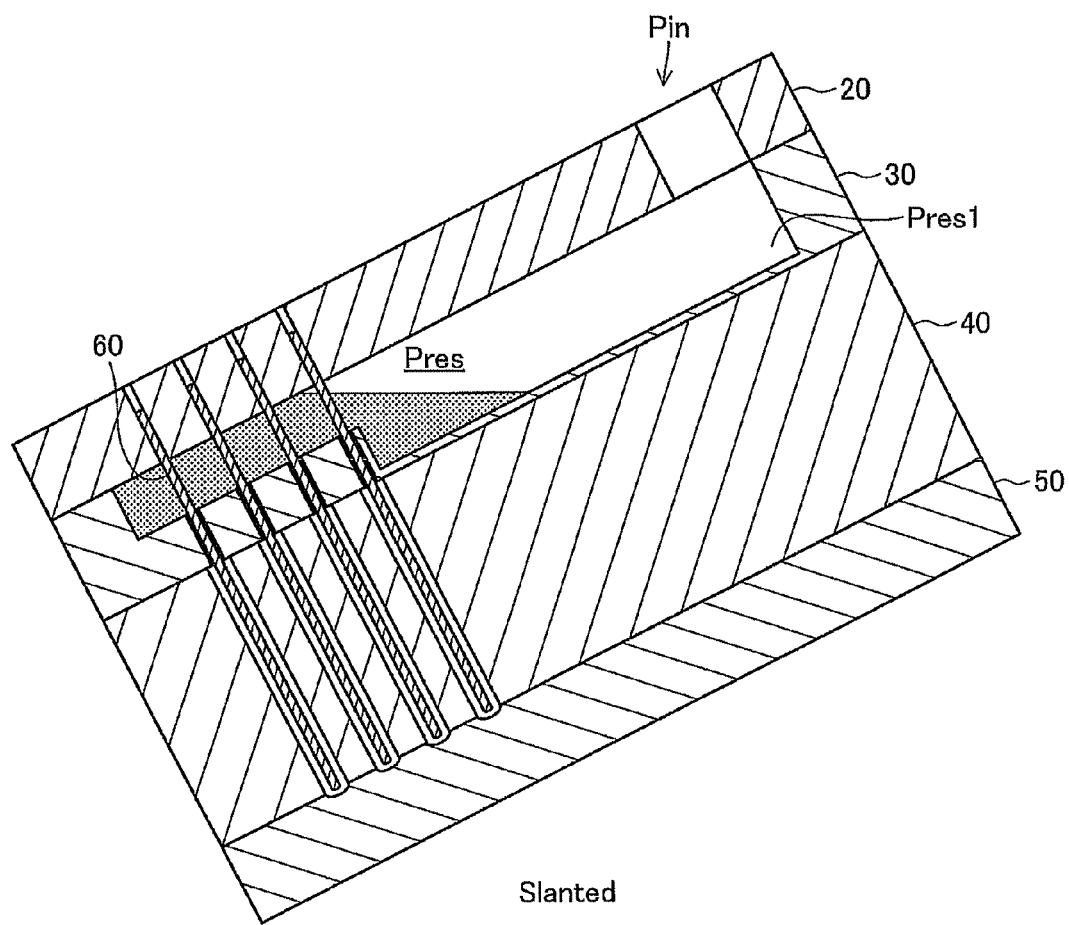
FIG. 33 is a view, corresponding to FIG. 5, for explaining a filling step (a posture changing step) in a Modification B of an embodiment of the present invention.
Figure 34:
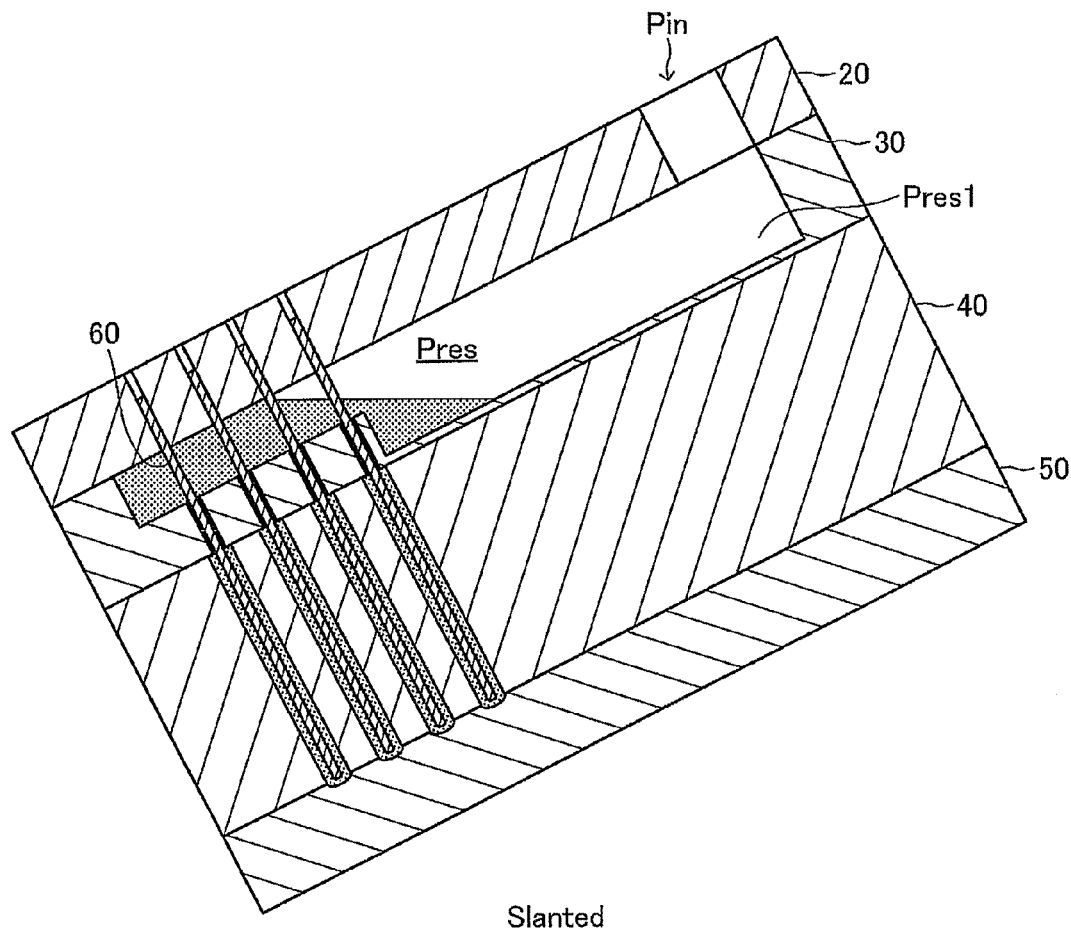
FIG. 34 is a view, corresponding to FIG. 5, for explaining a filling step (an atmospheric pressure returning step) in a Modification B of an embodiment of the present invention.

Next, as shown in FIG. 33, in a state wherein the ambient pressure of the forming mold is maintained at the negative pressure, the "posture changing step" in the "filling step" is executed. In the "posture changing step", the posture of the forming mold is changed from the horizontal posture to the "posture slanted from a horizontal direction" (slanted posture). As a result, the ceramic slurry retained in the Slurry Reservoir Pres (specifically, the Slurry Preparing Portion Pres1) moves to the upside of the upper openings (16 points) of the Second Holes 31, and the upper openings (16 points) of the Second Holes 31 are blocked with the ceramic slurry. Then, as shown in FIG. 34, in a state wherein the posture of the forming mold is maintained in the slanted posture and the upper openings of the Second Holes 31 are blocked with the ceramic slurry, the "atmospheric pressure returning step" (from a negative pressure to an atmospheric pressure) in the "filling step" is executed. Namely, in Modification B, the posture of the forming mold is changed from the horizontal posture to the slanted posture during the filling step.

Also in this Modification B, similarly to the above Modification A, in a state wherein the upper openings of the Second Holes 31 are not blocked with the ceramic slurry, the "negative pressure adjusting step" (from an atmospheric pressure to a negative pressure) is executed. Accordingly, a situation where the air within the molding space (S1+S2) is evacuated outside through the inside of the ceramic slurry retained in the Slurry Reservoir Pres will not occur. As a result, it is possible to prevent the air bubbles from getting mixed into the ceramic slurry.

Although, in the above Modification A (B), the posture of the forming mold is changed from the slanted (horizontal) posture to the horizontal (slanted) posture during the filling step (in the posture changing step) and thereby the state wherein the upper openings (16 points) of the Second Holes 31 are not blocked with the ceramic slurry is changed to the state wherein the upper openings are blocked with the ceramic slurry, the posture of the forming mold may be changed from a first slanted posture (which is slanted from a horizontal direction) to a second slanted posture (which is slanted from a horizontal direction) during the filling step (in the posture changing step) and thereby the state wherein the upper openings (16 points) of the Second Holes 31 are not blocked with the ceramic slurry may be changed to the state wherein the upper openings are blocked with the ceramic slurry.

In the above Modifications A and B, after the pouring step (the slurry is poured into the slurry reservoir) is executed, in a state wherein the upper openings of the second holes are not blocked with the slurry, the negative pressure adjusting step (from an atmospheric pressure to a negative pressure) is executed, and thereby it is possible to prevent the air bubbles from getting mixed into the slurry. On the contrary, in the following Modification C, D, E, the pouring step (the slurry is poured into the slurry reservoir) is executed after the negative pressure adjusting step (from an atmospheric pressure to a negative pressure) is executed (in a state wherein the upper openings of the second holes are not blocked with the slurry), and thereby it is possible to prevent the air bubbles from getting mixed into the slurry.

Figure 35:
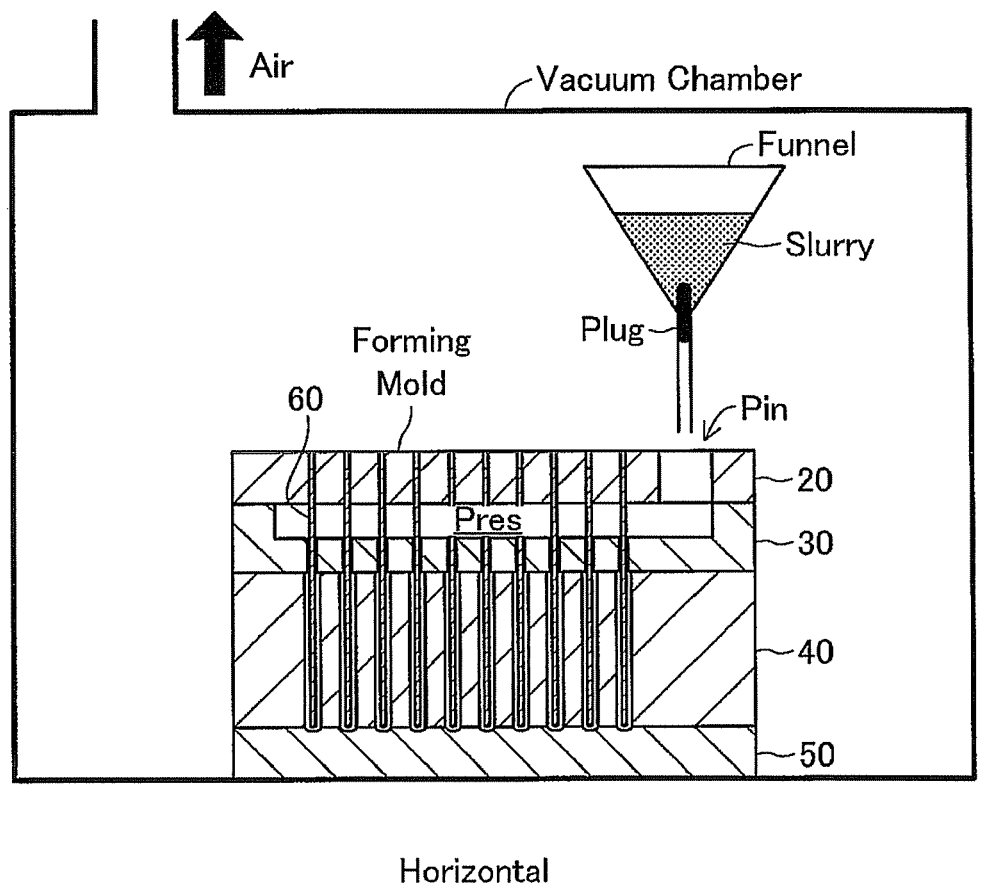
FIG. 35 is a view, corresponding to FIG. 5, for explaining a negative pressure adjusting step in a Modification C of an embodiment of the present invention.

In Modification C, as shown in FIG. 35, the same forming mold as the forming mold shown in FIG. 3, according to the above-described embodiment, is used. A container (funnel) to retain the slurry is placed inside the vacuum chamber separately and independently from the forming mold placed inside the vacuum chamber. The slurry is not retained in the Slurry Reservoir Pres of the forming mold, but is retained in the funnel. The discharge of the slurry is stopped with a plug member.

Figure 36:
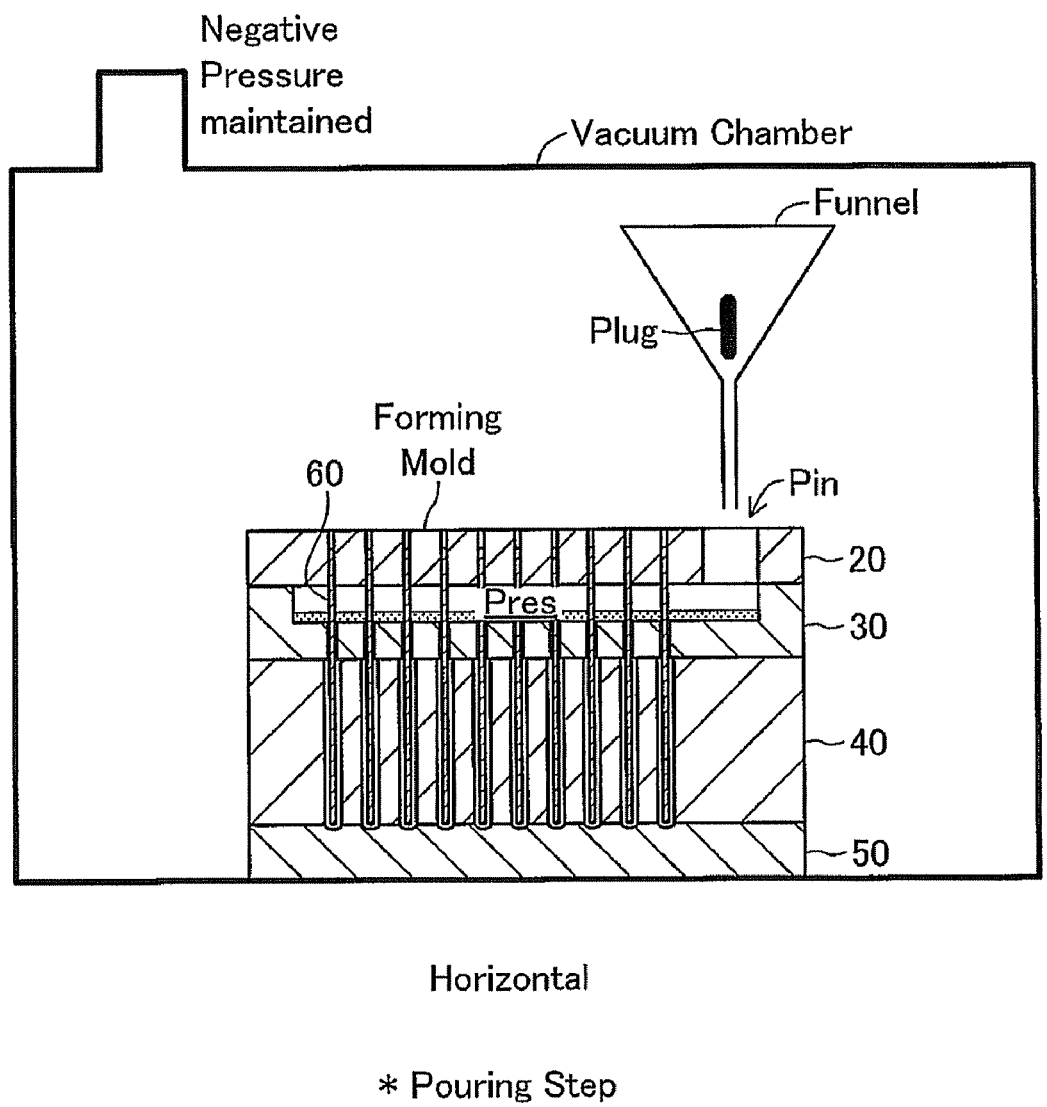
FIG. 36 is a view, corresponding to FIG. 5, for explaining a pouring step in a Modification C of an embodiment of the present invention.
Figure 37:
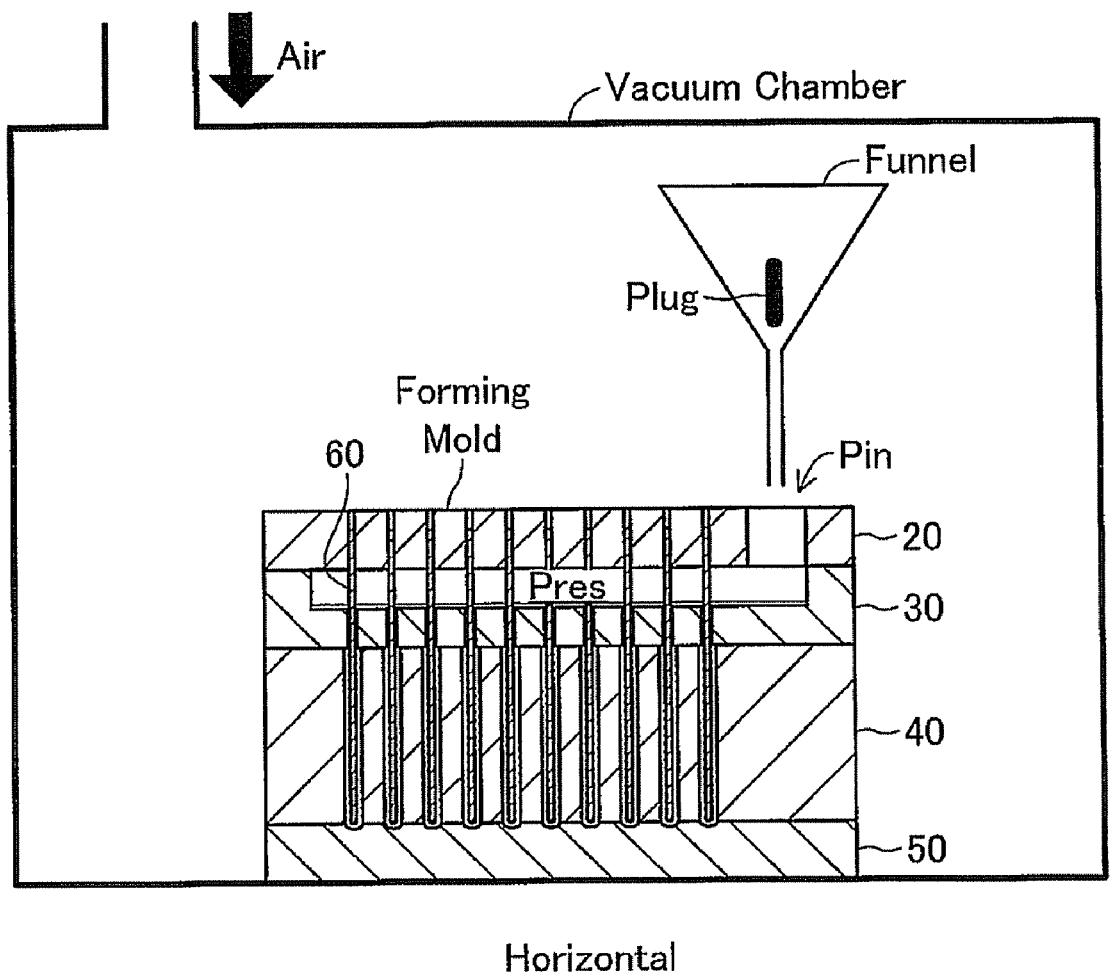
FIG. 37 is a view, corresponding to FIG. 5, for explaining an atmospheric pressure returning step in a Modification C of an embodiment of the present invention.

First, as shown in FIG. 35, in a state wherein the posture of the vacuum chamber (accordingly, forming mold) is maintained horizontal, the "negative pressure adjusting step" (from an atmospheric pressure to a negative pressure) is executed. Thereby, through the upper openings of the Second Holes 31 (upper ends of the Slurry Passing Gaps S3, 40 points), not yet blocked with the ceramic slurry, the inside of the molding space (40 spaces) of the forming mold is also adjusted to the negative pressure. Next, as shown in FIG. 36, in a state wherein the posture of the vacuum chamber (accordingly, forming mold) is maintained horizontal and the pressure in the vacuum chamber (accordingly, in the molding spaces) is maintained at the negative pressure, the "pouring step" is executed. In the "pouring step", by pulling out the plug member, the ceramic slurry flows out of the funnel. As a result, the ceramic slurry is retained in the Slurry Reservoir Pres such that the upper openings of the Second Holes 31 (40 points) are blocked with the ceramic slurry. Then, as shown in FIG. 37, in a state wherein the posture of the vacuum chamber (accordingly, forming mold) is maintained horizontal and the upper openings of the Second Holes 31 (40 points) are blocked with the ceramic slurry, the "atmospheric pressure returning step" (from a negative pressure to an atmospheric pressure) is executed. Namely, in Modification C, the posture of the forming mold is maintained horizontal throughout the negative pressure adjusting step, the pouring step, and the atmospheric pressure returning step.

Thus, also in Modification C, similarly to Modifications A and B, in a state wherein the upper openings of the Second Holes 31 are not blocked with the ceramic slurry, the "negative pressure adjusting step" (from an atmospheric pressure to a negative pressure) is executed. Accordingly, a situation where the air within the molding space (S1+S2) is evacuated outside through the inside of the ceramic slurry will not occur. As a result, it is possible to prevent the air bubbles from getting mixed into the ceramic slurry.

Figure 38:
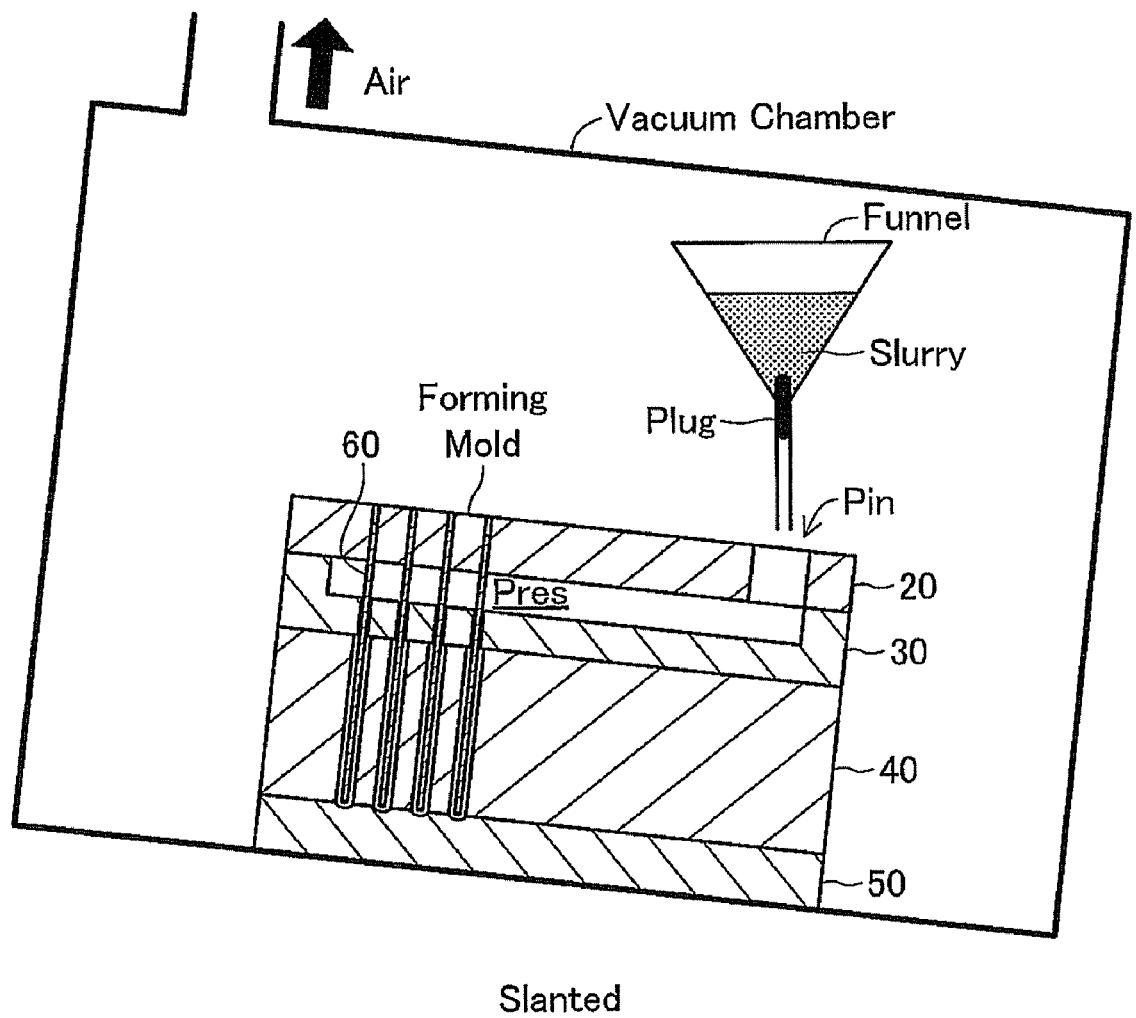
FIG. 38 is a view, corresponding to FIG. 5, for explaining a negative pressure adjusting step in a Modification D of an embodiment of the present invention.

In Modification D, as shown in FIG. 38, similarly to Modification A, the same forming mold as the forming mold shown in FIG. 27 is used. Similarly to Modification C, the slurry is retained in a funnel placed inside the vacuum chamber separately and independently from the forming mold, not in the Slurry Reservoir Pres of the forming mold. The discharge of the slurry is stopped with a plug member.

Figure 39:
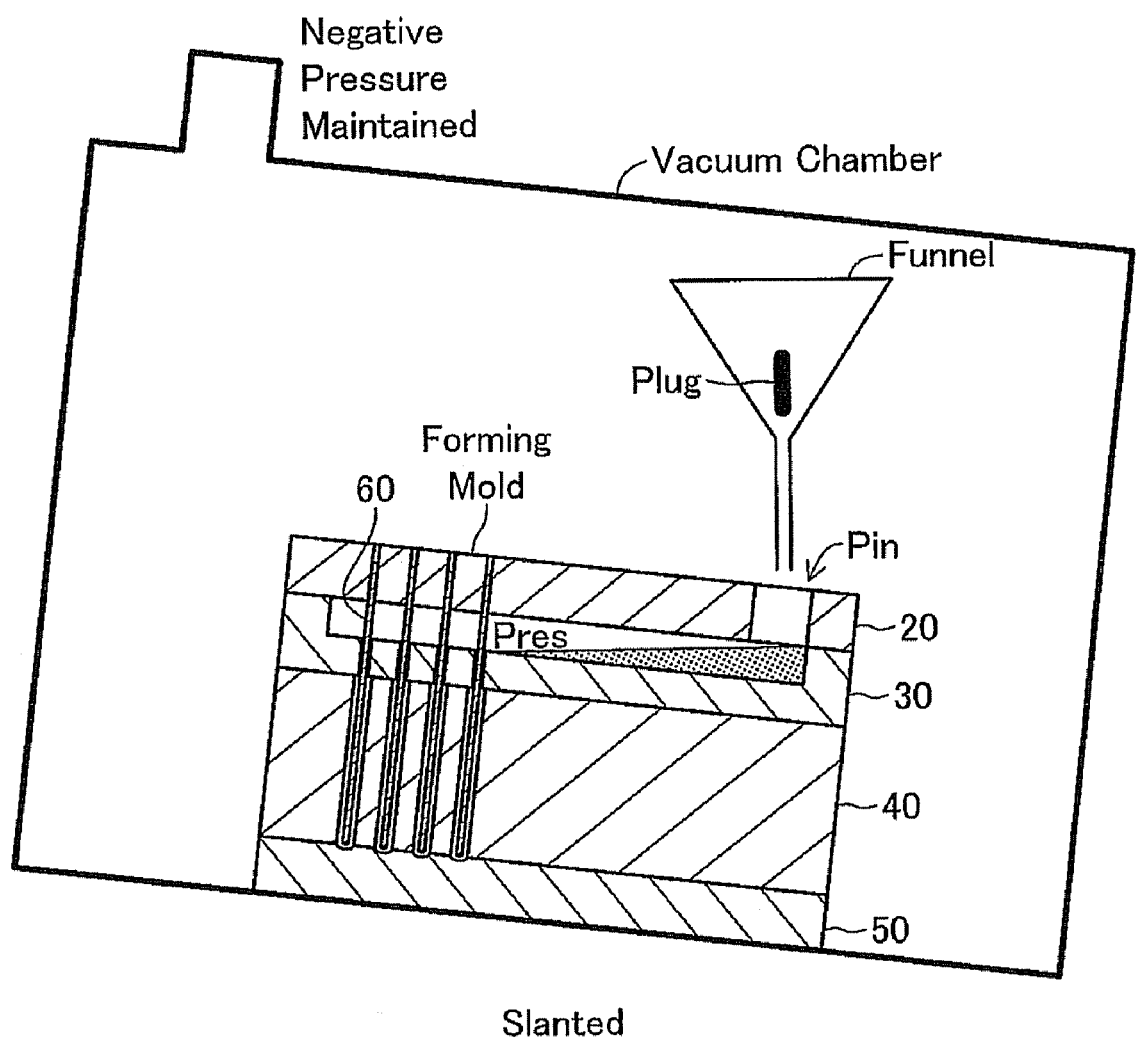
FIG. 39 is a view, corresponding to FIG. 5, for explaining a pouring step (before changing a posture) in a Modification D of an embodiment of the present invention.
Figure 40:
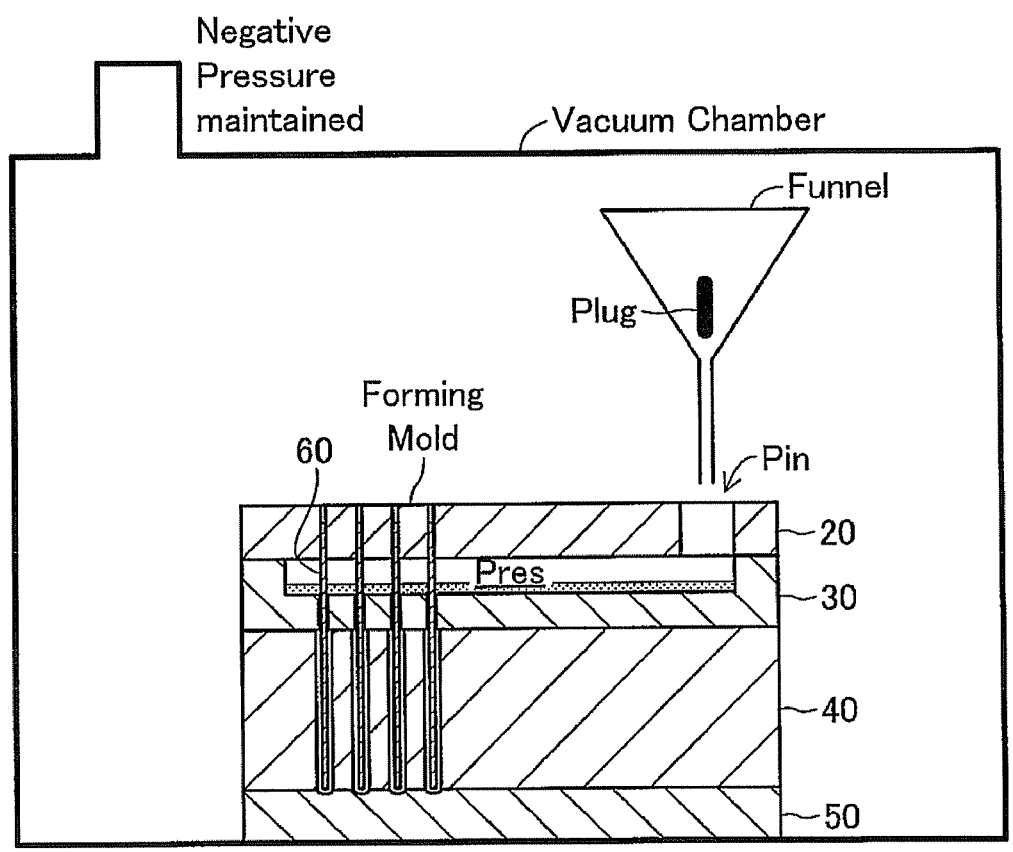
FIG. 40 is a view, corresponding to FIG. 5, for explaining a pouring step (after changing a posture) in a Modification D of an embodiment of the present invention.
Figure 41:
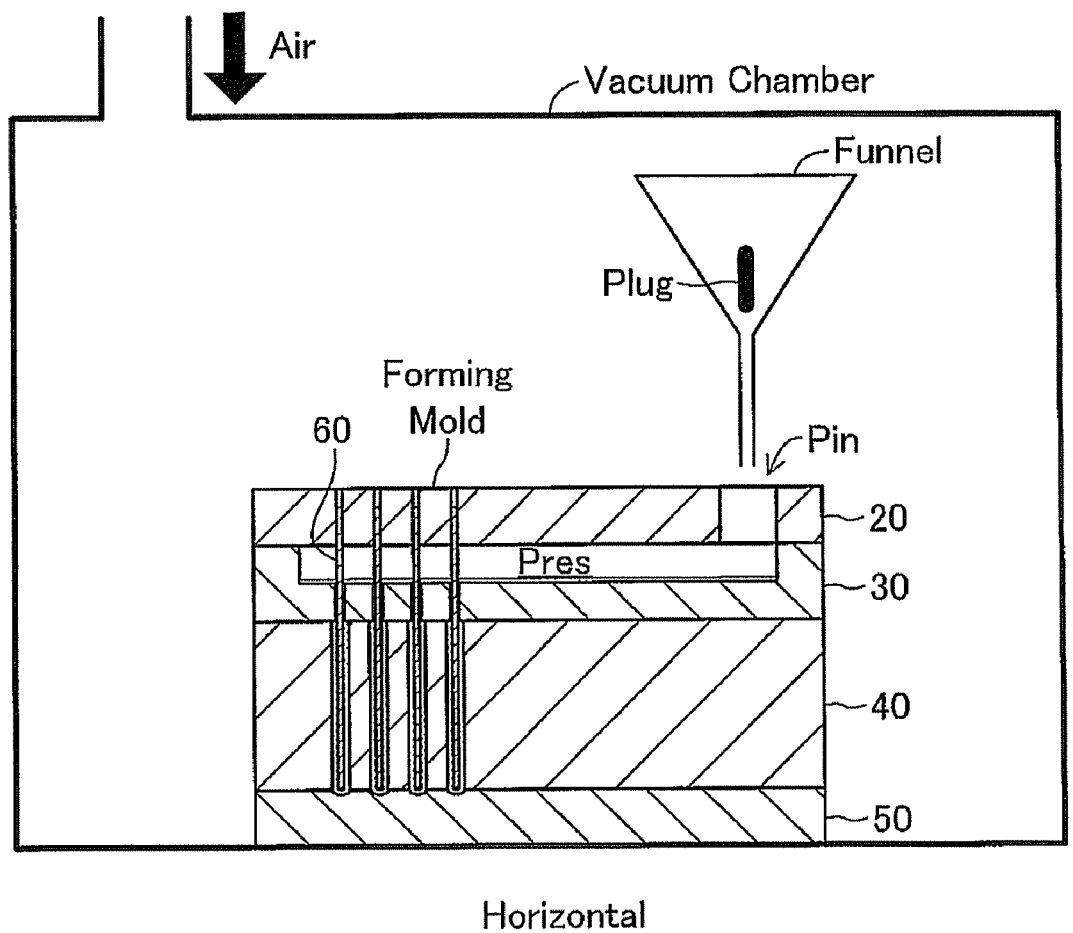
FIG. 41 is a view, corresponding to FIG. 5, for explaining an atmospheric pressure returning step in a Modification D of an embodiment of the present invention.

First, as shown in FIG. 38, in a state wherein the posture of the vacuum chamber (accordingly, forming mold) is maintained in the "posture slanted from a horizontal direction" (slanted posture), the "negative pressure adjusting step" (from an atmospheric pressure to a negative pressure) is executed. Thereby, similarly to Modification C, the inside of the molding space (16 spaces) of the forming mold is also adjusted to the negative pressure. Next, as shown in FIG. 39, in a state wherein the posture of the vacuum chamber (accordingly, forming mold) is maintained in the slanted posture and the pressure in the vacuum chamber (accordingly, in the molding spaces) is maintained at the negative pressure, the "pouring step" (before changing the posture) is executed. In the "pouring step" (before changing the posture), by pulling out the plug member, the ceramic slurry flows out of the funnel. As a result, the ceramic slurry is retained in the Slurry Reservoir Pres such that the upper openings of the Second Holes 31 (16 points) are not blocked with the ceramic slurry (i.e., the ceramic slurry does not exist on the upside of the openings (16 points) of the Second Holes 31). Next, as shown in FIG. 40, in a state wherein the pressure in the vacuum chamber (accordingly, in the molding spaces) is maintained at the negative pressure, the posture of the forming mold is changed from the slanted posture to a horizontal posture (an "pouring step" (after changing the posture)). As a result, the ceramic slurry retained in the Slurry Reservoir Pres moves to the upside of the upper openings (16 points) of the Second Holes 31, and the upper openings (16 points) of the Second Holes 31 are blocked with the ceramic slurry. Then, as shown in FIG. 41, in a state wherein the posture of the vacuum chamber (accordingly, forming mold) is maintained horizontal and the upper openings of the Second Holes 31 are blocked with the ceramic slurry, the "atmospheric pressure returning step" (from a negative pressure to an atmospheric pressure) is executed. Namely, in Modification D, the posture of the forming mold is changed from the slanted posture to the horizontal posture during the pouring step.

Thus, also in Modification D, similarly to Modification C, in a state wherein the upper openings of the Second Holes 31 are not blocked with the ceramic slurry, the "negative pressure adjusting step" (from an atmospheric pressure to a negative pressure) is executed. Accordingly, a situation where the air within the molding space (S1+S2) is evacuated outside through the inside of the ceramic slurry will not occur. As a result, it is possible to prevent the air bubbles from getting mixed into the ceramic slurry.

Figure 42:
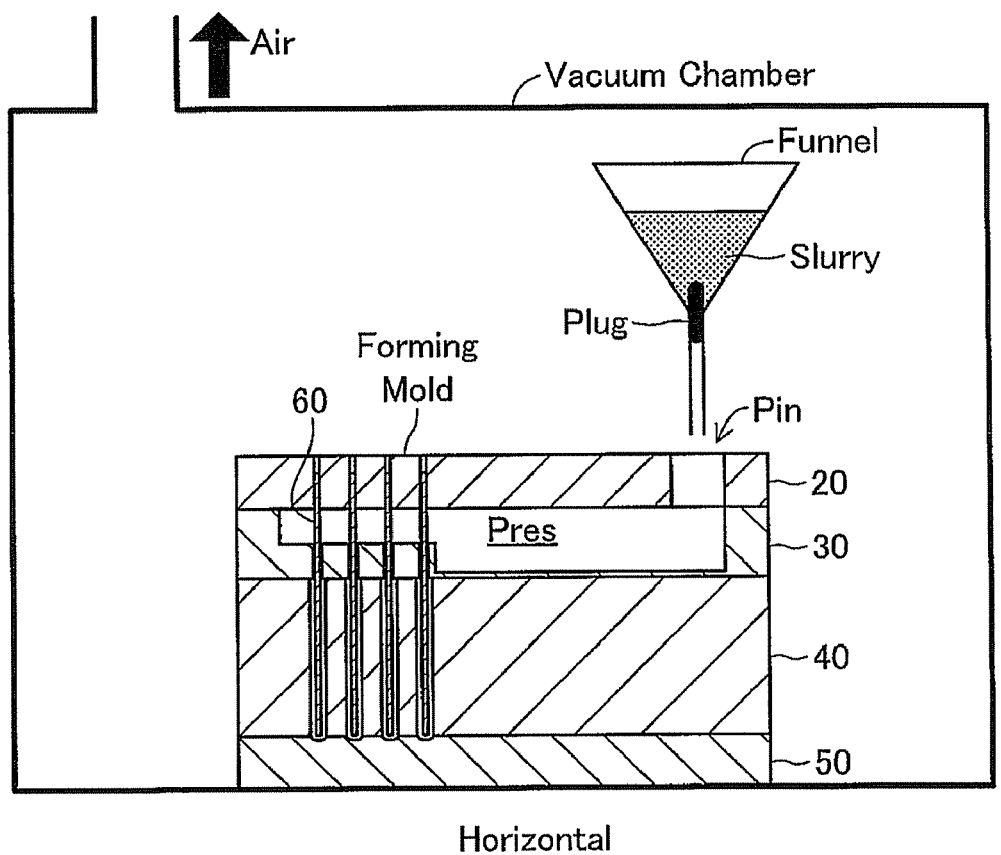
FIG. 42 is a view, corresponding to FIG. 5, for explaining a negative pressure adjusting step in a Modification E of an embodiment of the present invention.

In Modification E, as shown in FIG. 42, similarly to Modification B, the same forming mold as the forming mold shown in FIG. 31 is used. Similarly to Modification C, the slurry is retained in a funnel placed inside the vacuum chamber separately and independently from the forming mold, not in the Slurry Reservoir Pres of the forming mold. The discharge of the slurry is stopped with a plug member.

Figure 43:
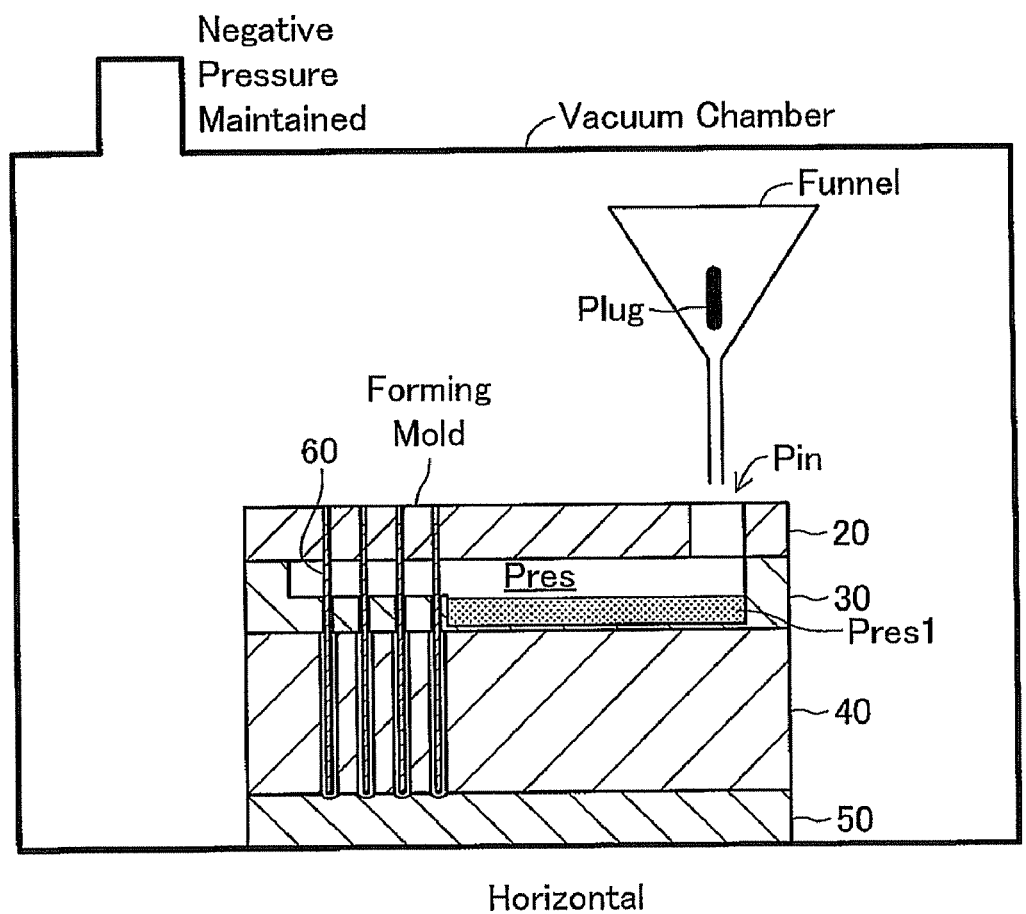
FIG. 43 is a view, corresponding to FIG. 5, for explaining a pouring step (before changing a posture) in a Modification E of an embodiment of the present invention.
Figure 44:
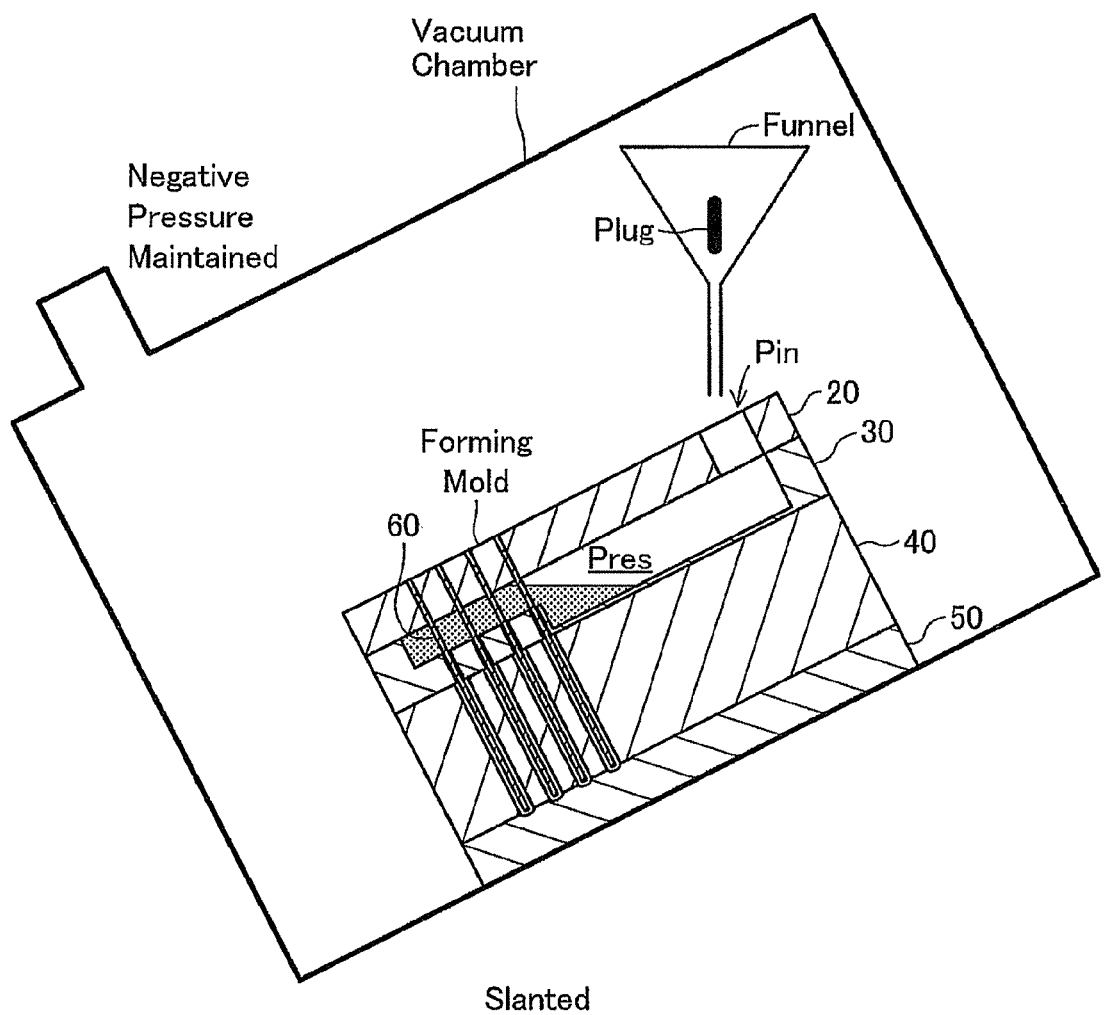
FIG. 44 is a view, corresponding to FIG. 5, for explaining a pouring step (after changing a posture) in a Modification E of an embodiment of the present invention.
Figure 45:
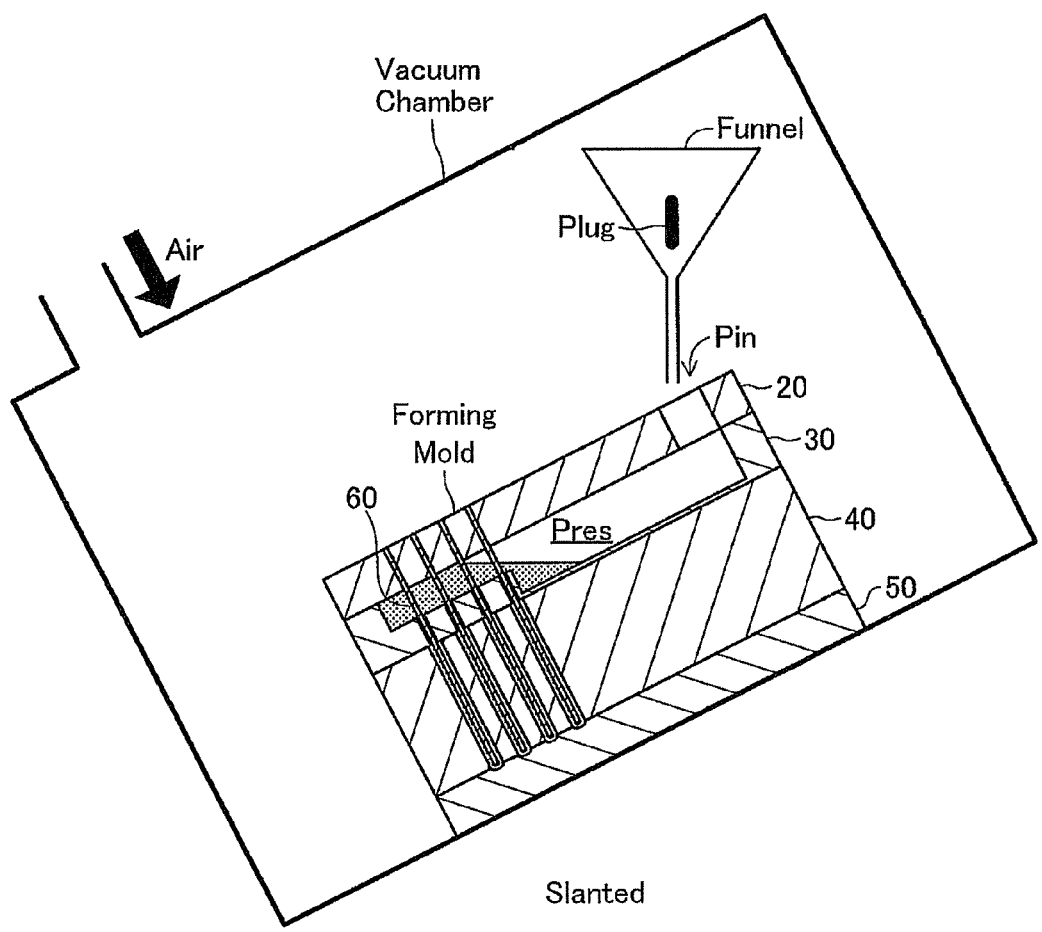
FIG. 45 is a view, corresponding to FIG. 5, for explaining an atmospheric pressure returning step in a Modification E of an embodiment of the present invention.

First, as shown in FIG, 42, the "negative pressure adjusting step" (from an atmospheric pressure to a negative pressure) is executed in a state wherein the posture of the vacuum chamber (accordingly, forming mold) is maintained horizontal. Thereby, similarly to Modification C, the inside of the molding space (16 spaces) of the forming mold is also adjusted to the negative pressure. Next, as shown in FIG. 43, in a state wherein the posture of the vacuum chamber (accordingly, forming mold) is maintained horizontal and the pressure in the vacuum chamber (accordingly, in the molding spaces) is maintained at the negative pressure, the "pouring step" (before changing the posture) is executed. In the "pouring step" (before changing the posture), by pulling out the plug member, the ceramic slurry flows out of the funnel. As a result, the ceramic slurry is retained in the Slurry Preparing Portion Pres1 which is a part of the Slurry Reservoir Pres. Thereby, the upper openings (16 points) of the Second Holes 31 are not blocked with the ceramic slurry. Next, as shown in FIG. 44, in a state wherein the pressure in the vacuum chamber (accordingly, in the molding spaces) is maintained at the negative pressure, the posture of the forming mold is changed from the horizontal posture to a "posture slanted from a horizontal direction" (slanted posture) (an "pouring step" (after changing the posture)). As a result, the ceramic slurry retained in the Slurry Reservoir Pres (specifically, the Slurry Preparing Portion Pres1) moves to the upside of the upper openings (16 points) of the Second Holes 31, and the upper openings (16 points) of the Second Holes 31 are blocked with the ceramic slurry. Then, as shown in FIG. 45, in a state wherein the posture of the vacuum chamber (accordingly, forming mold) is maintained at the slanted posture and the upper openings of the Second Holes 31 are blocked with the ceramic slurry, the "atmospheric pressure returning step" (from a negative pressure to an atmospheric pressure) is executed. Namely, in Modification E, the posture of the forming mold is changed from the horizontal posture to the slanted posture during the pouring step.

Thus, also in this Modification E, similarly to Modification C, in a state wherein the upper openings of the Second Holes 31 are not blocked with the ceramic slurry, the "negative pressure adjusting step" (from an atmospheric pressure to a negative pressure) is executed. Accordingly, a situation where the air within the molding space (S1+S2) is evacuated outside through the inside of the ceramic slurry retained in the Slurry Reservoir Pres will not occur. As a result, it is possible to prevent the air bubbles from getting mixed into the ceramic slurry.

In addition, in Modifications D and E, the slurry gradually (slowly) enters into each of the molding spaces by gradually (slowly) changing the posture of the forming mold in the pouring step. Accordingly, even if the air remained in the molding space, it is possible to secure time enough to evacuate the remaining air to the outside of the molding space. As a result, as compared with Modification C, it is possible to more securely evacuate the remaining air in the molding space.

Although, in the above Modification D (E), the posture of the forming mold is changed from the slanted (horizontal) posture to the horizontal (slanted) posture during the pouring step and thereby the state wherein the upper openings (16 points) of the Second Holes 31 are not blocked with the ceramic slurry is changed to the state wherein the upper openings are blocked with the ceramic slurry, the posture of the forming mold may be changed from a first slanted posture (which is slanted from a horizontal direction) to a second slanted posture (which is slanted from a horizontal direction) during the pouring step and thereby the state wherein the upper openings (16 points) of the Second Holes 31 are not blocked with the ceramic slurry may be changed to the state wherein the upper openings are blocked with the ceramic slurry.

In the above Modifications C, D, and E, the container (funnel) to retain the slurry is placed in the vacuum chamber separately and independently from the forming mold, and the slurry is retained inside the vacuum chamber. On the contrary, as shown in FIG. 46, the container (funnel) to retain the slurry may be placed outside the vacuum chamber separately and independently from the forming mold, and the slurry may be retained outside the vacuum chamber.

Figure 47:
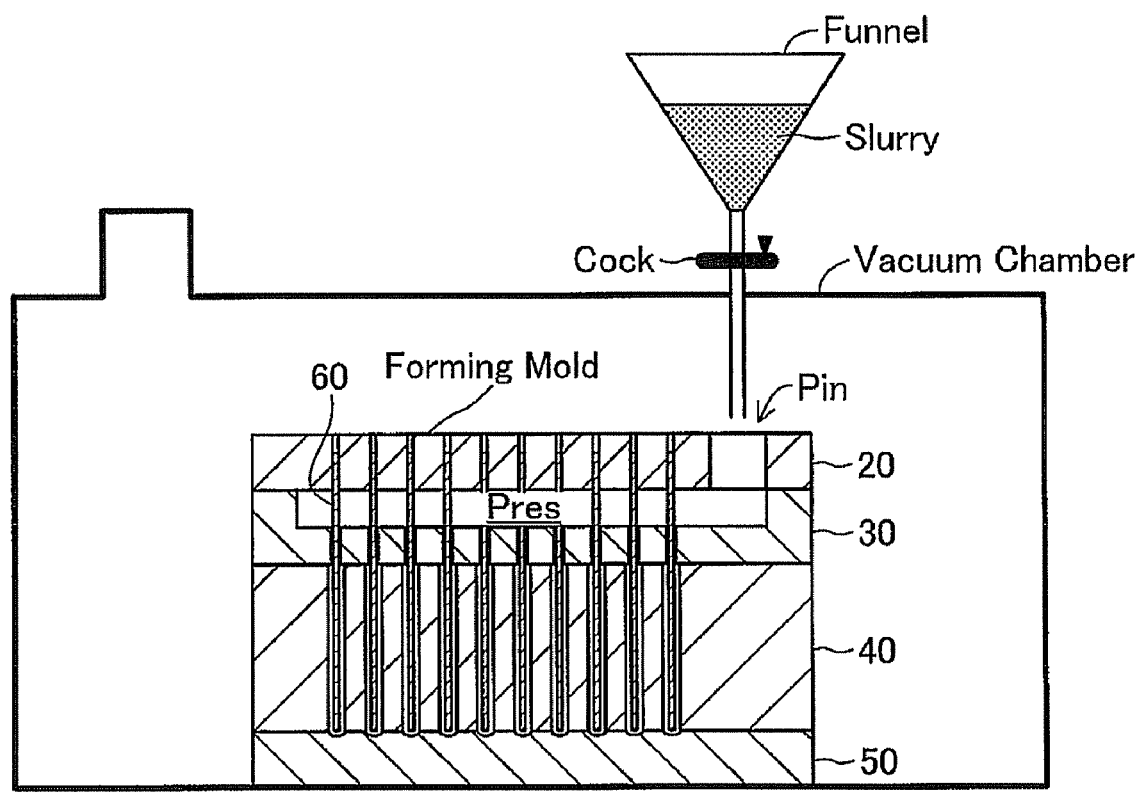
FIG. 47 is a view, corresponding to FIG. 46, showing a case where a cock is used as a means for stopping the discharge of a slurry.

In addition, although, in Modifications C, D, and E, a plug is used as a means for stopping the discharge of the slurry from the container (funnel) to retain the slurry, a cock may be used instead of a plug, as shown in FIG. 47.

Figure 46:
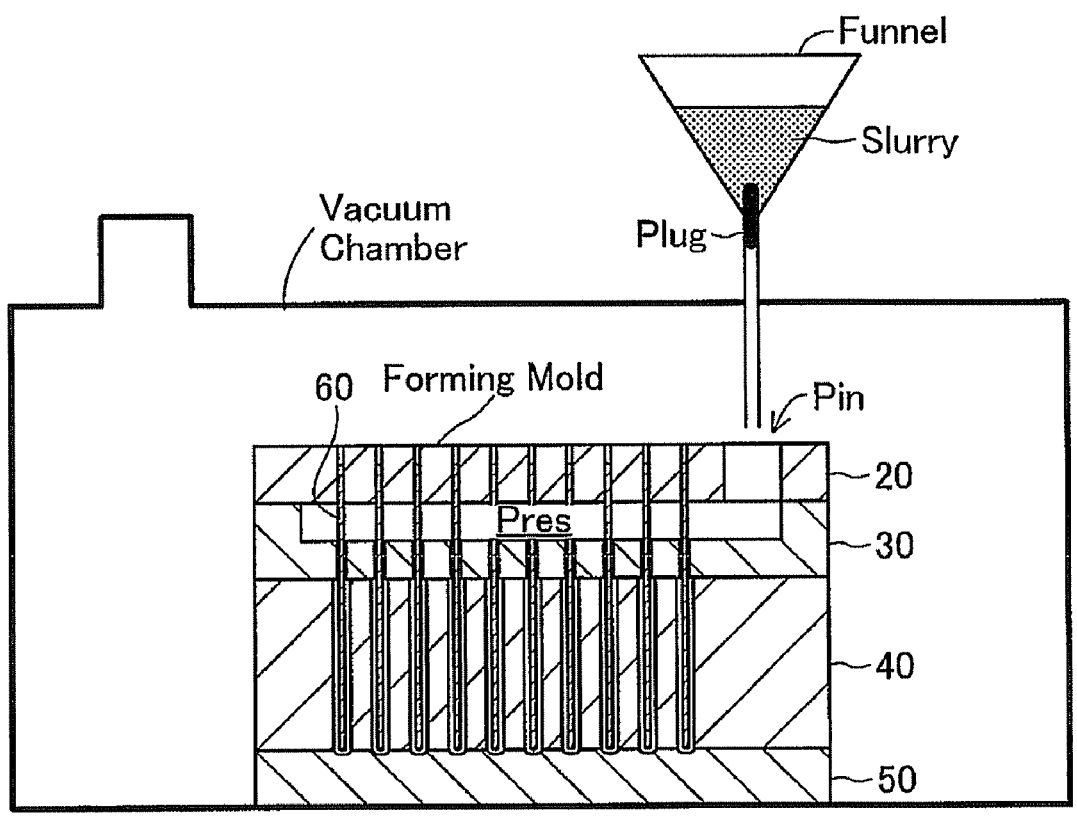
FIG. 46 is a view, corresponding to FIG. 35, showing a case where a container for retaining a slurry is arranged outside a vacuum chamber.

The action and effect in the case where the container (funnel) to retain the slurry is placed outside the vacuum chamber separately and independently from the forming mold as shown in FIG. 46 and FIG. 47 will be additionally mentioned below. When the funnel is placed outside the vacuum chamber, the retained slurry is not exposed to a negative pressure until the plug member (cock) is pulled out (opened). Therefore, it is possible to avoid the boiling of a disperse medium, and it is possible to make the action to suppress the mixing of the air bubble further function. In addition, as compared with the case where the funnel is placed inside the vacuum chamber, the capacity of the vacuum chamber can be smaller. Therefore, the time period required for reducing pressure can be shortened. Further, by previously reducing the pressure in the vacuum chamber, it is possible to omit the time period from the pour of the slurry into the funnel after the preparation of the slurry to the completion of the reduction of the pressure in the vacuum chamber. Accordingly, it becomes possible to use a slurry with a high hardening rate as material for the molded body.

Figure 48:
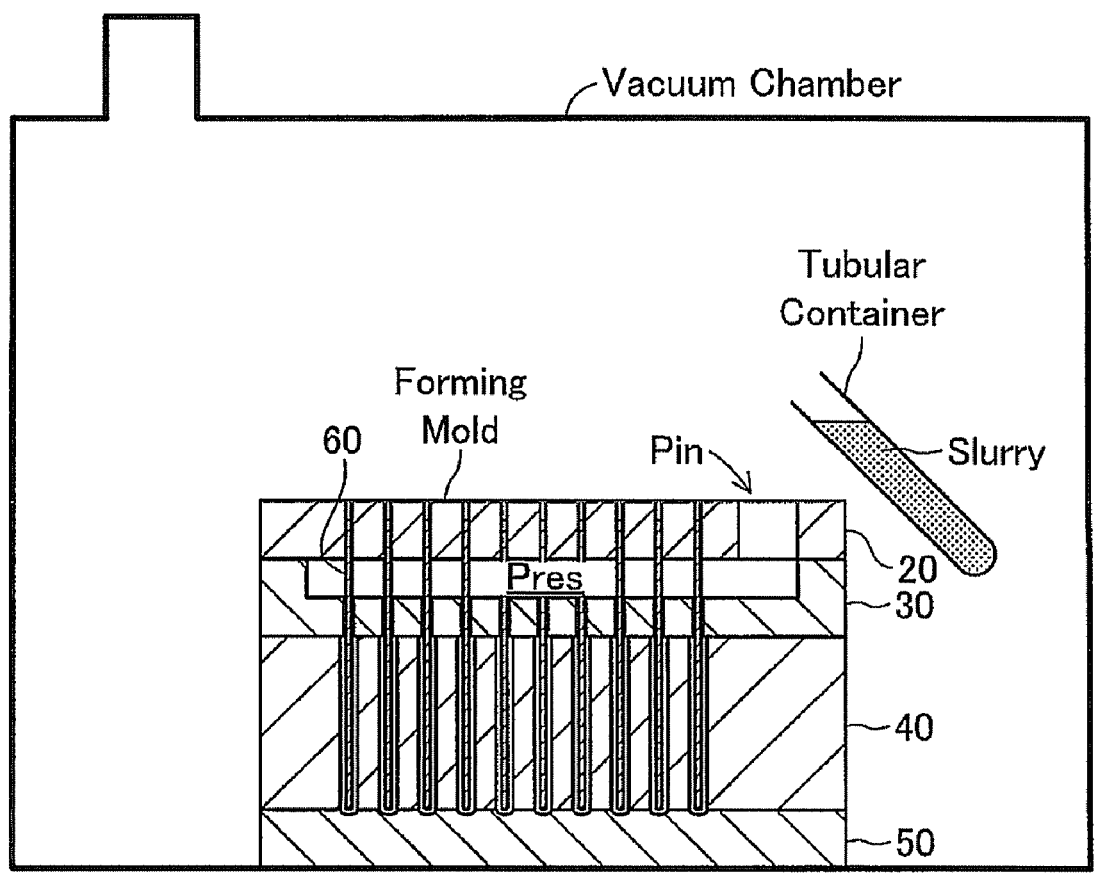
FIG. 48 is a view, corresponding to FIG. 35, showing a tubular container is adopted as a case where a container for retaining a slurry.
Figure 49:
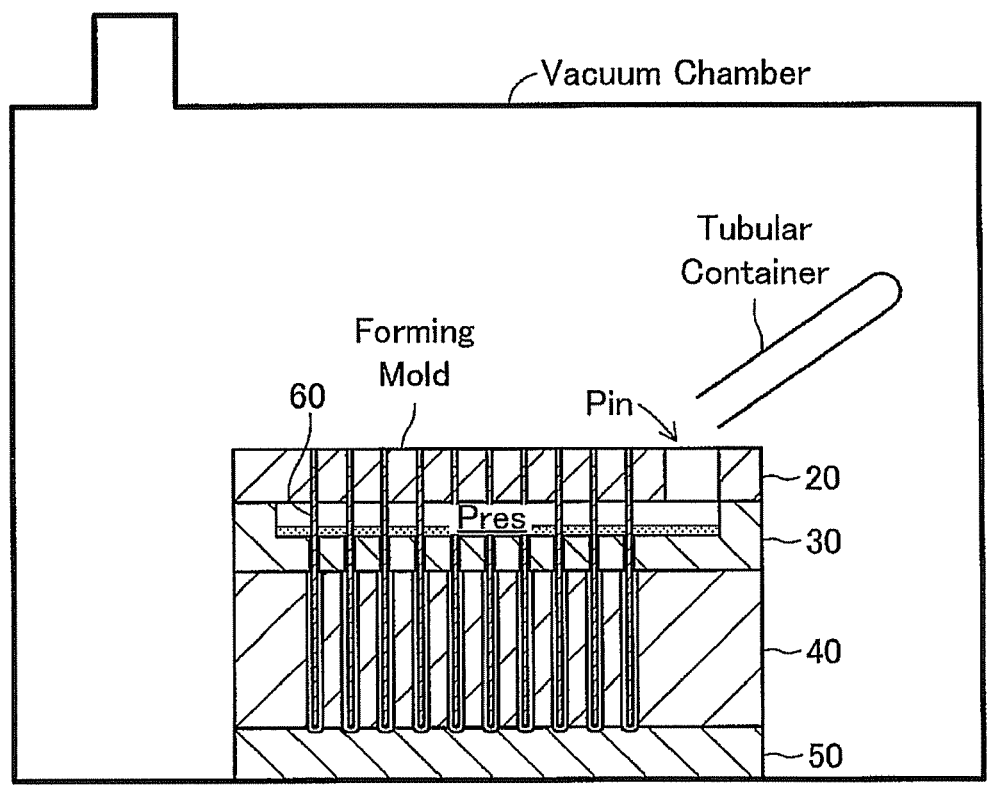
FIG. 49 is a view, corresponding to FIG. 48, showing a state wherein the posture of the tubular container has been changed to pour a slurry.

Also, although, in Modifications C, D, and E, a funnel is used as a container to retain the slurry, a tubular container may be used instead of a funnel, as shown in FIG. 48. In this case, the pour of the slurry retained in the tubular container into the forming mold can be achieved by turning the tubular container upside down using a mechanism (not shown) for changing the posture of the tubular container, as shown in FIG. 49.

The invention claimed is:

1. A forming mold for obtaining a molded body with a hollow portion by molding a slurry comprising inorganic powders, a disperse medium, and a gelling agent, comprising:
   an outer mold having a first hole, which opens into the upper surface of the outer mold and extends downward from said opening, formed therein;
   an upper mold stacked on said outer mold and having a second hole, which passes through in a vertical direction, formed therein, wherein, in a state where the upper mold is stacked on the upper surface of said outer mold, the lower opening of said second hole and the opening of said first hole are connected such that the lower opening of said second hole is included in the opening of said first hole; and
   an inner mold having an insert in a shape of a rod, which is inserted into the first and second holes from above;
   wherein, in said upper mold, a slurry reservoir, which leads to the upper opening on the second hole and retains said slurry, is formed; and
   said forming mold is configured such that, in an assembly-completed state where said upper mold is stacked on the upper surface of said outer mold and said insert is inserted in said first hole and said second hole, a space formed between the inner wall of said first hole and the surface of said insert is used as a molding space for molding said slurry and said slurry poured into said slurry reservoir is filled in said molding space through a space formed between the inner wall of said second hole and the surface of said insert.

2. A forming mold according to claim 1, wherein slits, which extends in a vertical direction and leads to the upper and lower openings of said second hole, are formed on the inner wall of said second hole.

3. A forming mold according to claim 1, wherein at least one of said outer mold, said upper mold, and said inner mold is made of resin.

4. A forming mold according to claim 3, wherein said outer mold is made of fluoropolymer.

5. A forming mold according to claim 1, comprising a mechanism to move at least said upper mold and said inner mold in parallel, separately and independently, as well as only in a vertical direction.

6. A method for producing a molded body to obtain said molded body using said forming mold according to claim 1, including:

a pouring step to pour said slurry into said slurry reservoir such that the upper opening of said second hole is blocked with said slurry, in a state wherein the posture of said forming mold in said assembly-completed state is maintained in a first posture;

a filling step, after said pouring step, to fill said molding space with said poured slurry through a space formed between the inner wall of said second hole and the surface of said insert, in a state wherein the upper opening of said second hole is blocked with said poured slurry while the posture of said forming mold in said assembly-completed state is maintained in said first posture; and a hardening and removing step, after said filling step, to harden the slurry filled in said molding space and remove said upper mold and said outer mold after removing said inner mold from the molded body after said hardening to obtain said molded body.

7. A method for producing a molded body according to claim 6, wherein:

said molding space is confined air-tightly, except for the portion connecting to a space formed between the inner wall of said second hole and the surface of said insert; and said filling step includes:

a negative pressure adjusting step to adjust the ambient pressure of said forming mold from an atmospheric pressure to a negative pressure lower than an atmospheric pressure, in a state wherein the upper opening of said second hole is blocked with said poured slurry while the posture of said forming mold in said assembly-completed state is maintained in said first posture; and an atmospheric pressure returning step, after said negative pressure adjusting step, to return the ambient pressure of said forming mold from said negative pressure to an atmospheric pressure, in a state wherein the upper opening of said second hole is blocked with said poured slurry while the posture of said forming mold in said assembly-completed state is maintained in said first posture.

8. A method for producing a molded body according to claim 7, wherein said first posture is horizontal.

9. A method for producing a molded body to obtain said molded body using said forming mold according to claim 1, including:

a pouring step to pour said slurry into said slurry reservoir such that the upper opening of said second hole is not blocked with said slurry, in a state wherein the posture of said forming mold in said assembly-completed state is maintained in a first posture;

a filling step, after said pouring step, to fill said molding space with said poured slurry through a space formed between the inner wall of said second hole and the surface of said insert, in a state wherein the posture of said forming mold in said assembly-completed state has been changed from said first posture to a second posture and the upper opening of said second hole is blocked with said poured slurry; and a hardening and removing step, after said filling step, to harden the slurry filled in said molding space and remove said upper mold and said outer mold after removing said inner mold from the molded body after said hardening to obtain said molded body.

10. A method for producing a molded body according to claim 9, wherein:

said molding space is confined air-tightly, except for the portion connecting to a space formed between the inner wall of said second hole and the surface of said insert; and said filling step includes:

a negative pressure adjusting step to adjust the ambient pressure of said forming mold from an atmospheric pressure to a negative pressure lower than an atmospheric pressure, in a state wherein the upper opening of said second hole is not blocked with said poured slurry while the posture of said forming mold in said assembly-completed state is maintained in said first posture;

a posture changing step, after said negative pressure adjusting step, to change the posture of said forming mold in said assembly-completed state from said first posture to said second posture to block the upper opening of said second hole with said poured slurry, in a state wherein the ambient pressure of said forming mold is maintained at said negative pressure; and an atmospheric pressure returning step, after said posture changing step, to return the ambient pressure of said forming mold from said negative pressure to an atmospheric pressure, in a state wherein the upper opening of said second hole is blocked with said poured slurry while the posture of said forming mold in said assembly-completed state is maintained in said second posture.

11. A method for producing a molded body according to claim 10, wherein said first posture is a posture slanted from a horizontal direction and said second posture is horizontal.

12. A method for producing a molded body according to claim 10, wherein said first posture is horizontal and said second posture is a posture slanted from a horizontal direction.

13. A method for producing a molded body to obtain said molded body using said forming mold according to claim 1, wherein, in said assembly-completed state, said molding space is confined air-tightly, except for the portion connecting to a space formed between the inner wall of said second hole and the surface of said insert, including:

a negative pressure adjusting step to adjust the ambient pressure of said forming mold in said assembly-completed state from an atmospheric pressure to a negative pressure lower than an atmospheric pressure;

a pouring step, after said negative pressure adjusting step, to pour said slurry into said slurry reservoir, in a state wherein the ambient pressure of said forming mold is maintained at said negative pressure;

an atmospheric pressure returning step, after said pouring step, to return the ambient pressure of said forming mold from said negative pressure to an atmospheric pressure, in a state wherein the upper opening of said second hole is blocked with said poured slurry; and a hardening and removing step, after said atmospheric pressure returning step, to harden the slurry filled in said molding space and remove said upper mold and said outer mold after removing said inner mold from the molded body after said hardening to obtain said molded body.

14. A method for producing a molded body according to claim 13, wherein:

in said negative pressure adjusting step, the ambient pressure of said forming mold is adjusted to said negative pressure in a state wherein the posture of said forming mold in said assembly-completed state is maintained in a first posture;

in said pouring step, said slurry is poured into said slurry reservoir such that the upper opening of said second hole is blocked with said slurry in a state wherein the posture of said forming mold in said assembly-completed state is maintained in said first posture while the ambient pressure of said forming mold is maintained at said negative pressure; and in said atmospheric pressure returning step, the ambient pressure of said forming mold is returned from said negative pressure to an atmospheric pressure in a state wherein the upper opening of said second hole is blocked with said poured slurry while the posture of said forming mold in said assembly-completed state is maintained in said first posture.

15. A method for producing a molded body according to claim 14, wherein said first posture is horizontal.

16. A method for producing a molded body according to claim 13, wherein:

in said negative pressure adjusting step, the ambient pressure of said forming mold is adjusted to said negative pressure in a state wherein the posture of said forming mold in said assembly-completed state is maintained in a first posture;

in said pouring step, said slurry is poured into said slurry reservoir such that the upper opening of said second hole is not blocked with said slurry in a state wherein the posture of said forming mold in said assembly-completed state is maintained in said first posture while the ambient pressure of said forming mold is maintained at said negative pressure, and thereafter the posture of said forming mold in said assembly-completed state is changed from said first posture to a second posture and the upper opening of said second hole is blocked with said poured slurry; and in said atmospheric pressure returning step, the ambient pressure of said forming mold is returned from said negative pressure to an atmospheric pressure in a state wherein the upper opening of said second hole is blocked with said poured slurry while the posture of said forming mold in said assembly-completed state is maintained in said second posture.

17. A method for producing a molded body according to claim 16, wherein said first posture is a posture slanted from a horizontal direction and said second posture is horizontal.

18. A method for producing a molded body according to claim 16, wherein said first posture is horizontal and said second posture is a posture slanted from a horizontal direction.

19. A method for producing a molded body according to claim 6, wherein the contact angle of said slurry to the inner wall of said first hole is 60° or more.

20. A method for producing a molded body according to claim 6, wherein said hardening and removing step includes:

a primary hardening step to harden the slurry filled in said molding space by a polymerization reaction, an inner mold removing step to remove said inner mold from the molded body after said primary hardening step, a secondary hardening step to harden the molded body after said inner mold removing step by the volatilization of said disperse medium contained in the molded body, an upper mold removing step to remove said upper mold from the molded body after said inner mold removing step and before or after said secondary hardening step, and an outer mold removing step to remove said outer mold from the molded body after said secondary hardening step.

21. A method for producing a molded body according to claim 9, wherein the contact angle of said slurry to the inner wall of said first hole is 60° or more.

22. A method for producing a molded body according to claim 9, wherein said hardening and removing step includes:

a primary hardening step to harden the slurry filled in said molding space by a polymerization reaction, an inner mold removing step to remove said inner mold from the molded body after said primary hardening step, a secondary hardening step to harden the molded body after said inner mold removing step by the volatilization of said disperse medium contained in the molded body, an upper mold removing step to remove said upper mold from the molded body after said inner mold removing step and before or after said secondary hardening step, and an outer mold removing step to remove said outer mold from the molded body after said secondary hardening step.

23. A method for producing a molded body according to claim 13, wherein the contact angle of said slurry to the inner wall of said first hole is 60° or more.

24. A method for producing a molded body according to claim 13, wherein said hardening and removing step includes:

a primary hardening step to harden the slurry filled in said molding space by a polymerization reaction, an inner mold removing step to remove said inner mold from the molded body after said primary hardening step, a secondary hardening step to harden the molded body after said inner mold removing step by the volatilization of said disperse medium contained in the molded body, an upper mold removing step to remove said upper mold from the molded body after said inner mold removing step and before or after said secondary hardening step, and an outer mold removing step to remove said outer mold from the molded body after said secondary hardening step.

* * * * *